(12) United States Patent
Rentschler et al.

(10) Patent No.: US 12,296,492 B2
(45) Date of Patent: May 13, 2025

(54) EMBEDDED MAGNETIC SENSING FOR SOFT ACTUATORS

(71) Applicant: The Regents of the University of Colorado, Denver, CO (US)

(72) Inventors: Mark Rentschler, Boulder, CO (US); Vani Sundaram, Boulder, CO (US); Khoi Ly, Boulder, CO (US); Jatin Mayekar, Boulder, CO (US); Nikolaus Correll, Boulder, CO (US)

( * ) Notice: Subject to any disclaimer, the term of this patent is extended or adjusted under 35 U.S.C. 154(b) by 298 days.

(21) Appl. No.: 17/746,427

(22) Filed: May 17, 2022

(65) Prior Publication Data

US 2022/0379493 A1    Dec. 1, 2022

Related U.S. Application Data

(60) Provisional application No. 63/189,571, filed on May 17, 2021.

(51) Int. Cl.
| | |
|---|---|
| B25J 15/00 | (2006.01) |
| B25J 9/00 | (2006.01) |
| B25J 9/12 | (2006.01) |
| B25J 9/16 | (2006.01) |
| B25J 19/02 | (2006.01) |
| H02N 1/00 | (2006.01) |

(52) U.S. Cl.
CPC .......... *B25J 9/1694* (2013.01); *B25J 9/0003* (2013.01); *B25J 9/0006* (2013.01); *B25J 9/0012* (2013.01); *B25J 9/0015* (2013.01); *B25J 9/123* (2013.01); *B25J 9/1602* (2013.01); *B25J 9/162* (2013.01); *B25J 9/1635* (2013.01); *B25J 15/0085* (2013.01); *H02N 1/002* (2013.01)

(58) Field of Classification Search
CPC .... B25J 15/0085; B25J 9/0003; B25J 9/0006; B25J 9/0012; B25J 9/0015; B25J 9/123; B25J 9/1602; B25J 9/162; B25J 9/1635; B25J 9/1694; B25J 19/027; H02N 1/002
See application file for complete search history.

(56) References Cited

U.S. PATENT DOCUMENTS

| | | | |
|---|---|---|---|
| 2009/0165877 A1* | 7/2009 | Den Toonder | B01F 33/3038 137/831 |
| 2016/0265985 A1* | 9/2016 | Onal | G01L 5/226 |
| 2020/0032822 A1* | 1/2020 | Keplinger | F15B 15/18 |
| 2022/0069737 A1* | 3/2022 | Jin | H02N 1/002 |

OTHER PUBLICATIONS

Acome, E., et al., "Hydraulically amplified self-healing electrostatic actuators with muscle-like performance", Science, vol. 359, No. 6371, Jan. 2018, 61-65.

(Continued)

*Primary Examiner* — Justin Seo
*Assistant Examiner* — Kendrick X Liu
(74) *Attorney, Agent, or Firm* — Holzer Patel Drennan

(57) ABSTRACT

A magnetic sensing approach for determining a positioning characteristic of a soft robotic actuator. A magnetic field or a change in magnetic field of a magnetic member may be measured as it undergoes concurrent displacement with a soft actuator. Additionally, an example rolling robotic wheel is illustrated. The robotic wheel may utilize magnetic sensing as described herein.

18 Claims, 33 Drawing Sheets

(56) References Cited

OTHER PUBLICATIONS

Alapan, Y., et al., "Reprogrammable shape morphing of magnetic soft machines", Sci. Adv., vol. 6, No. 38, Sep. 2020, eabc6414.
Almansouri, A. S., et al., "An Imperceptible Magnetic Skin", Adv. Mater. Technol., vol. 4, No. 10, 2019.
Bin Rosle, M. H., et al., "Soft Fingertip with Tactile Sensation for Detecting Grasping Orientation of Thin Object", 2018 IEEE International Conference on Robotics and Biomimetics (ROBIO), Dec. 2018, 1304-1309.
Chen, A. S., et al., "A paper-based electrostatic zipper actuator for printable robots", 2014 IEEE International Conference on Robotics and Automation (ICRA), May 2014, 5038-5043.
Cianchetti, Matteo, et al., "Biomedical applications of soft robotics", Nat Rev Mater, vol. 3, May 23, 2018, 143-153.
Cianchetti, Matteo, "Fundamentals on the Use of Shape Memory Alloys in Soft Robotics", Interdisciplinary Mechatronics, John Wiley & Sons, May 5, 2013, 227-254.
Clark, J. J., et al., "A magnetic field based compliance matching sensor for high resolution, high compliance tactile sensing", 1988 IEEE International Conference on Robotics and Automation Proceedings, Apr. 1988, 772-777.
Furlani, E. P., "Chapter 2—Review of Maxwell's Equations", Permanent Magnet and Electromechanical Devices, Academic Press (San Diego), 2001, 73-95.
Gafford, Joshua, et al., "Shape Deposition Manufacturing of a Soft, Atraumatic, and Deployable Surgical Grasper", J. Mechanisms Robotics, vol. 7, No. 2, May 2015, 021006.
Hellebrekers, T., et al., "Soft Magnetic Skin for Continuous Deformation Sensing", Adv. Intell. Syst., vol. 1, No. 4, 2019, 1900025.
Hellebrekers, T., et al., "Soft Magnetic Tactile Skin for Continuous Force and Location Estimation Using Neural Networks", IEEE Robot. Autom. Lett., vol. 5, No. 3, Jul. 2020, 3892-3898.
Horvath, Markus A., et al., "An organosynthetic soft robotic respiratory simulator", APL Bioeng., vol. 4, No. 2, Jun. 2020, 026108.
Hsiao, J. H., et al., "Soft medical robotics: clinical and biomedical applications, challenges, and future directions", Advanced Robotics, vol. 33, No. 21, 2019, 1099-1111.
Huang, Y., et al., "A Novel Method for Detecting Joint Angles Based on Inertial and Magnetic Sensors", 2018 25th International Conference on Mechatronics and Machine Vision in Practice (M2VIP), Nov. 2018, 1-6.
Jamone, L., et al., "Highly Sensitive Soft Tactile Sensors for an Anthropomorphic Robotic Hand", IEEE Sens. J., vol. 15, No. 8, Aug. 2015, 4226-4233.
Johnson, B. K.', et al., "Identification and Control of a Nonlinear Soft Actuator and Sensor System", IEEE Robot. Autom. Lett., vol. 5, No. 3, Jul. 2020, 3783-3790.
Katzschmann, R. K., et al., "Hydraulic Autonomous Soft Robotic Fish for 3D Swimming", Experimental Robotics: The 14th International Symposium on Experimental Robotics, 2016, 405-420.
Kedzierski, J., et al., "Linear and rotational microhydraulic actuators driven by electrowetting", Sci. Robot., vol. 3, No. 22, Sep. 2018.
Kellaris, Nicholas, et al., "Peano-HASEL actuators: Muscle-mimetic, electrohydraulic transducers that linearly contract on activation", Science Robotics, vol. 3, iss. 14, Jan. 31, 2018.
Koivikko, Anastasia, et al., "Magnetically switchable soft suction grippers", Extreme Mechanics Letters, vol. 44, Apr. 2021, 101263.
Lenz, J., et al., "Magnetic sensors and their applications", IEEE Sens. J., vol. 6, No. 3, Jun. 2006, 631-649.
Luo, M., et al., "Toward Modular Soft Robotics: Proprioceptive Curvature Sensing and Sliding-Mode Control of Soft Bidirectional Bending Modules", Soft Robot., vol. 4, No. 2, Feb. 2017, 117-125.
Ly, K., et al., "Miniaturized Circuitry for Capacitive Self-sensing and Closed-loop Control of Soft Electrostatic Transducers", https://arxiv.org/abs/2009.06852, accessed Sep. 22, 2020., Sep. 2020.
Mansour, N. A., et al., "Development of a Novel Miniaturized Electromagnetic Actuator for a Modular Serial Manipulator", Actuators, vol. 10, No. 1, Jan. 14, 2021, 14.
McMahan, William, et al., "Field trials and testing of the OctArm continuum manipulator", Proceedings 2006 IEEE International Conference on Robotics and Automation, May 2006, 2336-2341.
Mersch, J., et al., "High-Displacement, Fiber-Reinforced Shape Memory Alloy Soft Actuator with Integrated Sensors and Its Equivalent Network Model", Adv. Intell. Syst., DOI: 10.1002/aisy.202000221, 2021.
Mirzanejad, H., et al., "Soft force sensor made of magnetic powder blended with silicone rubber", Sens. Actuators Phys., vol. 293, Jul. 2019, 108-118.
Mitchell, S. K., et al., "An Easy-to-Implement Toolkit to Create Versatile and High-Performance HASEL Actuators for Untethered Soft Robots", Adv. Sci., vol. 6, No. 14, 2019, 1900178.
Mori, Y., et al., "Feedback control of a pneumatically driven soft finger using a photoelastic polyurethane bending sensor", Advanced Robotics vol. 35, No. 12, Apr. 2021, 771-786.
Naclerio, N. D., et al., "Soft Robotic Burrowing Device with Tip-Extension and Granular Fluidization", 2018 IEEE/RSJ International Conference on Intelligent Robots and Systems (IROS), Oct. 2018, 5918-5923.
Polygerinos, Panagiotis, et al., "Soft Robotic Glove for Combined Assistance and at-Home Rehabilitation", Robotics and Autonomous Systems, vol. 73, 2015, 135-143.
Roche, E. T., et al., "Soft robotic sleeve supports heart function", Sci. Transl. Med., vol. 9, No. 373, Jan. 2017, eaaf3925.
Rothemund, P., et al., "HASEL Artificial Muscles for a New Generation of Lifelike Robots-Recent Progress and Future Opportunities", Advanced Materials, vol. 33, iss. 19, May 2021.
Rus, Daniela, et al., "Design, fabrication and control of soft robots", Nature, vol. 521, No. 7553, May 2015, 467-475.
Russo, Matteo, et al., "A Kinematic Coupling Mechanism With Binary Electromagnetic Actuators for High-Precision Positioning", IEEE/ASME Transactions on Mechatronics, Apr. 2022, 892-903.
Schunk, C., et al., "System Identification and Closed-Loop Control of a Hydraulically Amplified Self-Healing Electrostatic (HASEL) Actuator", 2018 IEEE/RSJ International Conference on Intelligent Robots and Systems (IROS), Oct. 2018, 6417-6423.
Shintake, J., et al., "Soft Robotic Grippers", Adv. Mater., vol. 30, No. 29, 2018, 1707035.
Sîrbu, I. D., et al., "Electrostatic bellow muscle actuators and energy harvesters that stack up", Sci. Robot., vol. 6, No. 51, Feb. 2021.
Thalman, Carly M., et al., "Toward A Soft Robotic Ankle-Foot Orthosis (SR-AFO) Exosuit for Human Locomotion: Preliminary Results in Late Stance Plantarflexion Assistance", 2020 3rd IEEE International Conference on Soft Robotics (RoboSoft), 2020, 801-807.
Tolley, Michael T., et al., "A Resilient, Untethered Soft Robot", Soft Robot., vol. 1, No. 3, Sep. 2014, 213-223.
Truby, R. L., et al., "A Recipe for Electrically-Driven Soft Robots via 3D Printed Handed Shearing Auxetics", IEEE Robot. Autom. Lett., vol. 6, No. 2, Apr. 2021, 795-802.
Walker, J., et al., "Soft Robotics: A Review of Recent Developments of Pneumatic Soft Actuators", Actuators, vol. 9, No. 1, Mar. 2020, 3.
Wang, Hongbo, et al., "Design methodology for magnetic field-based soft tri-axis tactile sensors", Sensors, vol. 16, No. 9, Aug. 2016, 1356.
Whitesides, George M., "Soft Robotics", Angew. Chem. Int. Ed., vol. 57, iss. 16, Apr. 9, 2018, 4258-4273.
Wirekoh, J., et al., "Sensorized, Flat, Pneumatic Artificial Muscle Embedded with Biomimetic Microfluidic Sensors for Proprioceptive Feedback", Soft Robot., vol. 6, No. 6, 2019, 768-777.
Yan, X., et al., "Self-lifting artificial insect wings via electrostatic flapping actuators", 2015 28th IEEE International Conference on Micro Electro Mechanical Systems (MEMS), Jan. 2015, 22-25.
Yan, Y., et al., "Soft magnetic skin for super-resolution tactile sensing with force self-decoupling", Sci. Robot., vol. 6, No. 51, Feb. 2021.

* cited by examiner

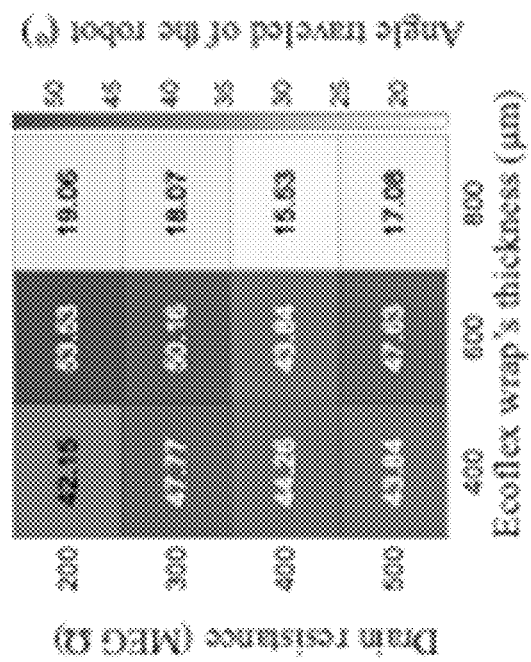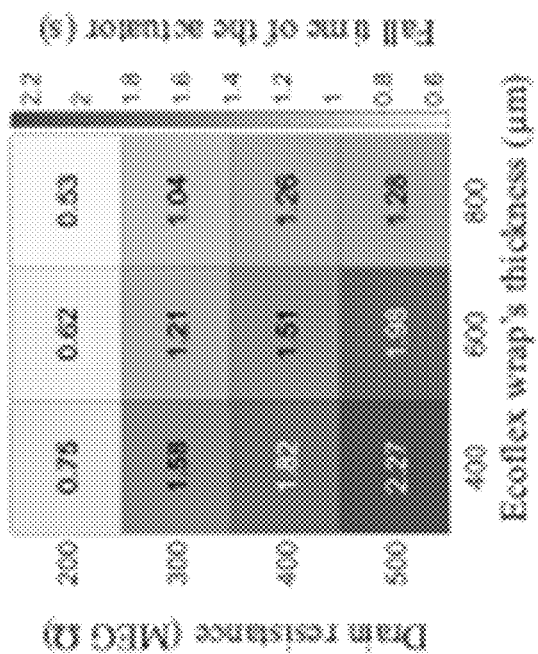
FIG. 17

EMBEDDED MAGNETIC SENSING FOR SOFT ACTUATORS

CROSS-REFERENCE TO RELATED APPLICATIONS

The present application claims benefit of priority to U.S. Provisional Patent Application No. 63/189,571, entitled "EMBEDDED MAGNETIC SENSING METHOD FOR SOFT ACTUATORS" and filed on May 17, 2021, which is specifically incorporated by reference herein for all that it discloses or teaches.

STATEMENT REGARDING FEDERALLY SPONSORED RESEARCH OR DEVELOPMENTS

This invention was made with government support under grant number 1739452 awarded by the National Science Foundation. The government has certain rights in the invention.

BACKGROUND

The field of soft robotics has been rapidly gaining traction due to the deformable and compliant nature of structural components of soft robots. These qualities allow for improved adaptability in unstructured environments when compared to the capabilities of conventional, rigid robots. Soft robots show promise with applications related to rehabilitation devices, wearable devices, implantable devices, surgical tools, manufacturing, and search-and-rescue technology, among other potential contexts. As the field has continued to grow over the past few decades, several methods of actuation have been proposed for soft robots, including electrostatic, hydraulic and microhydraulic, pneumatic, magnetic and electromagnetic, and shape memory alloy (SMA) based actuation. One type of actuator that has been proposed and that is referenced in the present disclosure are folded Hydraulically Amplified Self-Healing ELectrostatic (HASEL) Actuators. Example HASEL actuators are described in U.S. Pat. Pub. No. 2020/0032822, which is incorporated by reference in its entirety.

HASEL electrohydraulic actuators may present advantages in soft robotics because of an available high actuation frequency, large strains (e.g., of up to 124%), high peak power (e.g., greater than 600 W/kg peak specific power), and ease of manufacturing. In the domain of both traditional and soft robotics, integrating a reliable sensing mechanism with the actuation method is beneficial for the robot to interact with its environment. HASEL actuators have self-sensing abilities, which have been utilized to control a HASEL-powered robotic arm. In addition to using a capacitive self-sensing method, a high-speed camera, a laser position sensor, and a capacitive soft strain sensor have all been proposed in HASEL-based closed-loop systems. However, improved sensing capability for soft robot actuators is needed for new form factors and control methodologies.

SUMMARY

Accordingly, the present disclosure generally relates to a magnetic sensing system that may be utilized to sense actuation of a soft robotic actuator. The magnetic sensing system includes an electrostatic soft actuator comprising a flexible actuator body that is actuatable upon application of a drive voltage to the electrostatic soft actuator. The system also includes a magnetometer disposed relative to the electrostatic soft actuator for measurement of a magnetic field within a task space of the electrostatic soft actuator and a magnetic member disposed relative to the electrostatic soft actuator to undergo a displacement within the task space upon displacement of the electrostatic soft actuator within the task space to affect the magnetic field. The system also includes a control module in operative communication with the magnetometer. The control module is operative to generate a position characterization of the electrostatic soft actuator in response to the measurement of the magnetic field upon the displacement of the magnetic member within the task space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 17 illustrates example values for the effect of travel of an electro-hydraulic rolling soft robot based on various parameters.

Figure 27:
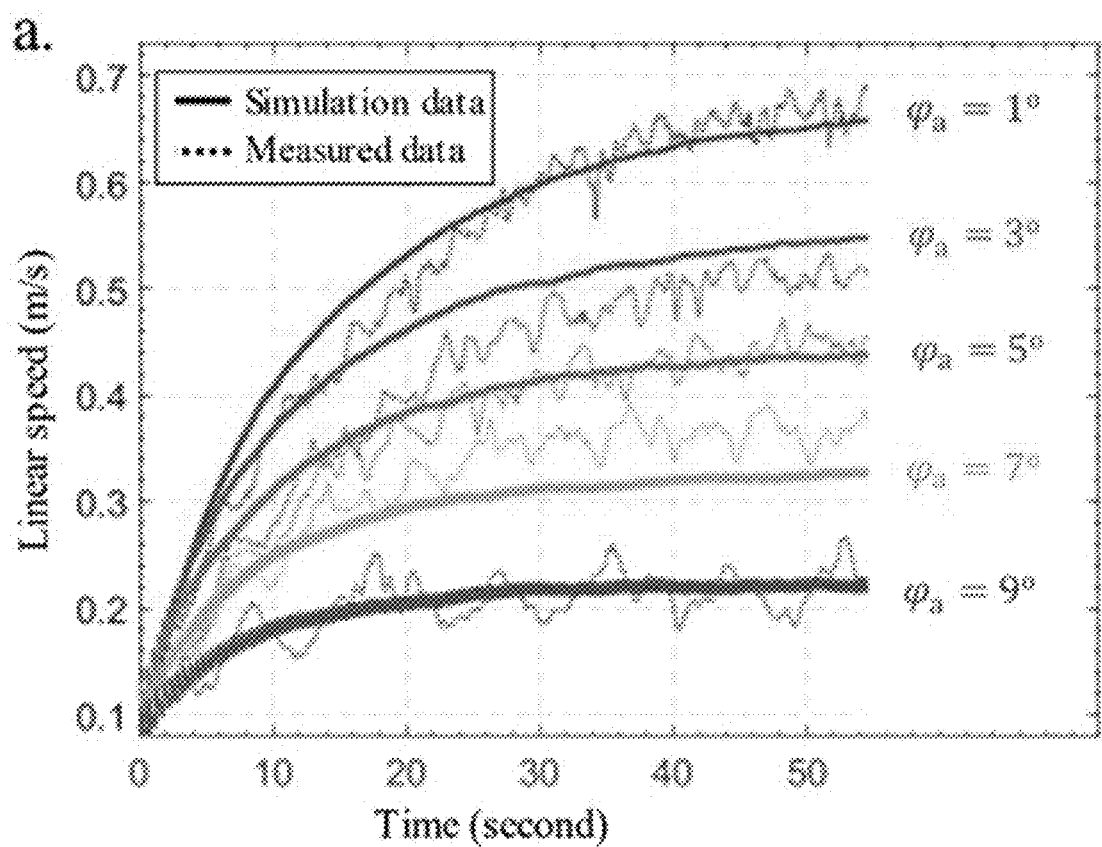
Figure 28:
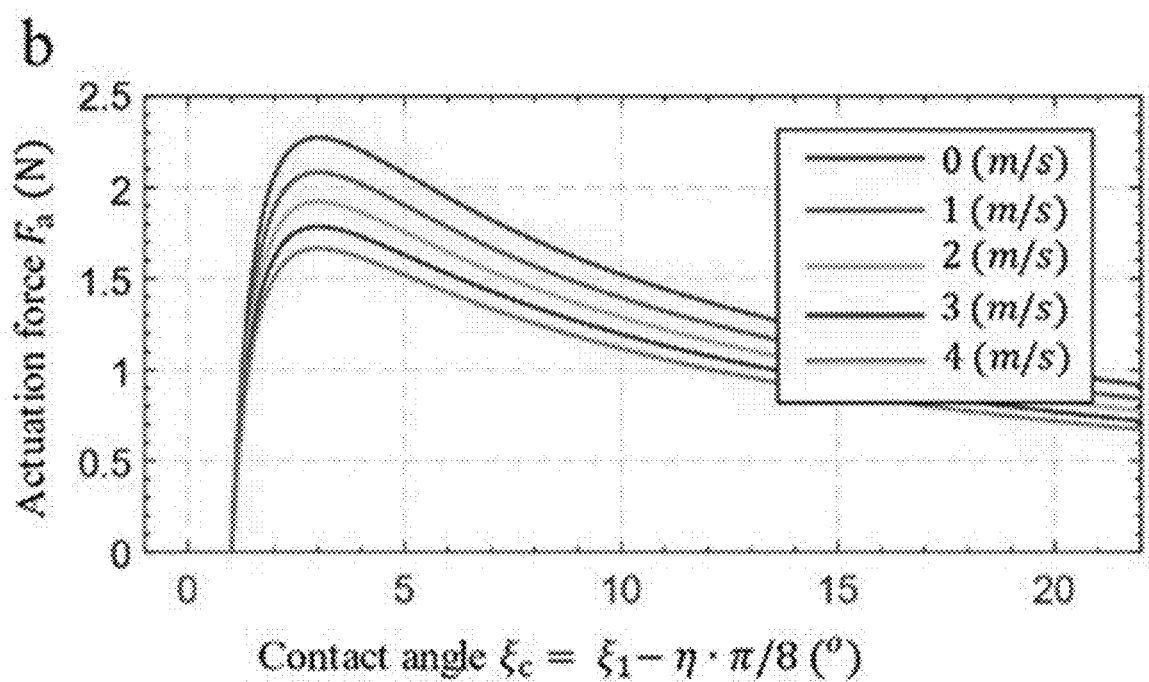

FIG. 27 illustrates an example evaluation of an estimated force function with a visual comparison between a simulated linear speed using a hybrid dynamic model and measured linear speed of an electro-hydraulic rolling soft robot using motion capture system FIG. 28 illustrates an example estimated shape of a force function with respect to an actuator's contact angle $\xi_c$ and a wheel linear speed.

Figure 29:
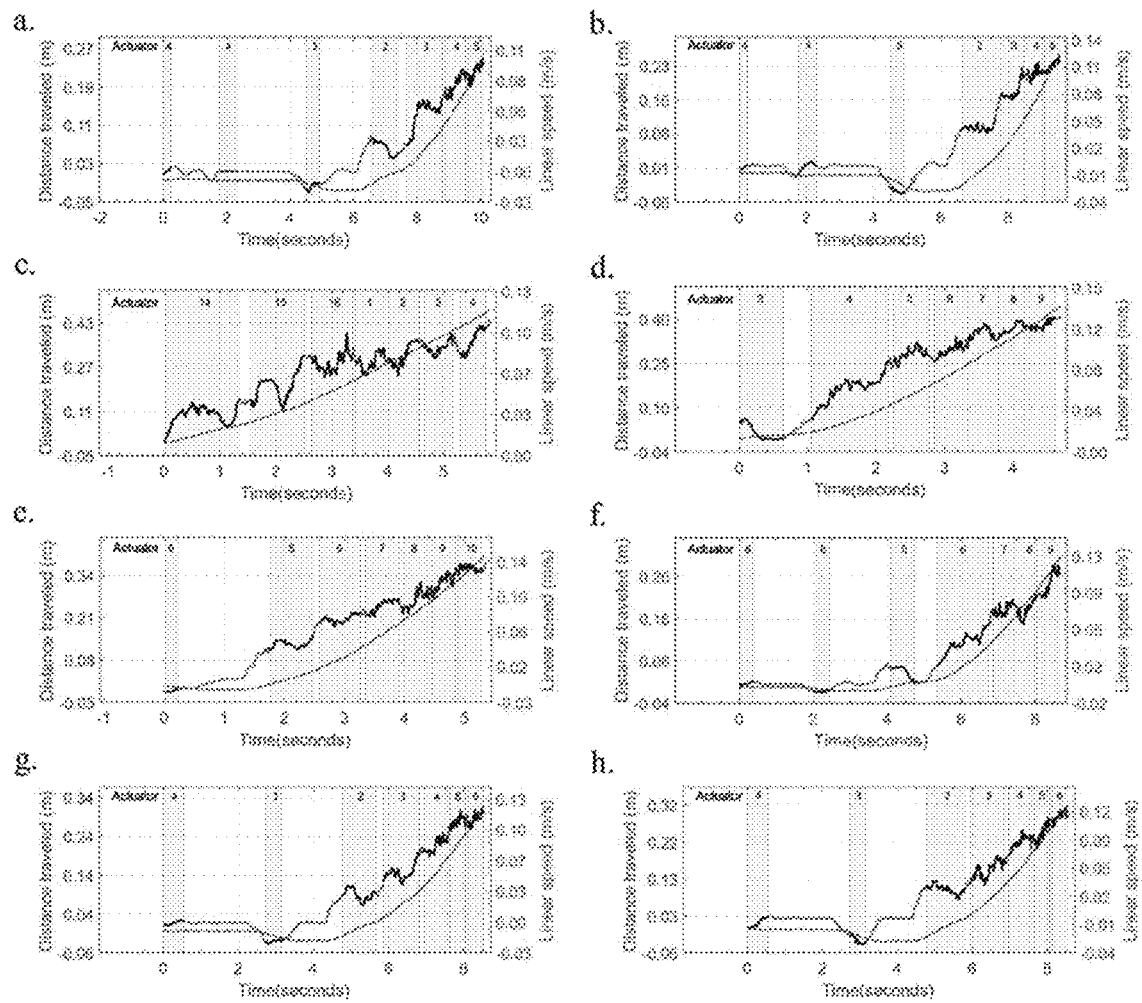

FIG. 29 illustrates rocking motion experimental results.

Figure 30:
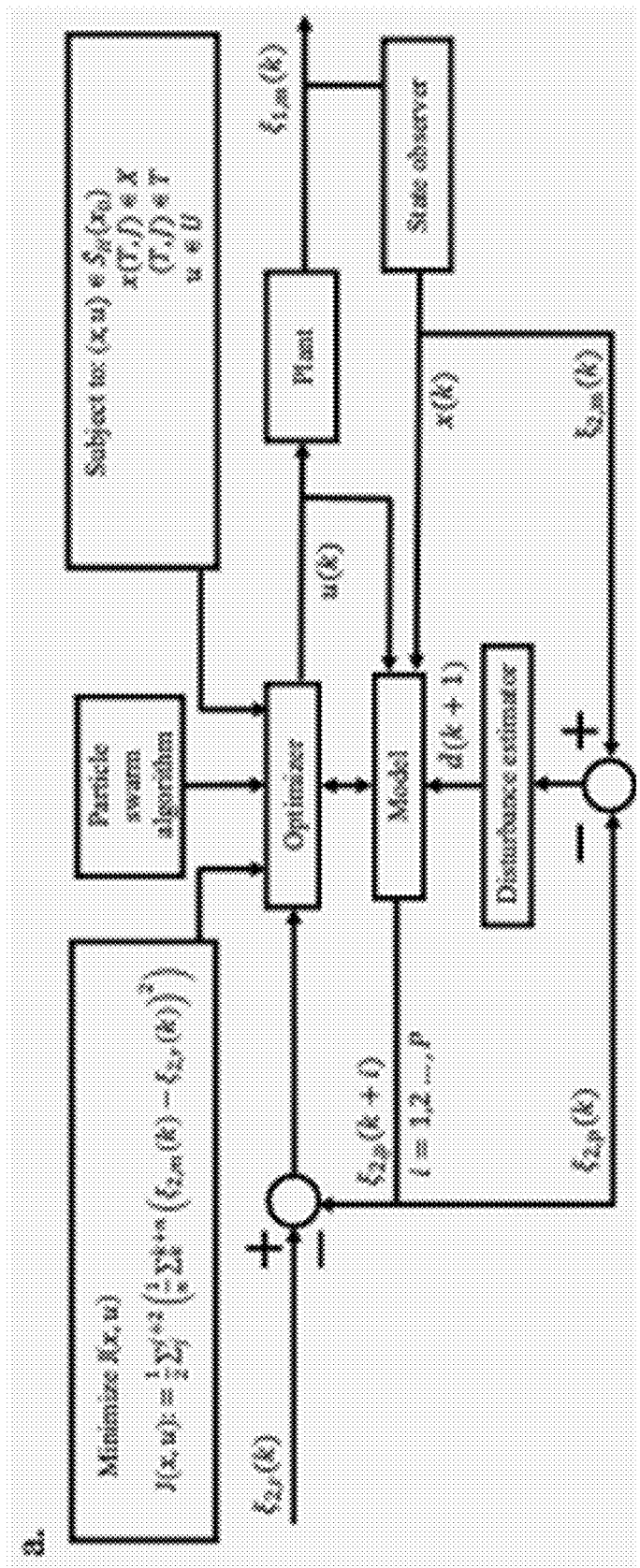

FIG. 30 illustrates an example block diagram of a model predictive controller (MPC) for an electro-hydraulic rolling soft robot.

Figure 31:
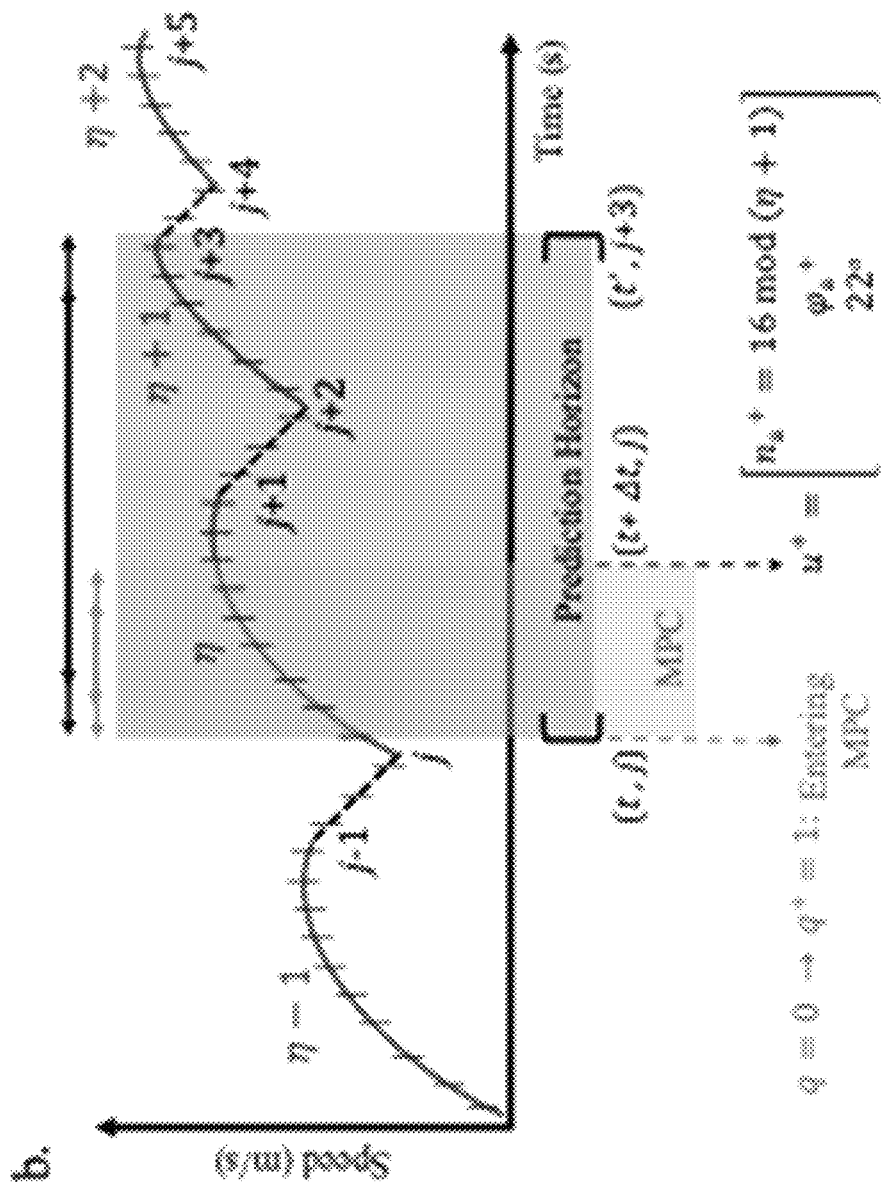

FIG. 31 illustrates an example of a snapshot of a typical MPC iteration for acceleration with respect to times t, jump steps j, and speed (m/s) of an electro-hydraulic rolling soft robot.

Figure 32:
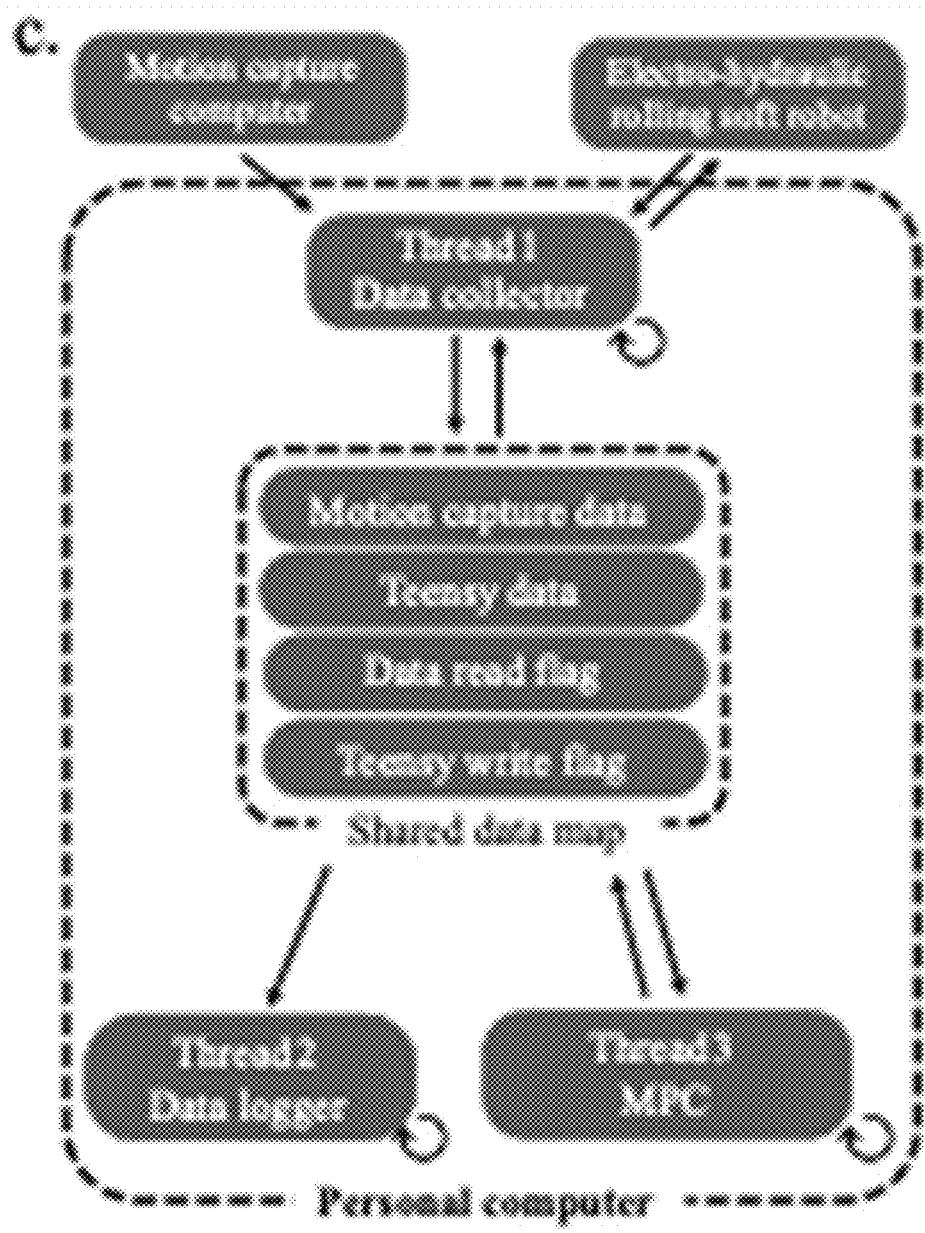

FIG. 32 illustrates an example of a real-time, multi-threaded implementation of an MPC controller for speed regulation of an electro-hydraulic rolling soft robot.

Figure 33:
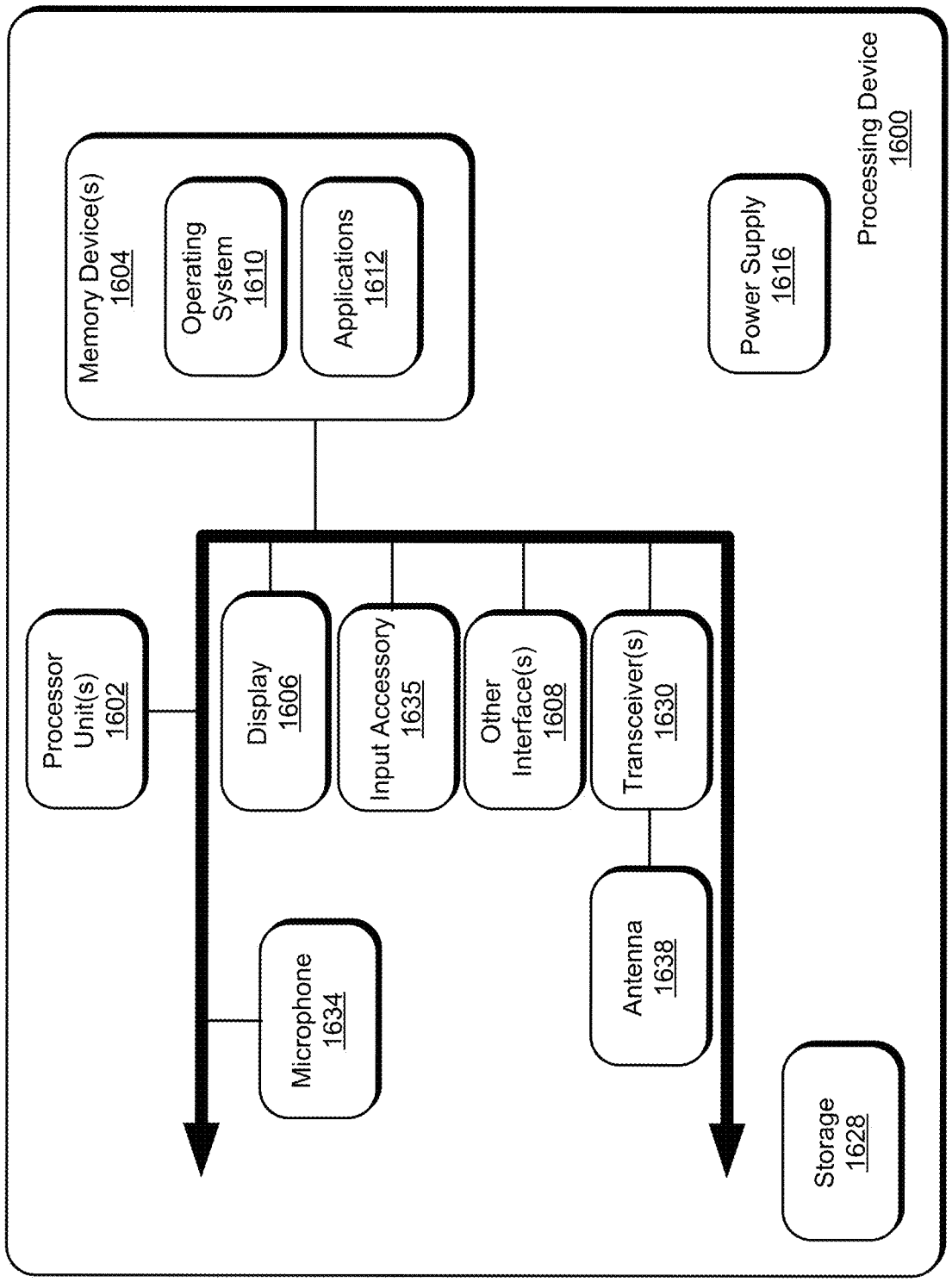

FIG. 33 illustrates an example processing device operative to execute aspects described herein.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

For many robotic applications, the sensing of robotic actuators may be used for controlling the operation of a robot. While previously proposed sensing mechanisms for robotic actuators have been proposed, when integrated in a system with HASEL actuators, each of the previously proposed sensing mechanisms, which are discussed below, all present several problems worth highlighting.

Initially, some remotely located, or "off-board" sensors, have been proposed rather than an "on-board sensor" that is disposed at the actuator or robot. For instance, on-board sensors may travel with the robot rather than being remote and not undergoing co-movement with the robot. Having on-board sensing is beneficial for creating compact, untethered systems. Therefore using off-board sensors, such as a high-speed camera or laser position sensor, are only useful for a single-actuator system in controlled, stationary environments.

On-board sensors have been proposed that include capacitive stretch sensors and/or self-sensing capabilities of HASEL actuators. However, developing on-board sensing mechanisms for HASEL actuators has proven to be difficult. Specifically, to reduce the coupled noise effects due to both a large electric field produced by folded HASEL actuators and pre-stretch of the sensor, proposed capacitive stretch sensors may require a low pass filter applied to the sensor signal. Furthermore, physical constraints may be required such as use of silicone blocks separating the sensor from the actuator. Thus, the accommodations needed to reduce noise in these sensors also reduce the overall performance of the actuator. The capacitive stretch sensor design is also specific to the actuator in use, which limits the versatility of the sensor as each sensor may be customized to a given actuator. Use of the self-sensing nature of HASEL actuators may only work for low-frequency applications in which actuation frequencies are less than about 3 Hz due to sensor lag. Additionally, both self-sensing and capacitive stretch sensors are difficult to use in a larger, multi-actuator system due to the complicated filtering methods and circuitry.

To facilitate improvements to at least some of the shortcomings of current sensing methods used for electrohydraulic actuators, such as HASELs, this disclosure discusses using a magnetic sensing approach to measure a change in shape of an actuator. The change in shape of an actuator may in turn be characterized as a position characterization of an actuator. One specific example may include measuring linear displacement of a folded HASEL actuator. HASEL actuators may be driven by a very low current, which emits a negligible magnetic field. By sandwiching an actuator between a magnetometer and a magnetic component changes in magnetic field strength may be mapped or otherwise correlated to changes in the actuator shape. The magnetic measurement systems described herein may be used at high frequencies and a high resolution. Moreover, a system may provide such measurement with sufficiently low levels of noise from the actuator and without a reduction in performance.

Figure 1:
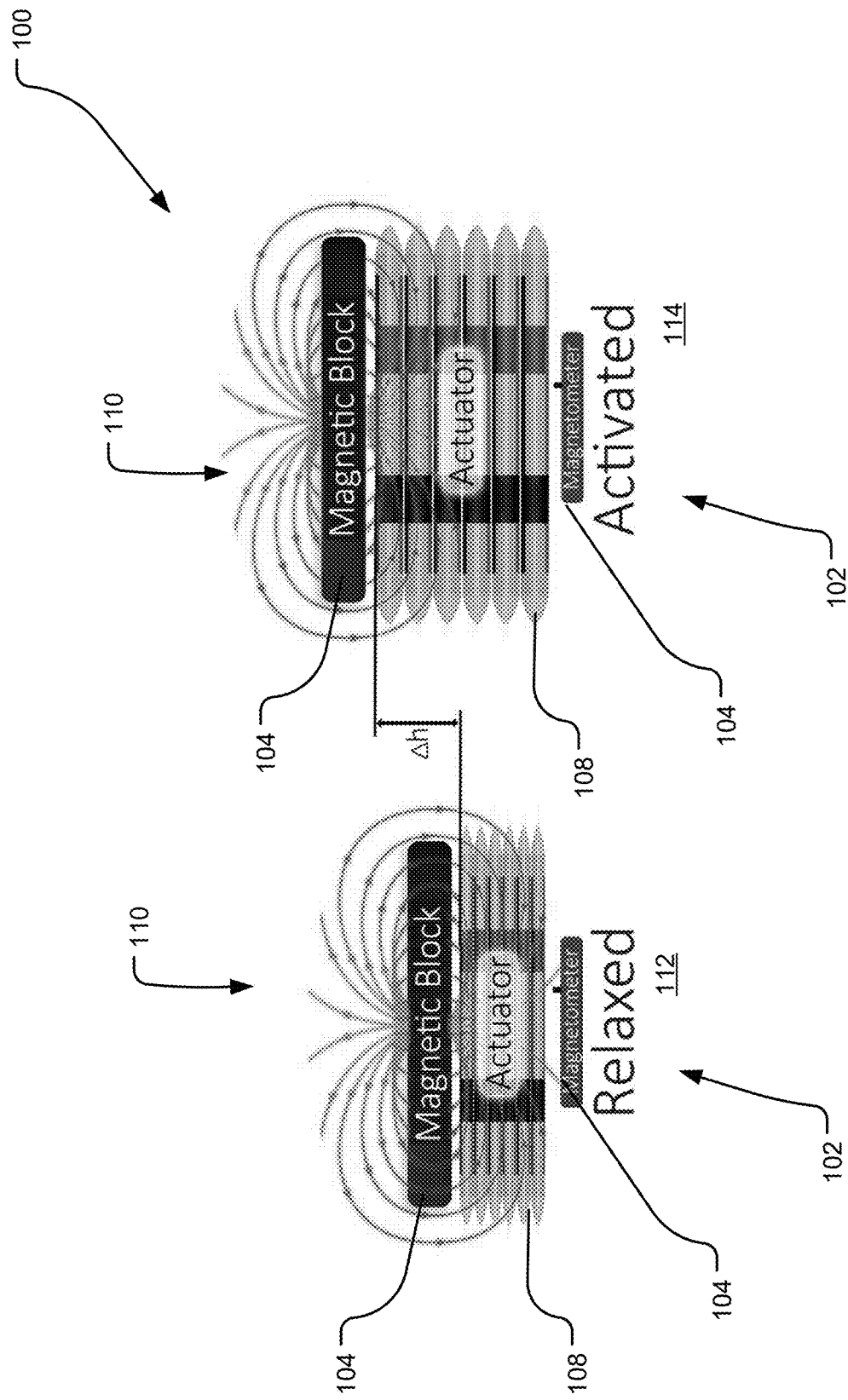
FIG. 1 illustrates an example of an actuator that includes a magnetic sensing mechanism that may be used to measure the change in height, $\Delta h$, of an electrohydraulic transducer.

One example of a magnetic sensing mechanism is a system 100 of FIG. 1. The system 100 exhibits excellent performance compared to previous on-board sensors used for folded HASEL actuators. In addition, the system 100 may be minimally affected or not affected by the electric field and charge leakage from the actuator body 108. One potential application of such a magnetic sensing system 100 may be controlling an end effector position of a HASEL-based tilting platform 300 shown in FIG. 3. In another example, the actuator may be a dielectric elastomer actuator (DEA) comprising an electrode pair separated by an elastomer dielectric. The operation and sensing of a DEA may be the same as that described herein with regard to a HASEL actuator.

While FIG. 1 illustrates measurement of linear actuation of an actuator body 108, there are other ways to relate the change in magnetic field strength to changes in distance or displacement between the magnetic component and sensor. The change in magnetic field strength can also be used to determine joint angles, proximity, and curvature. In the present disclosure, examples of sensing the change in deformation of an actuator disposed between a magnetic sensor and a magnetic component is demonstrated. This method may be used for any deformable object that does not depend on a high current. While the present disclosure specifically references folded HASEL actuators, the present application is not limited to use of the sensing techniques described herein to HASEL actuators. Using a magnetometer and soft magnetic substrates, changes in linear stroke of an actuator and end-effector position of a tilting platform comprised of folded HASEL actuators may be sensed as described in greater detail below.

FIG. 1 illustrates an actuator unit 102 that includes a magnetic sensing mechanism 110. The magnetic sensing mechanism 110 may comprise a magnetometer 104 and a soft magnetic block 106. FIG. 1 shows the actuator unit 102 in a relaxed state 112 in the left portion of the figure and in an activated state 114 in the right side of the drawing. As may be appreciated, the magnetic sensing mechanism 110 may be used to measure a change in height, Δh, of the actuator unit 102. In the illustrated example, the actuator unit 102 may include one or more electrohydraulic transducers 180. In this example, the transducer 180 may comprise a folded HASEL actuator.

Figure 2:
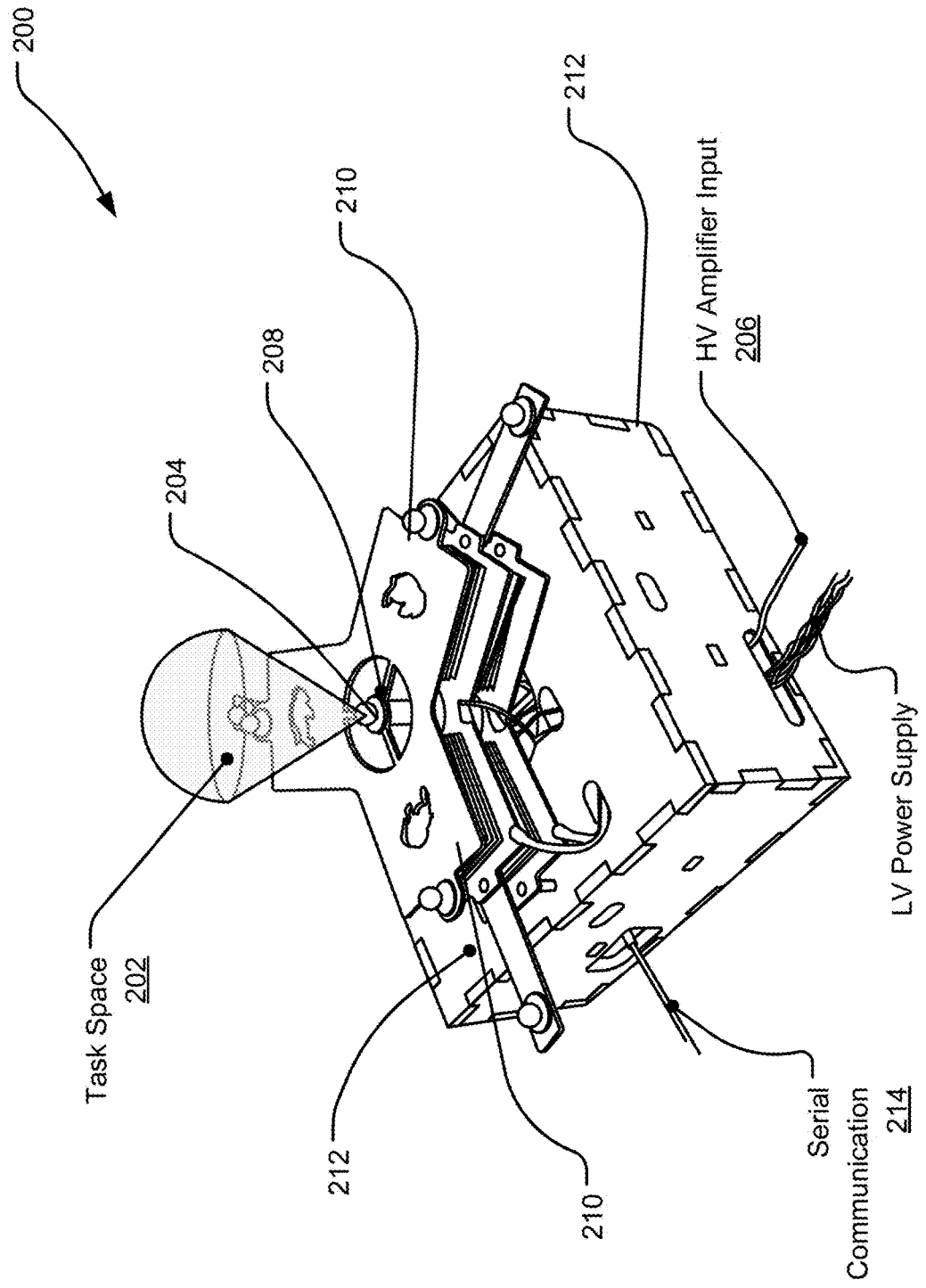
FIG. 2 illustrates an example of a 6-unit tilting robotic platform in a relaxed state and in a partially actuated state in which one actuator is activated.
Figure 3:
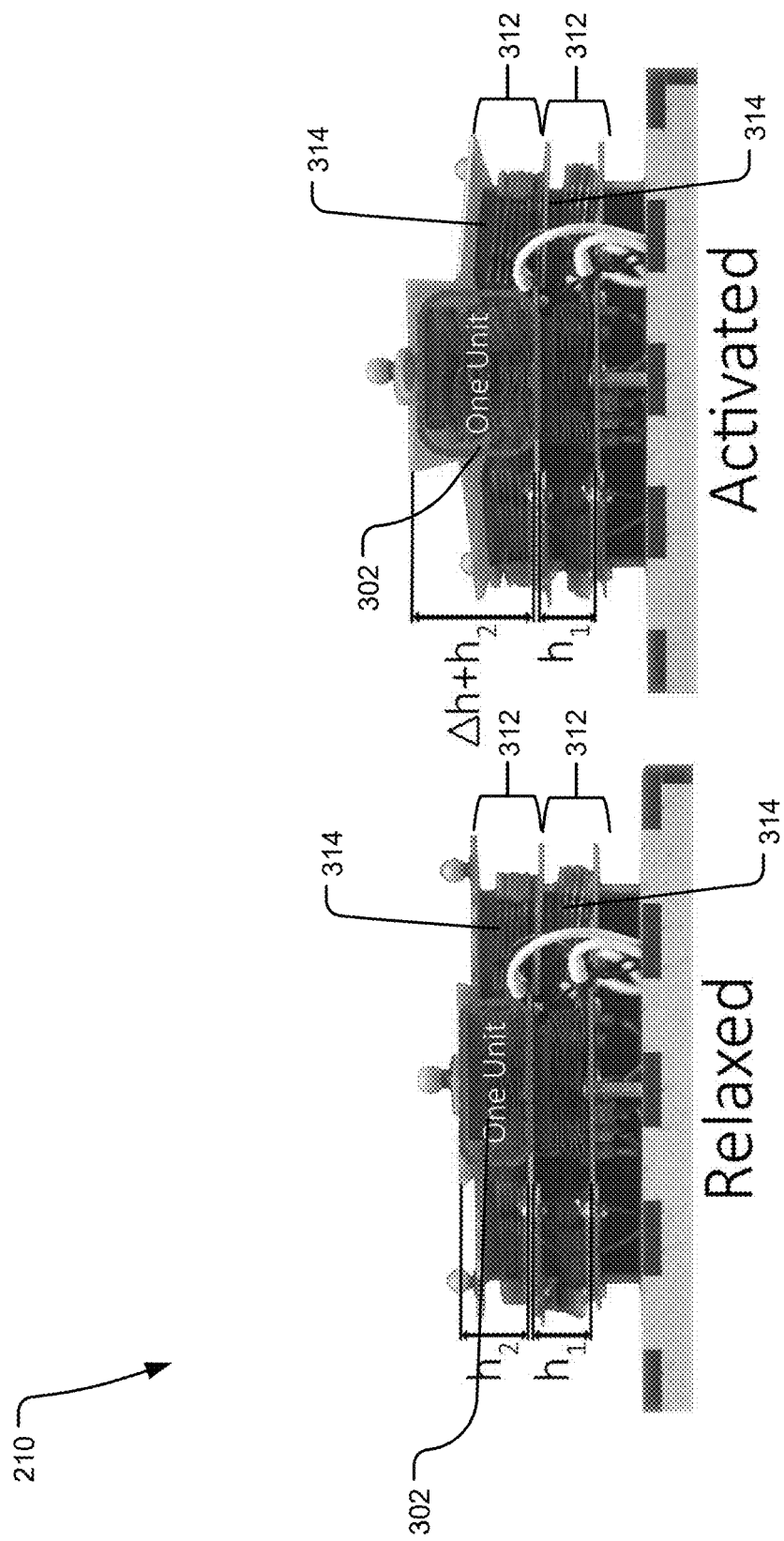
FIG. 3 illustrates an example robotic platform that is actuatable in a task space represented by a volume within which an end effector may be moved.

FIG. 2 illustrates an example robotic platform 200. The platform 200 may comprise six actuator units that are controllable for tilting robotic platform 200. The robotic platform 200 may be configured to allow for controlled tilting actuation of a platform 208. The platform 208 may include a tri-lobed configuration having a plurality (three in the illustrated example) of actuation portions 210. With further reference to FIG. 3, a side view of an actuator portion 210 is illustrated. Each actuation portion 210 may comprise a plurality of actuation units 312. Each actuation unit 312 may comprise actuators 314. In this regard, each actuation portion 210 may have two stages of actuation corresponding to actuation of one or both of the actuation units 210 in an actuator portion 210.

With returned reference to FIG. 2, a task space 202 may be defined that represents a volume through which an end effector 204 of the tilting platform 208 may be controllably moved. A high voltage (HV) amplifier (not shown in FIG. 2) may provide a power source to the platform 200. An HV amplifier input 206 may be provided to the robotic platform 200. As an example, the HV amplifier 206 may provide 8 kV to the system. Each of the actuation units 312 of the actuation portions 210 may be controlled by a microcontroller unit (MCU) that may independently actuate each actuation unit 312. The MCU (e.g., Teensy 3.6, PJRC) may be used to receive raw magnetic field strength digital data from a sensor comprising a magnetic sensing mechanism for each of the actuator portions 210. The magnetic sensing mechanism for each of the actuator portions 210 may be provided according to the example shown in FIG. 1 above. In an example, the raw magnetic field strength digital data may be received via a four-wire serial peripheral interface 214 communication protocol at a selectable resolution, range, and sampling rate up to 1 kHz.

The MCU may be mounted in a circuitry housing 212 of the robotic platform 200. The MCU may communicate to an external host (e.g., broader area controller such as a laptop or other computing device) via serial communication. The magnetic sensing mechanism may include a magnetometer (e.g., LIS3MDL, ST Electronics) on a Pololu breakout board to sense the change of the field generated by a magnetic block. The magnetometer and the magnetic block may be disposed on opposite sides of each actuator unit 314. For example, FIG. 1 may illustrate an example of an actuator unit 314. In this regard, a change in magnetic field strength along the actuation axis of the actuator 314 may be measured and correlated to a displacement between the magnetic block and the magnetometer of the actuator unit 314. The left portion of FIG. 3 illustrates each actuator unit 312 of an actuator portion 210 when relaxed. The right portion of FIG. 3 illustrates one of the actuator units 312 in an activated or actuated state. The height of the top platform (h2) is measured relative to the base of the top platform. The bottom platform height (h1) is measured relative to the stationary base.

As noted above, the present disclosure discusses use of folded HASEL actuators, although the disclosure is not so limited. In an example, a HASEL actuator may be comprised of twelve actuator pouches stacked on top of each other in order to create a displacement along a displacement axis when the pouches deform under an applied voltage. Two layers of polyester Lidding Film (e.g., L0WS, Multi-Plastics) may be heat-sealed together using a modified CNC machine (e.g., Shapeoko 3XL, Carbide 3D) to create separation of the individual actuator pouches. A thin flexible layer of conductive ink (e.g., CI-2051, Engineered Materials System) may be screen-printed on both sides of the sealed film before filling the pouches with a silicone liquid dielectric (e.g., PSF-5cSt, Clearco). Once filled and fully sealed using a soldering iron (e.g., WE1010NA, Weller), the string of actuator pouches may be folded using an accordion fold and secured using thin strips of transfer tape (e.g., 924, 3M).

Returning to the tilting robotic platform 200 shown in FIG. 2, the tilting robotic platform 200 may represent a proof-of-concept design that emulates a soft robotic manipulator whose motion is defined by a continuous "back-bone," rather than traditional manipulators with rigid joints. Linear and constant-curvature models may be provided for the tilting platform. It may be that three displacement measurements corresponding to the displacement of each actuator portion 210 may not be sufficient to estimate a six dimensional coordinate transformation of the end effector 210. As such, an additional constraint that deformations apply with constant curvature in each actuator may be utilized. That is, it may be assumed that the base of the segment is centered in the x-y plane, and that the segment itself has a radius b.

The voltage applied to each actuator 314 in the tilting platform 200 may be independently provided via a single power source. Components used for the example of the tilting robotic platform may include a power supply, a microcontroller, six magnetometers, six magnetic blocks, six high voltage switch boards, and six folded actuators. In this regard, the power supply may deliver a constant 8 kV supply to the platform 200. The voltage delivered to each actuator 314 may be varied by a corresponding high voltage (HV) switch board for each actuator 314. An output photoresistor may be provided at a fixed 15% duty cycle to improve the relaxation time of the actuators. The duty cycle of the input photoresistor varies based on the error between the measured height and the desired height of each actuator.

To establish a control scheme for the platform 200, motion capture information of the end effector 210 and sensor data may be used to map a change in magnetic field of each actuator 314 to a given position of the end effector 210 as determined using motion capture. In turn, parametric equations may be applied to get the height of the center of the actuator 314 instead of the height of the motion capture ball. An inverse cubic relationship may be used to get the mapping between magnetic data and end effector 210 position as the correlation may be slightly different for all the calibrations due to differences in manufacturing the magnetic blocks. That is, a characterization of the relationship between the various sensed magnetic fields of the actuator units 312 of the actuator portions 210 and the position of the platform 208 may be established such that the controller may achieve desired platform 208 by appropriately controlling the various actuator units 312.

Figure 9:
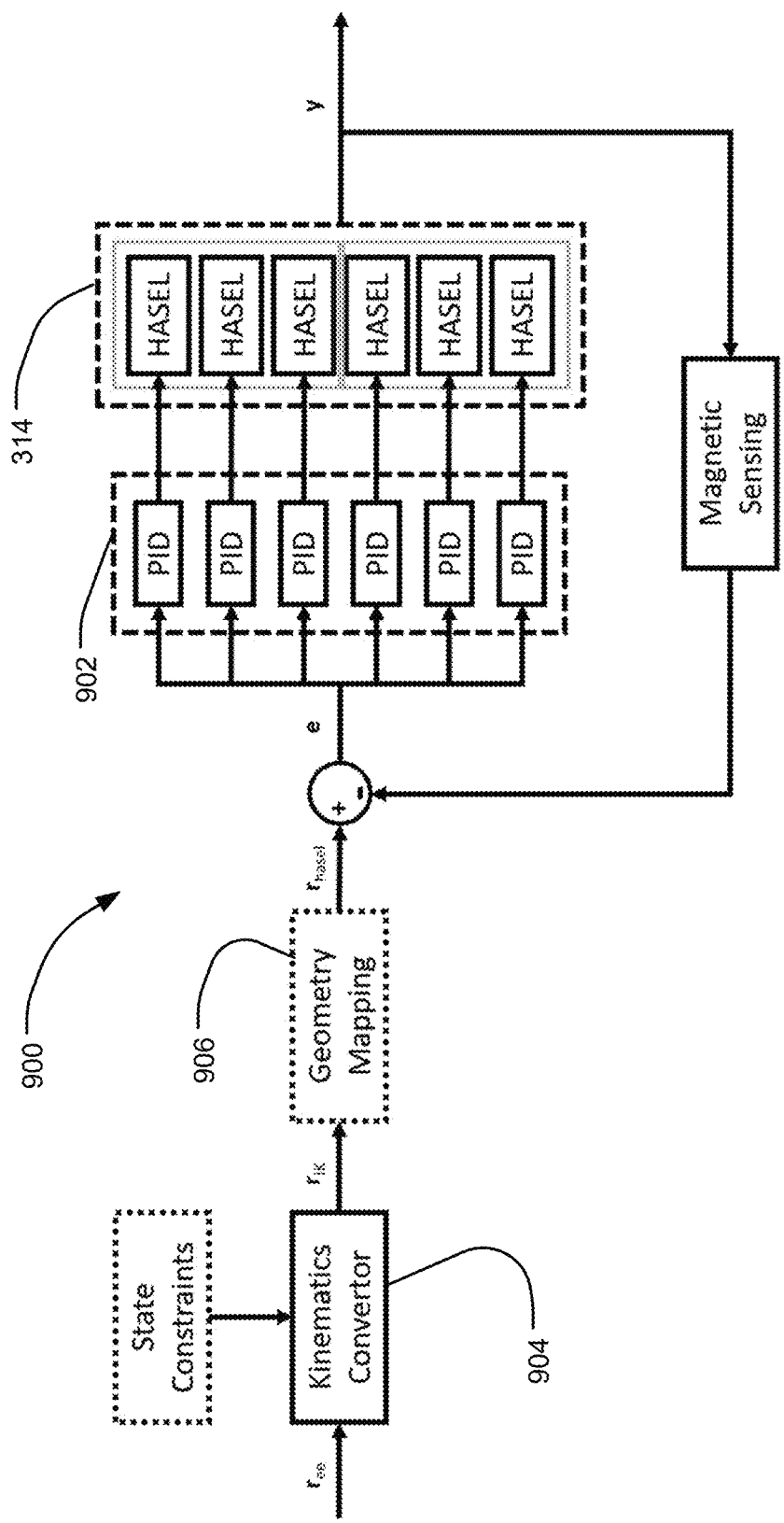
FIG. 9 illustrates an example control method for a tilting platform.

FIG. 9 illustrates an example control architecture 900 for a tilting platform such as that shown in in FIG. 2. In the control architecture 900, a proportional-integral-derivative (PID) controller 902 may be provided for each actuator 314 to provide local control of each actuator. In turn, a forward kinematics converter 904 may be used to create geometry mapping 906 (e.g., provided as a lookup table) of possible end-effector positions that the platform 208 can achieve. This may give the desired height of each actuator, which can then be independently controlled to output a pulse width modulation (PWM) signal to change voltage delivered to the actuator 314 and, in turn, the actuator height.

The magnetic sensor systems described herein may use a soft tactile sensor that includes a soft, flexible magnetic substrate instead of includes rigid permanent magnets. The intrinsic coercivity of a magnetic, soft substrate may not be as large as that of a rigid permanent magnet, which may limit the distance between the sensor and the magnetic component. However, using a soft substrate with embedded magnetic particles may improve the durability and robustness of the material compared to embedding rigid permanent magnets in a soft material. Using a soft substrate with magnetic particles may allow for any type of shape or thickness. In this regard, the shape or thickness of the soft substrate magnet may depend on the distance between the sensor and the magnetic material. This may be useful when using an array of magnetic sensors to localize an applied force on a continuous tactile surface.

Figure 4:
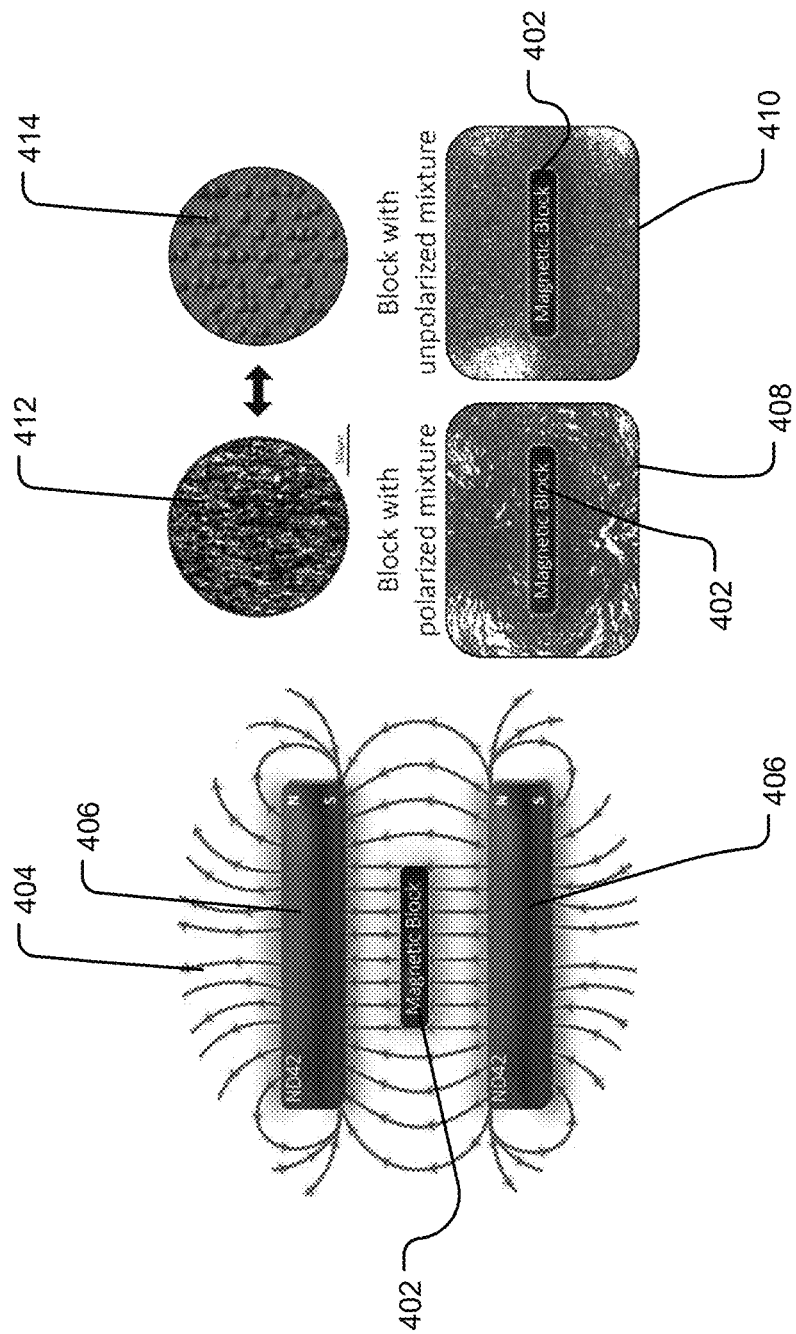
FIG. 4 illustrates an example of producing a magnetic block including an example schematic of the magnetic particles dispersed in the soft substrate.

FIG. 4 illustrates a soft, flexible magnetic substrate 402 and features of its manufacture. As shown in FIG. 4, to define the magnetic field orientation 404 of the soft magnetic block 402, one example includes use of a flexible material (e.g., Ecoflex-30) and a magnetic (e.g. NdFeB) powder mixture that may be placed in between permanent magnets 406 while curing. The permanent magnets 406 may be Neodymium-42 (ND42) magnets. An example schematic 408, 410 of the magnetic particles dispersed in the soft substrate compared to x-ray microscope images 412, 414 of a sample of a magnetic block 402 is further illustrated. When the soft magnetic block 402 cures in the setup shown in FIG. 4, the mixture becomes polarized and retains a baseline remanence magnetization. When the block 402 is placed under a layer of iron fillings, the fillings align with the magnetic field produced by the block 402, shown in the image 412. When the block does not have polarized mixture, the fillings do not move, shown in image 410.

In this regard, the magnetic components of the sensing mechanism may comprise flexible, silicone blocks (e.g., Ecoflex 00-30, Smooth On) suffused with bonded neopowder (e.g., NQP-B+20441, Neo Magnequench). In a first step, the Ecoflex Part A and Part B rubbers may be hand mixed using a 1:1 weight ratio. After mixing the Ecoflex 00-30 for approximately 30 second, 1.67 wt. % of neopowder may be added and mixed with the Ecoflex 00-30. Once most of the powder is roughly distributed in the Ecoflex 00-30, the mixture may be placed into a planetary mixer (e.g., ARV-310, Thinky). The mixture may be degassed in a vacuum (~0.2 kPa) for 1 minute, then mixed at a speed of 2000 rpm for 30 s, before the speed decreases to 200 rpm at 10.5 kPa for 1 min.

After the mixing and degassing process is complete, the power may be fully shear-mixed into the Ecoflex 00-30. The mixture may be poured into an acrylic mold with the desired dimensions. For example, a 5 mm thickness may be chosen to level the change in height of the foldable HASEL and properly separate a capacitive stretch sensor from the actuator as described in greater detail below. While using neopowder in Ecoflex 00-30 may allow for a thinner material than just embedding a Neodymium magnet in a silicone substrate, a block 402 was desired that was sufficiently heavy to level out the stroke of the folded HASEL actuator, while still maintaining mechanical integrity. However, other configurations of magnetic sensors may be used without limitation.

After filling the mold with the mixture, the mold may be placed in the center of two permanent magnets (e.g., CMS Magnetics) spaced 5 cm away from each other. The mixture may be cured for about 2.5 hrs before being removed from the acrylic mold. This process, shown in FIG. 4 may polarize the particles in the mixture as the Ecoflex 00-30 cures, creating an isotropic distribution of particles in a N-S orientation. The magnetic field strength 404 of the block may remain fairly constant once the block 402 is removed from the curing setup. If the magnetic block 402 is cured outside of the described setup, then the magnetic field 404 may be negligible compared to resulting baseline magnetic remanence of the block 402 cured in between the permanent magnets. The average magnetic field strength 404 may be 8600 mG, and the average weight of the block 402 may be 10 g.

After having described examples of how a magnetic sensing mechanism may be used to characterize actuator actuation, it may be useful to understand how measurement resolution of the actuator displacement changes as a function of distance between the magnetometer and the magnetic block. Specifically, this may be characterized for displacements beyond the folded HASEL actuator's maximum height. This information may be indicative of how the resolution will change for a variety of actuators with varying maximum heights. Therefore, a fully mechanical stand 500 was designed to change the distance between the sensor 502 and the block 504 at sub-millimeter increments as shown in FIG. 5.

Figure 5:
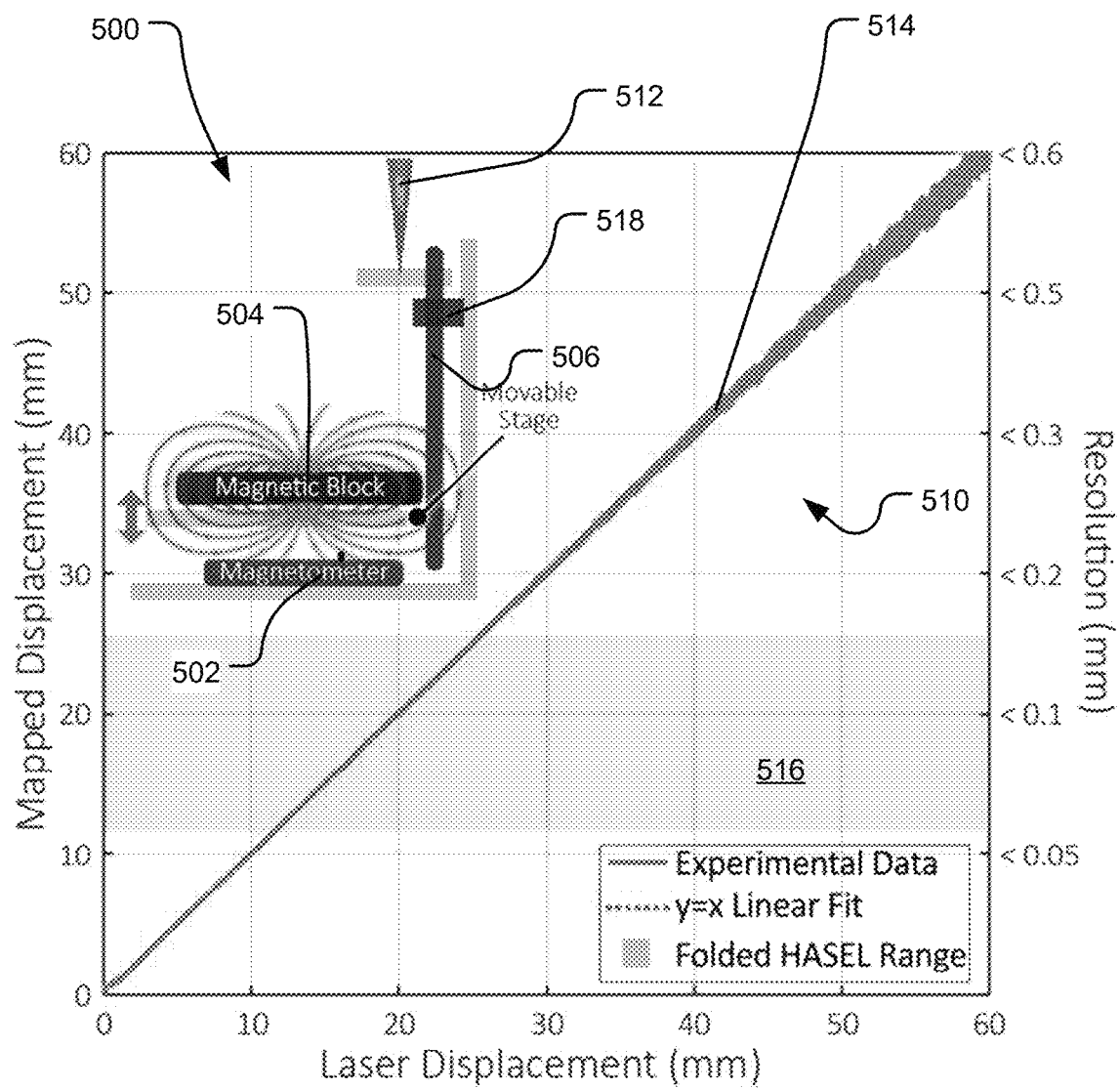
FIG. 5 illustrates example data from a laser position sensor and mapped displacements from changes in a magnetic field strength illustrating a closely aligned linear fit.

FIG. 5 also illustrates example data 510 from a laser position sensor 512 and mapped displacements from changes in magnetic field strength. The data illustrates that the laser position sensor 512 and mapped displacements closely align with a linear fit having an R2 value of 0.9994. The linear fit is represented by the dotted line 514. The right y-axis shows the changes in resolution as the distance between the sensor 502 and magnetic block 504 increases. The highlighted section 516 highlights a distance range over which a folded HASEL actuator may be operated to create the distance between the magnetic block 504 and the sensor 502.

With further details regarding the mechanical stand 500 used to produce the data in FIG. 5, the stand 500 may include 3D printed materials, acrylic sheets, aluminum, and stainless-steel components to prevent distortion to the registered magnetic field strength. The magnetic block 504 may be placed on a laser-cut acrylic sheet attached to an aluminum block, which moves vertically along a stainless-steel lead screw 506. Two pillow block bearings (not shown) may support the lead screw 506 to minimize any horizontal movement as the magnetic block 504 is moved along the lead screw 506. To move the magnetic block 504 at 0.1 mm increments, a 3D printed three-gear system 518 with a 20:1 turn ratio attached to a manual hand crank may be provided.

The sensor 502 may be mounted directly below the center of the magnetic block 504 and data may be read by a MCU (e.g., Teensy 3.6, PJRC, not shown). The laser position sensor 512 (e.g., LK-H157, Keyence) may be used to track the movement of the magnetic block 504 and measure the change in distance between the magnetic block 504 and sensor 502 for validation of the magnetic readings. The output voltage of the laser position sensor 512 may be sent through a 12-bit ADC on the MCU and scaled at a value of 1 V:5 mm. The units of the data 510 may include time in microseconds, magnetometer data in milligauss, and the laser position sensor in millimeters, which are all sampled at 1 kHz.

The data 510 comprises ten tests conducted by moving the magnetic block 502 from a distance of 2 mm away from the sensor 504 to a distance of 25 mm away at both 0.05 mm and 0.1 mm increments. The data also includes ten more tests conducted by moving the block 502 at 0.1 mm increments from 2 mm to 60 mm.

In turn, a characterization relating the sensed magnetic field and the displacement may be created. The magnetic field strength along the z-axis may be mapped to the change in vertical distance using a least squares polynomial curve fitting function.

Evaluation of the fit of the resulting curve that corresponds to mapped displacement and magnetic field may be provided. Based on the magnetostatic theory, it is reasoned that the change in distance would have an inverse cubic relationship with the change in magnetic field strength. The resulting $3^{rd}$ degree polynomial was:

$$h = p_3 \times B_z^3 + p_2 \times B_z^2 + p_1 \times B_z + p_0$$

where h is the height between the block 504 and the sensor 502 in mm, Bz is the change in magnetic field strength along the z-axis in mG, and the polynomial coefficients [$p_3$, $p_2$, $p_1$, $p_0$] are [$-9.332 \times 10^{-10}$, $1.041 \times 10^{-5}$, $-0.044$, $85.618$] for the example test. Fitting this polynomial to obtain displacement data from the magnetometer data resulted in an R-squared value of 0.9959, demonstrating a good fit and accurate measurement. For validation, FIG. 5 compares the average of the laser displacement data with the average of the mapped displacement data based on the sensor output. The normalized root mean squared error (RMSE) and resolution for each 10 mm section are noted in Table 1.

TABLE 1

Average $R^2$ and resolution data for 10 mm heigh increments

| Distance | Average $R^2$ | Average Resolution |
|---|---|---|
| 0-10 mm | 0.9980 | 0.047 |
| 10-20 mm | 0.9968 | 0.062 |
| 20-30 mm | 0.9986 | 0.125 |
| 30-40 mm | 0.9989 | 0.271 |
| 40-50 mm | 0.9953 | 0.416 |
| 50-60 mm | 0.9876 | 0.592 |

The baseline height of a folded HASEL is about 11 mm, which determines the baseline gap between the magnetic block 504 and the sensor 502. As the actuator height increases to its maximum height, then the distance between the magnetic block 504 and the sensor 502 subsequently increases to a maximum distance of about 23 mm. Based on the actuator's resting height and fully actuated height, an optimized range 516 that the magnetometers needed to sense a change in magnetic field strength at a high resolution is determined, which is shown as the shaded portion 516 in FIG. 5. Within the range of the folded HASEL actuator, the sensing mechanism can reliably measure changes in height with a resolution of about 0.1 mm, which is suitable to track the movement of a folded HASEL actuator.

Figure 6:
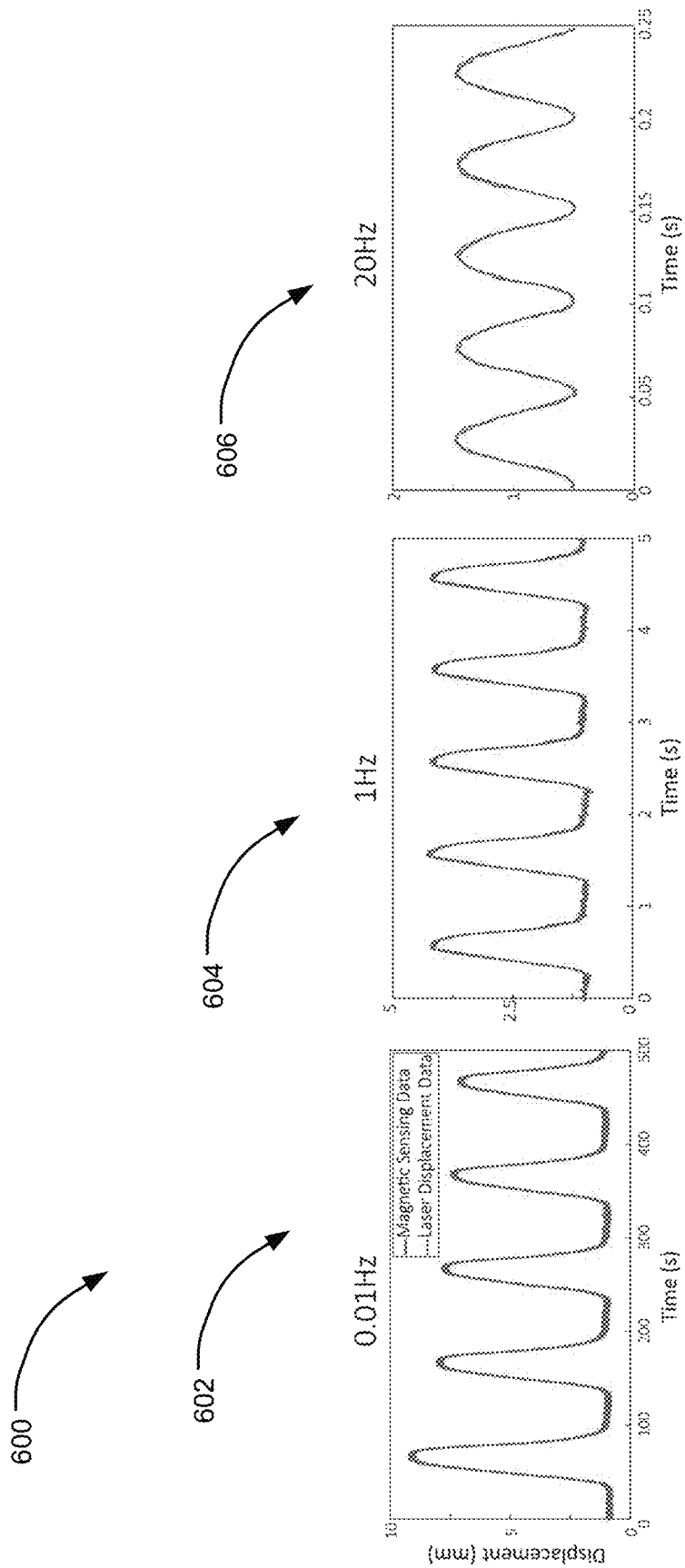
FIG. 6 illustrates example results from a plurality of frequency tests in which a sinusoidal wave is applied to an actuator.
Figure 7:
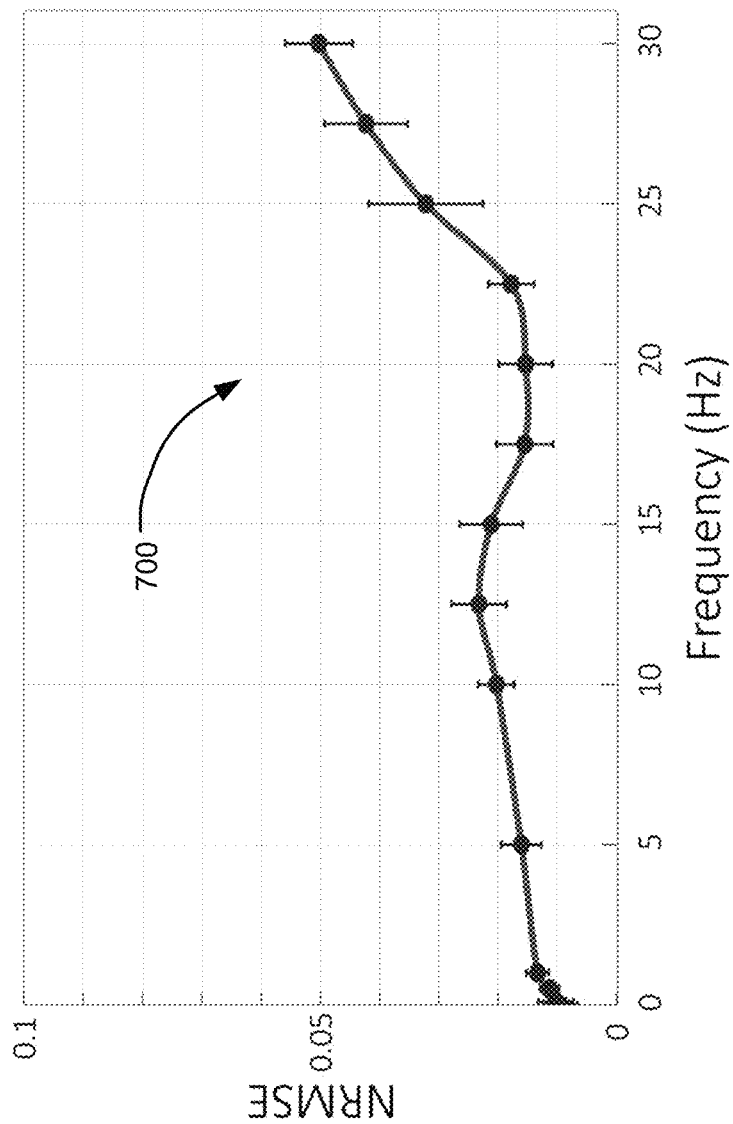
FIG. 7 illustrates an average normalized root mean squared error (NRMSE) of a frequency test.

In addition, a magnetic sensing system such as those described above was tested for determining performance at different drive frequencies of the actuators. FIG. 6 illustrates results 600 for a plurality of frequency tests 602, 604, and 606. In each test, a sinusoidal wave is sent to an example folded HASEL actuator, which was placed on top of a magnetometer and under a magnetic block. As the actuator moved from a relaxed state to an activated state and back, a laser position sensor measured the change in height by probing the top of the magnetic block. Examples of the mapped magnetometer data superimposed on the laser displacement data when 0.1 Hz (602), 1 Hz (604), and 20 Hz (606) sinewaves, offset by 4 kV with an amplitude of 8 kV, were the voltage input to the actuator. FIG. 7 illustrates average normalized root mean squared error (NRMSE) 700 over forty-five cycles per frequency, with the error bars representing one standard deviation of uncertainty. As may be appreciated, the high correlation between the sensed magnetic position and the validated laser displacement illustrates highly accurate position determination using the magnetic sensing system across the various frequencies.

Because HASEL actuators operate on low current, it is expected that the output of the magnetic sensing mechanism may be independent of the current driving the folded HASEL actuator. Therefore, the magnetometer is preferably able to accurately measure the change in height of an actuator receiving a high voltage (HV) sine wave input at varying frequencies by tracking the change in magnetic field strength. The mapped displacement data 600 from the magnetic sensing method is compared to the laser position sensor data while the block is placed on top of the active HASEL actuator. The input voltage was sent through a waveform generator (e.g., 33509B, KEYSIGHT) to a high voltage amplifier (e.g., TrekModel 50/12, TREK), which attached to the electrodes of the actuator.

In further validating the performance of a magnetic sensing system, tests to determine the affect by changes in the environment were performed. Such changes may be due to the material properties of most soft sensors. It may be desired to verify that temperature and humidity changes in the environment do not affect the readings from the magnetometer. Accordingly, a series of tests were performed in different environmental conditions; the ambient temperature and relative humidity around the test setup are measured using a low-power humidity and temperature sensor evaluation board (e.g., HDC1080EVM, Texas Instruments). To vary the ambient temperature and relative humidity, table fans, heat guns, and/or humidifiers are used, allowing the temperature to range from 18-56° C. and the relative humidity from 3.1-53.2%.

The input voltages were defined by 4 kV offset sine waves with a 4 kV amplitude and frequencies that ranged from 0.01 Hz-30 Hz. The laser displacement data and the magnetic field strength data were sampled at 1 kHz using an MCU (e.g., Teensy 3.6, PJRC), which sends data to a computer via serial communication. The TREK was turned off between each test to reduce or prevent the charge retention in the HASEL from compounding, effectively limiting the maximum stroke of the actuator. A thin, 100 um, Ecoflex sheet was placed around the magnetic block and the actuator to reduce or prevent the magnetic block from shifting off the top of the actuator as it moves at high frequencies. The laser position sensor probed the center of the magnetic block to accurately record the movement of the block on top of the actuator. It was found the magnetic sensing method is able to sufficiently monitor the movement of the actuator, even at larger frequencies when the actuator barely moves.

FIG. 7 further illustrates the comparison of the laser position data and the mapped magnetic sensor data for a few frequencies, as well as the normalized root mean squared error (NRMSE) at each frequency. Five cycles from each of the nine tests were analyzed for each frequency. While the residual error slightly increases with frequency, the NRMSE values never exceed 10%. The minimal standard deviations of uncertainty, shown in FIG. 7, indicate that the results per day are very similar, despite the environmental changes.

As noted above, capacitive stretch sensors have been proposed for use as on-board sensors of soft robotic actuators. However, given the susceptibility of such sensors to noise, it has been found that the magnetic sensing systems described herein provide benefits. However, it was desired to compare the magnetic sensing method to a capacitive stretch sensor to quantify the relative performance of such sensors.

Figure 8:
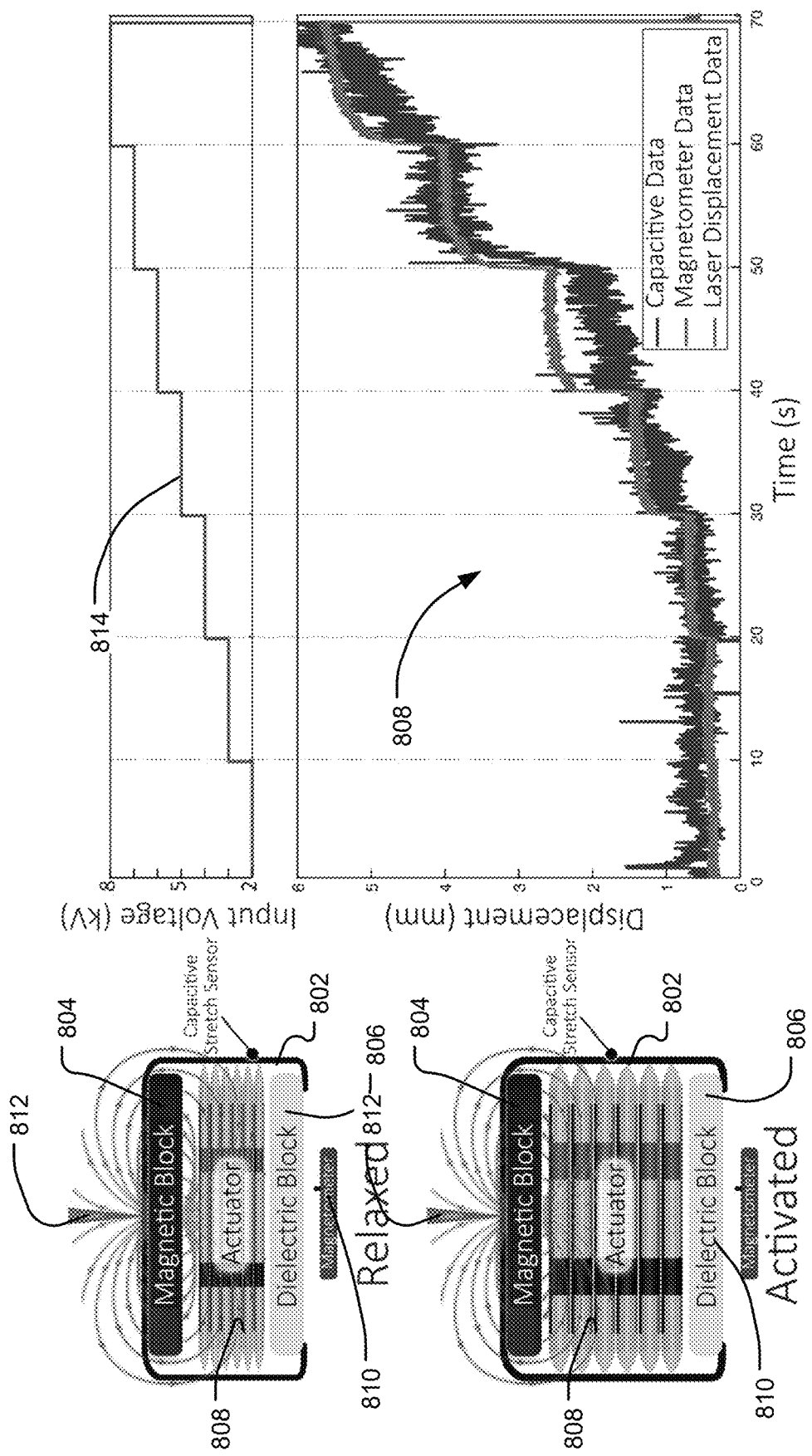
FIG. 8 illustrates an example input voltage applied to an actuator and corresponding displacement data.

As such, FIG. 8 illustrates results 800 of operation of an example capacitive stretch sensor 802 wrapped around a magnetic block 804, a dielectric block 806, and a folded HASEL actuator 808 before being placed relative to a magnetometer circuit 810. When activated, the capacitive stretch sensor 802, magnetometer circuit 810, and laser position sensor 812 all measure the change in actuator stroke. FIG. 8 illustrates an input voltage 814 sent by the high voltage (HV) amplifier to the actuator as a series of 1 kV steps moving from 2 kV to 8 kV every 10 s. The corresponding displacement data 800 measured by each respective sensor highlights the improvement between using the magnetic sensing mechanism compared to the capacitive stretch sensor.

It was desired to directly compare the magnetic sensing method's ability to track the movement of the folded HASEL actuator with the capacitive stretch sensor's ability to highlight the improved results. A capacitive stretch sensor 802 is wrapped around a folded actuator 808 sandwiched in between the magnetic block 804 and a 5 mm dielectric block 804 (e.g., DragonSkin30, SmoothOn). The dielectric block 804 is the same dimension as the magnetic block 804 and placed under the actuator to separate the capacitive stretch sensor 802 from the actuator 808. This added space from the dielectric block 804 helps reduce the coupled noise between the stretch sensor 802 and the actuator 808. A 555-timer circuit and second-order low pass filter is used to measure the output square wave of the 555-timer circuit, which is directly related to the change in capacitance of the capacitive stretch sensors. An MCU (e.g., Teensy 3.6, PJRC) measured the on-time in milliseconds of the output square wave in tandem with the change in magnetic field strength in milligauss and the laser displacement data in millimeters. This data was timestamped in microseconds and sent to a computer via serial connection and is plotted as data 808. The input to the actuator is a series of 10 s step functions starting at 2 kV and increasing by 1 kV to 8 kV. This input is sent to the actuator through the high voltage amplifier.

Thus, while capacitive stretch sensors have been proposed for use in soft robotic applications to look at deformations of an actuator or a surface, the noise shown in FIG. 8 represents a significant drawback in use of such sensing. That is, the magnetic sensing mechanism outperforms the capacitive stretch sensor that has been proposed for measuring the change in height of the actuator. FIG. 8 shows the visibly larger noisy data from the capacitive stretch sensor compared to the magnetometer signal, despite the low-pass filter used for the stretch sensor data. The NRMSE for the magnetic sensor is about six-times smaller than that of the capacitive stretch sensor, indicating a better fit between the mapped magnetometer data and the laser position data over the displacement range. Additionally, the capacitive stretch sensor did not register changes in displacement when the actuator height increased by 1 mm from the resting height, despite the pre-stretched resting state of the stretch sensor. The capacitive sensor might also shift on the actuator, causing discrepancies in the mapped data seen at the fifth step around 3 mm in FIG. 8. At the lower voltage inputs, the capacitive stretch sensor does not register the slight changes in displacement of the actuator, while the magnetic sensing mechanism data traces the data from the laser displacement sensor.

Other robotic form factors may also utilize HASEL actuators and the magnetic sensing approach described herein. For example, a rolling robot may be provided as described in detail below. Unlike other robotic locomotion methods including legged, crawling, and hopping, rolling locomotion exhibits high degree of mobility, inherent stability, and self-recovery from collision; also, rolling is much more energy-efficient, since a rolling robot does not need to expend energy lifting up its body for movement. In addition to these inherent advantages, rolling may improve a robots' abilities to carry payloads, provide protections to internal electrical and mechanical components, and navigate difficult environments. Such favorable traits make robotic rolling locomotion a widely investigated subject for space exploration, search and rescue, and military applications.

Robots with rolling locomotion can be further categorized based on three operating principles. The most popular form of rolling is shift of the center of mass (COM) of a wheel or sphere away from its neutral position, causing the wheel or sphere to fall in that direction and thus roll along. These robots are commonly characterized by rigid cylindrical or spherical outer shell and internal components such as gears, servos, and motors, which allows for simple design, modeling, and control. While the robots achieved great speed to size ratio. their ability to navigate on uneven surfaces or absorb collision energy have not been demonstrated.

Another cohort of rolling robots are distinguished for the ability to deform their geometry to induce the rolling motion. A notable subclass of these designs is rolling of tensegrity structures that has been targeted for space exploration research. These designs are often characterized by their modular links (rigid or not) that can interact with one another to create global deformed shapes for rolling. Geometry-deformable rolling robots have demonstrated single-mode (only rolling) and multi-mode (rolling and hopping) locomotion, which is useful for navigating through rough terrain and tall obstacles. Some designs incorporate semi-rigid links to further allow for impact energy absorption capability. However, due to the structural intricacy, most robots with deformable geometry require more complex designs, fabrication procedures, and kinematic and dynamic models, thus making the systems difficult to control.

Finally, several developments of rolling robots have been based on local activation of the robots' shell elements. These designs often have soft shell segments that can independently protrude and generate forces that propel the robots forward. Among the previous works on rolling robots, soft robots have bodies made from intrinsically soft and extensible materials that can deform and absorb much of the energy arising from a collision. A completely soft and deformable robot may be a desirable platform for traversing unrehearsed terrains. Therefore, the main advantages of soft robot which is relevant to locomotion may be its ability to absorb impact energy and the ability to conform to the surface at contact thus improving stability on rough terrain. Compared to geometry-deformable rolling robots, whose dynamics are fully discrete by design, shell-bulging soft robots are hybrid dynamical systems whose inputs are discrete and output velocities are continuous. Despite the interesting dynamics and mentioned inherent advantageous traits, most shell-bulging soft robots are pneumatic-based, hydraulic-based, shape-memory-alloy-based, and electrostatic-based, which have significantly low power-to-weight ratio due to bulky external driving components; these robots therefore may be limited in terms of fast dynamics. Furthermore, most proposed approaches for existing shell-bulging soft rolling robots lack mathematical descriptions of the rolling behavior and as to how the robots can regulate their rolling speeds.

In this disclosure, a shell-bulging locomotion rolling soft robot is described that may be powered by folded electro-hydraulic (HASEL) actuators. The HASEL-powered rolling robot may facilitate much faster rolling characteristics, for example, attaining a rolling maximum speed of 0.7 m/s (1.56 miles per hour), thanks to a hybrid structure of soft actuators placed around a circular rigid skeletal frame. First, the present disclosure describes the electromechanical design of an example of a self-propelled soft robot. Secondly, a mathematical model is presented, and an example of the robot's operating principle is explained. Thirdly, the system rolling characteristics are analyzed. A closed-loop control algorithm may be provided that regulates the wheel rolling velocity. This work therefore represents 1) the design of an example soft mobile robots with integrated hardware based on electro-hydraulic-actuator, 2) development of an example mathematical hybrid-dynamic model and 3) the implementation of an example speed-regulating controller for robots with shell-bulging rolling mechanism.

The folded-HASEL actuator may use a 20-µm-thick polyester film (e.g., LOWS, Multi-Plastics) with an inner heat-sealing layer and corona-treated outer layer for ink adhesion. The actuator pouches are sealed using a heated tip temperature of 195° C. with a tip sealing speed of 400 mm/min. A small fill port is left unsealed in each pouch to provide a means to fill the pouches with a liquid dielectric during the last fabrication step. Electrodes may be made from a carbon ink (e.g., CI-2051, Engineered Materials Systems, Inc.) and were deposited on the outer layer of the films using a screen-printing method. Finally, the pouches are filled with a dielectric silicone fluid (e.g., PSF-5cSt, Clearco) using a syringe and needle inserted into the fill port of the pouch. After filling, a soldering iron (e.g., WE1010NA, Weller) heated to 176° C. may be used to seal the fill port. Fabrication of the HASEL actuators may be according to any of the foregoing incorporated documents describing HASEL actuators and/or PCT Application No. PCT/US2020/020986, the entirety of which is incorporated by reference herein.

Each actuator may include 12 pouches and folded into the dimension of 50 mm×55 mm×12 mm using 5 mm×1 mm transfer tapes (e.g., 924, 3M). Under the application of high voltage (HV) in kV range on one electrode and a low voltage (LV) connection on the other, the actuator's electrodes may zip together, displacing the liquid dielectric to the surrounding volumes inside the actuators, resulting the overall change in the actuators' strokes.

Figure 10:
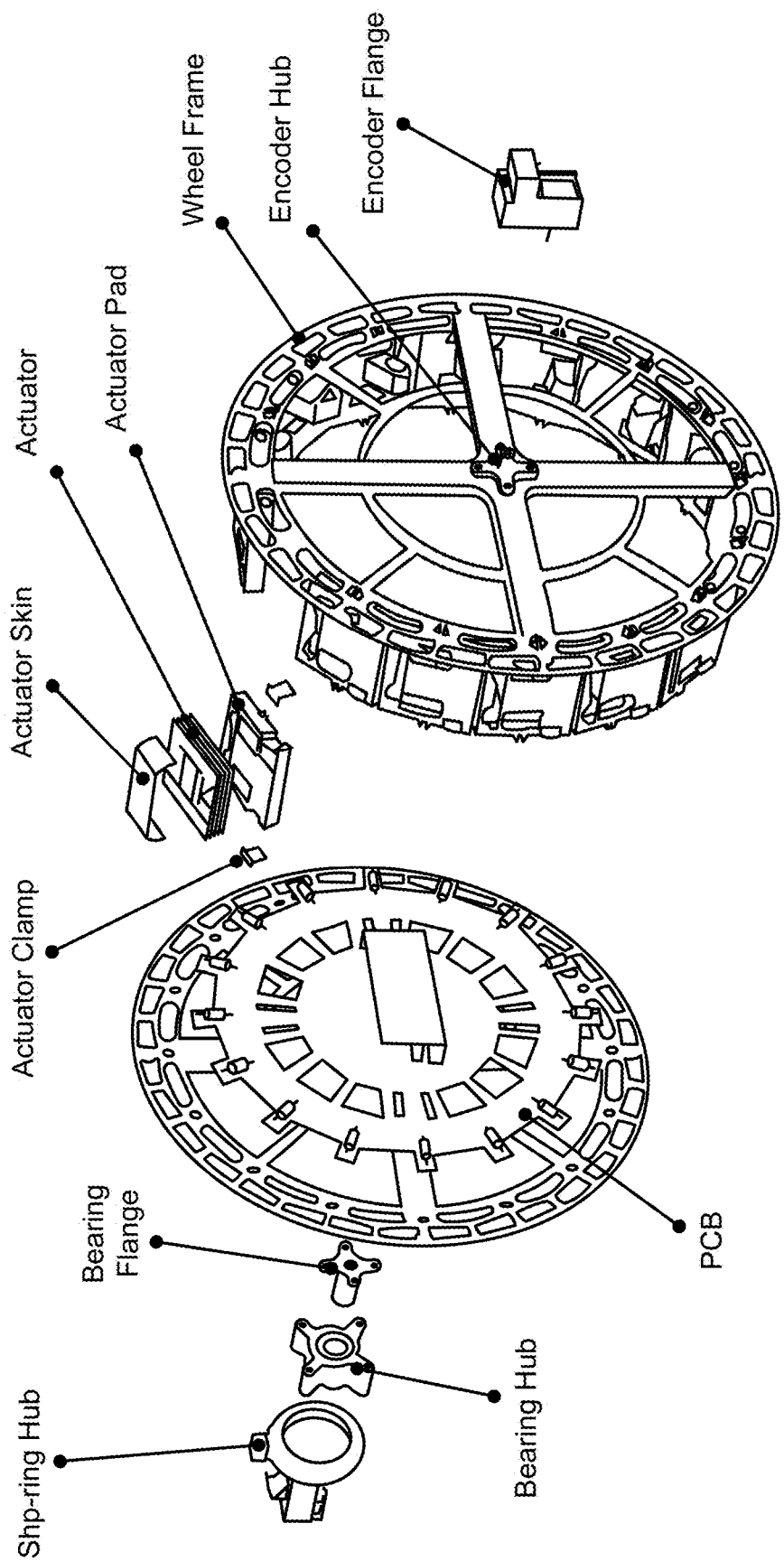
FIG. 10 illustrates an example of an exploded view of an electro-hydraulic rolling soft robot.

FIG. 10 illustrates an example exploded view of an electro-hydraulic rolling soft robot 1000. The HASEL-powered rolling soft robot 1000 may consists of 16 folded-HASEL actuators 1002, a modular wheel frame 1004, and an onboard electronic printed circuit board (PCB) 1006. As can be seen in FIG. 10, the wheel frame 1004 may be fully modular and consists of two circular rims 1008 and 1010 (e.g., with a diameter of 313.54 mm) and 16 actuators 1002 (e.g., 55 mm×50 mm×13 mm). The frame 1004 may be 3D-printed using 1.75 mm PRUSA PLA filament and a 3D printer (e.g., 13 MK3S, PRUSA). The actuators 1002 may be placed radially around the edge of the rims 1008, 1010 to both hold the two rims 1008, 1010 together and allow the relaxed actuators 1002 to be 1 mm away from being in contact with the ground. This also may allow the robot 1000 to roll on the rigid frame 1004 and minimize the contact friction between the actuators 1002 and the ground. Each actuator 1002 surface may lie orthogonally to the radial line of the wheel. Since there are 16 actuators 1002, the angle between the two vectors that are orthogonal to two adjacent actuator pads' surfaces may be $360°/16=22.5°=\pi/8$.

Several factors may influence the number of actuators used for the wheel's design: actuator's dimensions, wheel's stride duration, defined by the duration between the activations of two adjacent folded-HASEL actuators, overall wheel's size and weight, and safety distance between any high voltage (HV) point and any low voltage (LV) point to prevent arcing and HV breakdown on the circuit board. For the same wheel's rim diameter, stride duration decreases with increasing number of actuators mounted on the wheel. However, from observation, the increase in number of actuators 1002 for the same wheel frame 1004 requires actuators with smaller footprints. Besides, scaling up the actuators' quantity also requires more HV driving components, thus increasing the system overall weight, and reducing the safety distance between HV points and LV points on the circuit board. On the other hand, decreasing the number of actuators reduces both the wheel's weight and size, allowing for faster rotational speed. However, this increases the stride duration, which causes the wheel rolls in a more discretized manner, making the wheel's velocity and acceleration harder to regulate. While an in-depth optimization study is needed to balance all design parameters for the HASEL-powered wheel, it has been found that an example overall wheel frame of 313.54 mm diameter with 16 folded-HASEL actuators is sufficient to demonstrate the wheel's closed-loop control.

The platform on which the HASEL robot rolls may be characterized using a hybrid dynamic model validation, and model predictive control of the wheel. It is therefore beneficial that the wheel can roll continuously for long-duration experiments. As such, a rolling platform 1100 may be provided such that not only mitigates the complexity of the experimental setups and provide lateral stability to the wheel 1000, but it also allows the wheel 1000 to roll as long as required for experiments. The rolling platform 1100 may include a platform 1102. To prevent the wheel 1000 from toppling on its side and enforce the circular travelling path, the wheel 1000 may be mounted to a pivot arm whose other end is mounted to the center of the platform but free to rotate both horizontally and vertically using a bearing 1106 on a pivot shaft. The pivot arm 1104 is connected to the wheel rim 1000 via a U-mount 1110. One side of the U-mount 1110 may connect to a slip ring that provides electrical interfaces with the wheel PCB. The U-mount 1110 may also align a rotary encoder's shaft with the wheel's center of geometry.

Figure 12:
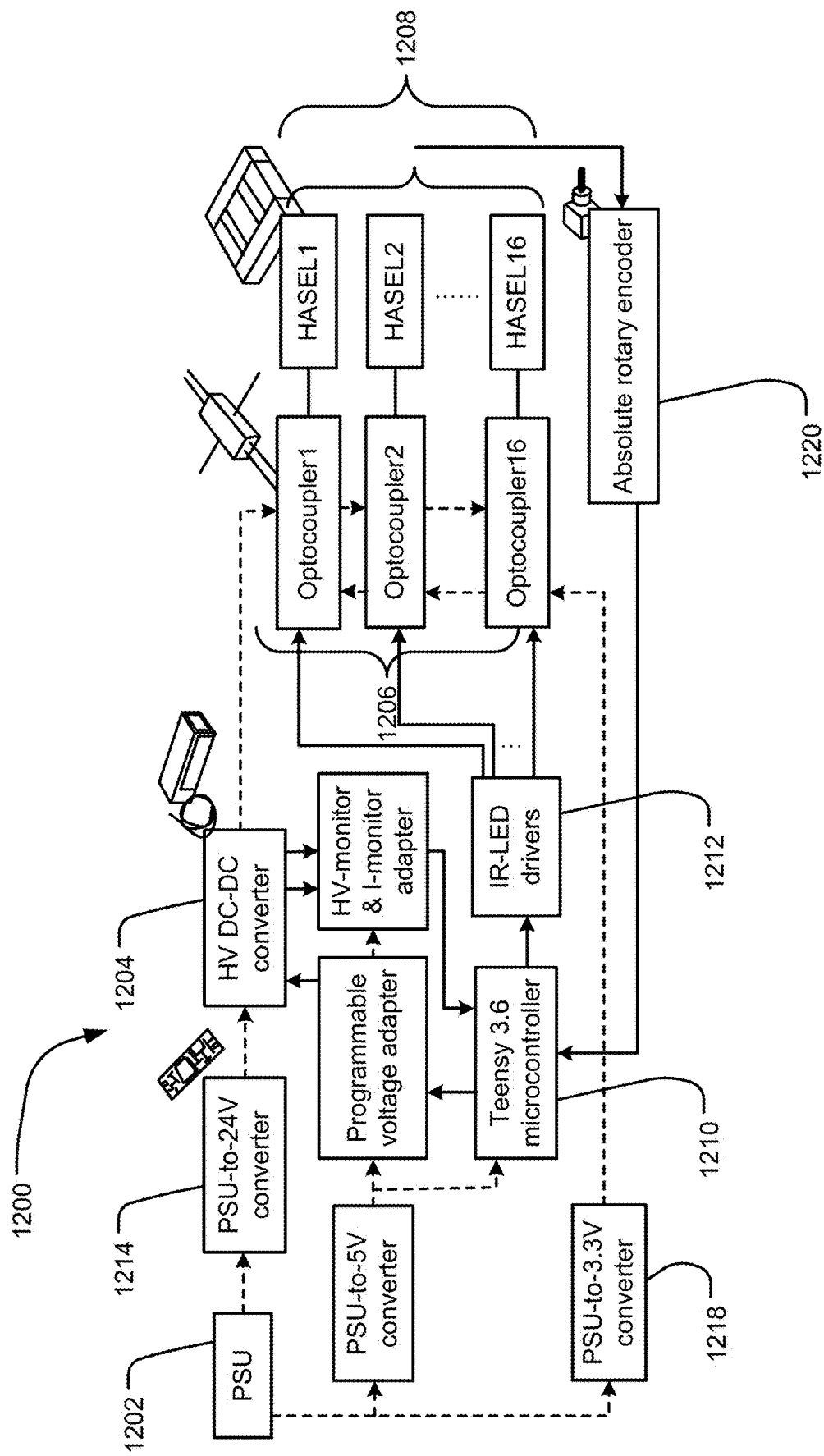
FIG. 12 illustrates an example block diagram of an electrical system for an electro-hydraulic rolling soft robot.

FIG. 12 shows an example embedded layout for a PCB of an electro-hydraulic rolling soft robot. Specifically, FIG. 12 illustrates a block diagram 1200 of an electrical system, in which a power supply unit (PSU) 1202 is not integrated on the PCB. An onboard HV DC-DC converter 1204 (e.g., 10A24-P30, Advanced Energy) may output 10 kV at 3 mA. HV optocouplers 1206 may be provided that may each contain an optodiode (e.g., OZ100SG, Voltage Multiplier Inc.) and a 940 nm IR-LED (e.g., L1IZ-0940000000000, Lumileds). The HV optocouplders 1206 may act as switches that connect or disconnect the HV DC-DC converter 1204 from actuators 1208 of the rolling robot depending on the amount of light received from the IR-LEDs. These LEDs may be toggled based on a microcontroller 1210 (e.g., Teensy 3.6, PJRC) using two IR-LED drivers 1212 (e.g., TPIC6C596, Texas Instrument). The dotted arrows show a power line for all onboard electrical components, and solid arrows illustrate input-output relationships between components.

Figure 13:
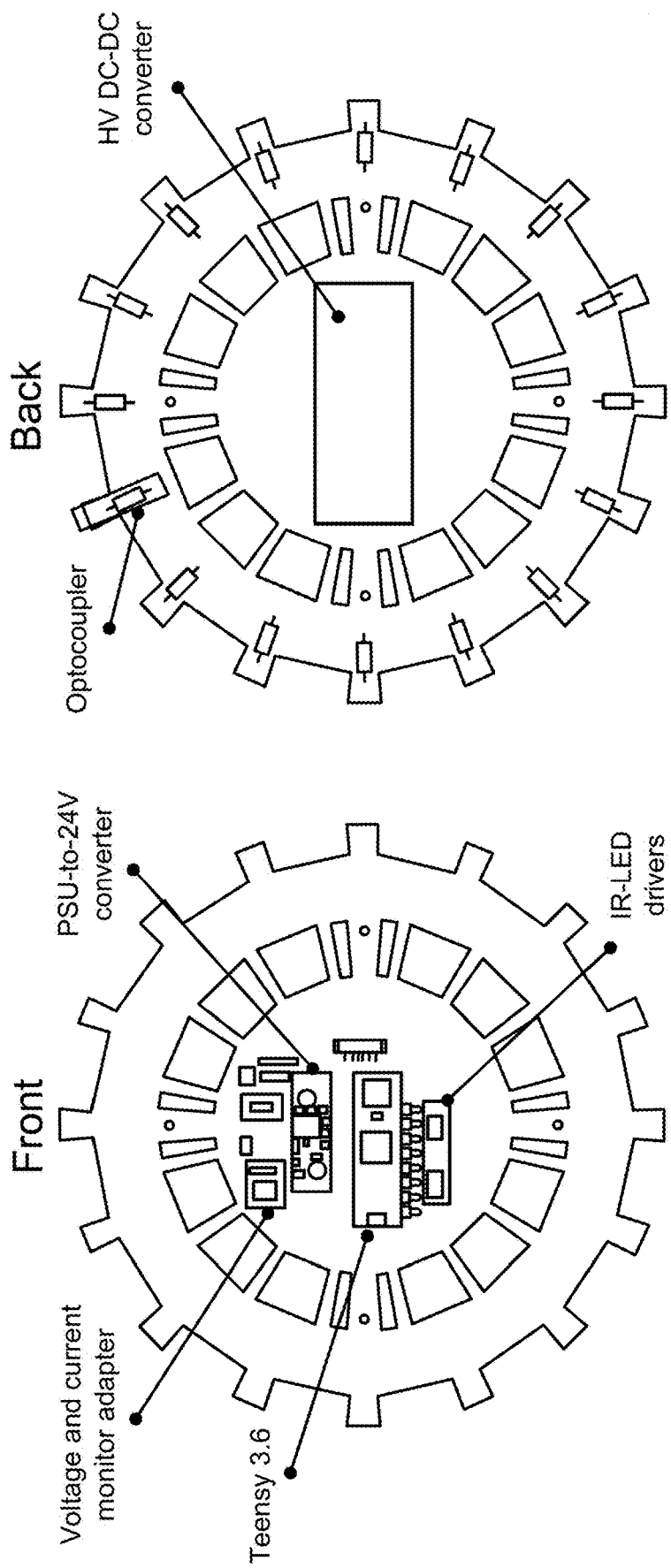
FIG. 13 illustrates example locations of various components integrated with an electro-hydraulic rolling soft robot.

The onboard printed circuit board (PCB) that drives the HASEL actuators may include three groups: the power delivery group, the driving and control group, and the sensing group. The block diagram of the three groups is shown in FIG. 12. The dotted arrows show the power line for all onboard electrical components, while the solid arrows show the input-output relationships between every two components. The PCB may be dimensioned to correspondingly fit in the wheel frame as shown in FIG. 13. FIG. 13 illustrates a front view of a rolling robot where a PCB according to the layout shown in in FIG. 12 may contain all LV components and is disposed in a chassis of the rolling robot. In addition, a rear view of the rolling robot showing a location of a PCB that may include all HV components. By locating the LV PCB and HV PCB on opposite sides of the chassis may isolate HV components from damaging LV ones.

The power delivery group may include an 8-to-24 V step-up DC-DC converter 1214 (e.g., U3V50F24, Pololu), an 8-to-5 V step-down linear dropout regulator 1216 (e.g., REG113NA-5/3K, Texas Instruments), and an 8-to-3.3V step-down linear dropout regulator 1218 (e.g., REG113NA-3.3/3K, Texas Instruments). The step-up DC-DC converter 1214 provides the required 24 V to the high voltage DC-DC converter 1204 (e.g., 10A24-P30, Advanced Energy), which generates a constant 9 KV output. The 5 V and 3.3 V regulators 1216, 1218 provide power to both the driving and control group and the sensing group.

The driving and control group may include a microcontroller 1210 (e.g., Teensy 3.6, PJRC) that has a two-way communication via full-speed Universal Serial Bus (USB) with a personal computer. The microcontroller 1210 may process sensing data and send them to a personal computer, which, depending on the data, generates either open-loop or closed-loop commands. The commands may then be forwarded to the microcontroller 1210 for HV switching of the actuators 1208.

Figure 14:
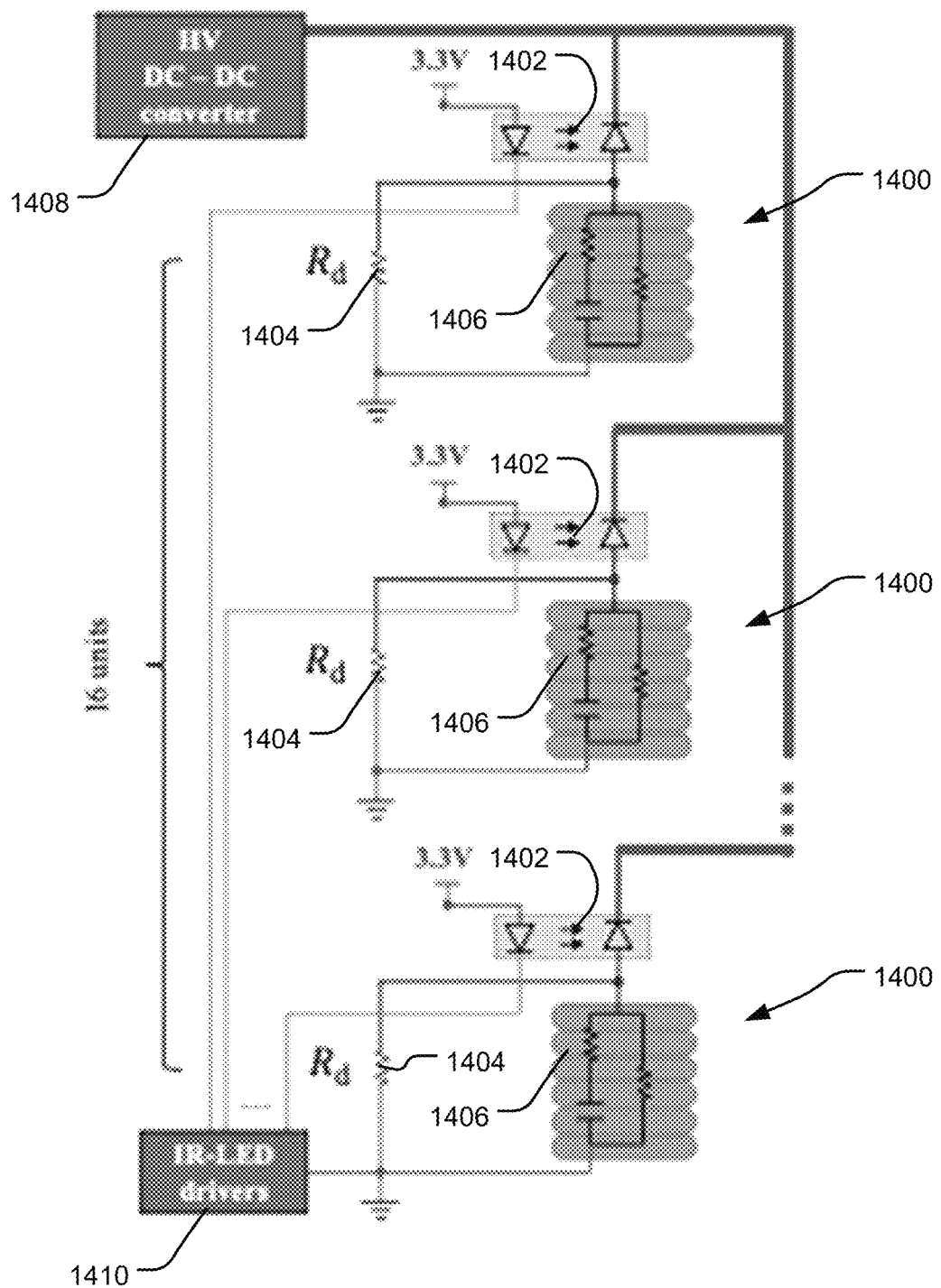
FIG. 14 illustrates an example simplified schematic of active charge-passive drain units.

The design of the HV switching circuit 1206 for each actuator 1208 may influence how well each actuator 1208 performs and how fast the robot can roll. FIG. 14 illustrates an example in which 16 units 1400 of active charge-passive drain circuits are provided to independently drive a corresponding 16 actuators. Each unit 1400 may include an optocoupler 1402 that consists of a HV-tolerant optodiode 1402 (e.g., OZ100SG, Voltage Multiplier Inc.) and a high voltage tolerated drain resistor 1404 ($R_d$). The diode 1402 can change its impedance depending on the corresponding infrared light emitting diodes (IR-LEDs) (e.g., L1IZ-0940000000000, Lumileds). The IR-LEDs may be toggled by digital pins on the microcontroller via an N-channel MOSFET (e.g., FQP30N06L, Fairchild Semiconductor), which are tested to sink 200 mA of current that goes through the IR-LEDs. Depending on the value, a drain resistor 1404 can influence the rate at which charges on the electrodes neutralize, thus controlling how quickly the actuator relaxes.

Based on the circuit of choice, the onboard HV switching subgroup may include of 16 optocouplers 1206 for 16 actuators 1208 on the wheel. Instead of implementing 16 N-channel MOSFETs for 16 IR-LEDs, the optocouplers 1206 may be controlled by two 8-bit IR-LED drivers 1212 (e.g., TPIC6C596, Texas Instrument) in daisy-chain and placed radially at the edge of the PCB to facilitate connection to the HV electrodes of the actuators 1208. The shift registers can sink 200 mA of current from the IR-LEDs and easily controlled by receiving two required bytes from the microcontroller 1210. The PCB signal integrity may be improved by placing HV components and the LV components on the opposite faces of the circuit board. As the microcontroller 1210 turns on an IR-LED by sending correct bytes to the IR-LED drivers 1212, the corresponding optodiode of an optocoupler 1206 becomes conductive, allowing charges to flow from the HV DC-DC converter 1204 to the respective actuators 1208. The actuator 1208 then increases its stroke and, if it is in contact with the ground, exerts a force to roll the wheel in a certain direction. When the IR-LED turns off, the actuator 1208 passively drains itself and relaxes thanks to a drain resistor 1404 that is connected to the actuator's electrodes. The value of the drain resistor 1404 is determined as described below.

The sensing group may include a single-supply operational amplifier (e.g., TLV4172IDR, Texas Instruments) for HV monitor and current monitor and an absolute rotary encoder 1220 (e.g., EMS22A, Bourns). The HV DC-DC converter 1204 may have two analog pins that monitor the output HV and its corresponding current values. Since these values are above the microcontroller's ADC range of 0 to 3.3 V, they may be stepped down by using two resistor dividers and two respective voltage buffers from the operational amplifier. While the HV monitor and current monitor are beneficial for HV fail-safe prevention, the absolute rotary encoder 1220 (e.g., EMS22A50, Bourns) may be provided for the robot's speed regulation. The encoder 1220 sends the digital bytes corresponding to the wheel's absolute angular position to the microcontroller 1210. The microcontroller 1210 then forwards these converted data via the USB to the computer for further processing.

Due to the overall constraints of the board space and the placements of electrical components (to promote safe distances from the HV points), the circuit board may have asymmetric component placements, resulting in the robot's center of mass (COM) and geometric center (GC) not being the same. The robot's frame may contain four pins on which custom weights can be added, allowing the robot's COM to be the same as its GC; from trial-and-error, a combination of 0.88 g and 3.58 g of weights on the appropriate pins (not shown).

With returned reference to FIG. 14, the term "active charge" comes from the ability to toggle the IR-LEDs to adjust the optocoupler's 1202 impedance to charge the actuators 1406. The term "passive drain" describes the use of the drain resistors $R_d$ 1404 to passively discharge the corresponding actuators 1406 when the optocouplers 1402 are turned off. The actuators 1406 may be connected in parallel to a single HV DC-DC converter 1408 and they may be controlled by two IR-LED drivers 1410.

Figure 15:
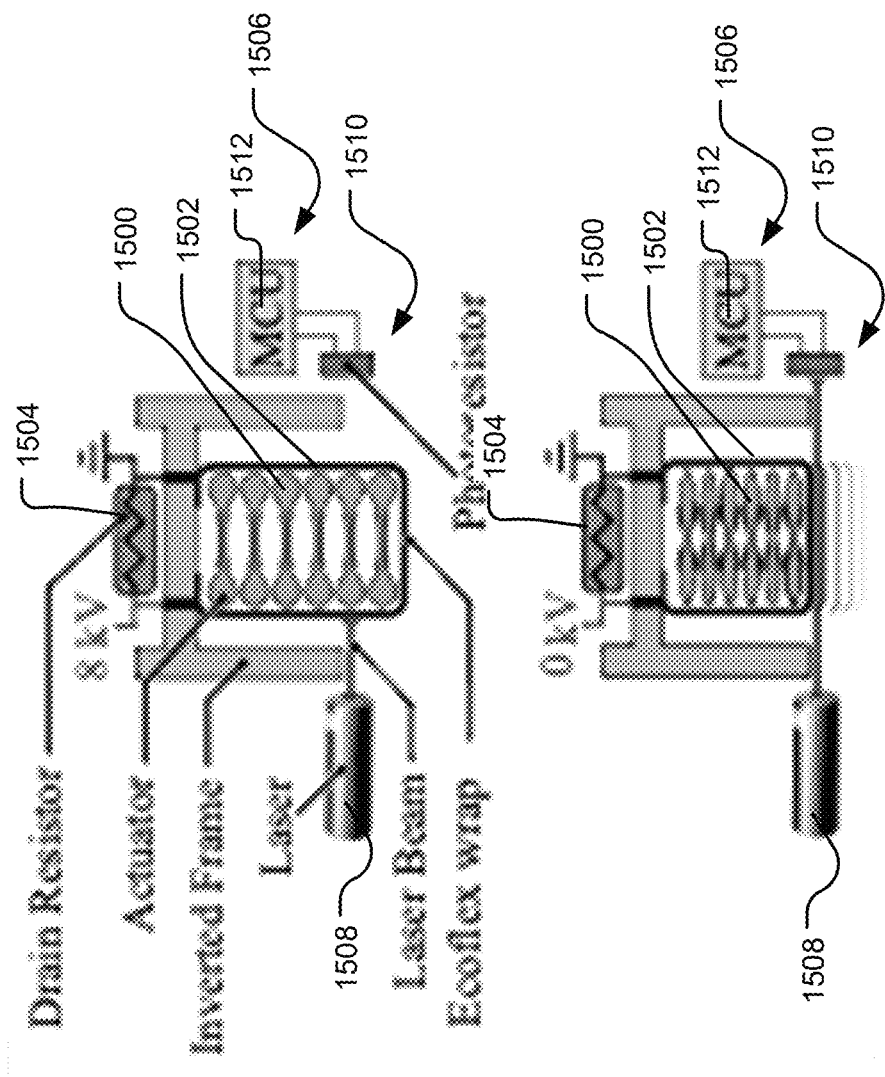
FIG. 15 illustrates an example test configuration for determining an actuator's fall time, contraction duration, and how much force an actuator exerts.

In addition, the performance of the actuator may be optimized by using Ecoflex wraps and drain resistors. With further reference to FIG. 15, a system is illustrated in which Ecoflex wrap 1502 and drain resistance 1504 may be used to contract the actuators 1500. When an actuator 1500 is placed upright and when the HV is switched off, the actuator 1500 may rely on its own inertia to return to the contracted state. However, an actuator 1500 attached on a rotating robot takes significantly longer time to contract to its original state, since the gravity keeps the actuators in the expanded state beyond the wheel rim when they are upside down. This behavior both acts to prevent the actuator 1500 from exerting sufficient output forces in the next activation-deactivation cycle and the wheel from rolling smoothly on the platform.

To reduce or prevent the relaxed actuators from extending beyond the wheel's rim, and to help the actuator contract faster when HV is switched off, an Ecoflex wrap 1502 (00-30 Ecoflex, Smooth-On) may be wrapped (with 50% pre-stretch) around each actuator 1500 to bias the actuator in the deactuated or relaxed position. Since the choice of a drain resistor 1504 may also affects how quickly each actuator 1500 relaxes, an actuator's performance may be evaluated with respect to both different Ecoflex wrap 1502 thickness and drain resistor 1504 value. FIG. 15 shows the experiment setup to evaluate the displacement's fall time of a folded actuator 1500. The inverted actuator 1500 is initially activated under 8 kV. When the HV optocoupler 1506 is switched off, the neutralization of electrostatic charges thanks to the drain resistor 1504 and the restoring force from the Ecoflex wrap 1502 cause the actuator to contract. After the actuator 1500 is fully contracted, its blockage of a laser beam 1508 is removed, allowing the laser beam 1508 to shine light to a photodiode 1510, whose resistance change is registered by a microcontroller 1512 (e.g., Arduino Uno V3, Arduino). The process is repeated 5 times for each combination of Ecoflex wrap 1502 and drain resistor 1504. The average duration from the time the HV optocoupler 1506 is switched off to the time the laser beam 1508 is registered by the photodiode 1510 is recorded in FIG. 17. As expected, for the same drain resistor 1504, thinner Ecoflex wraps 1502 produce less restoring force on the actuator 1500, resulting larger fall time. For the same Ecoflex wrap 1502, larger drain resistors 1504 slows down the flow of positive charges on the HV electrode more drastically, causing the actuator 1500 to relax slower. Therefore, the combination of 200-MEG-Ω resistor and 800-μm-thick wrap may provide optimized fall time of 0.53 s, while the combination of 500-MEG-Ω resistor and 400-μm-thick wrap results in the least optimized fall time of 2.27 s.

Figure 16:
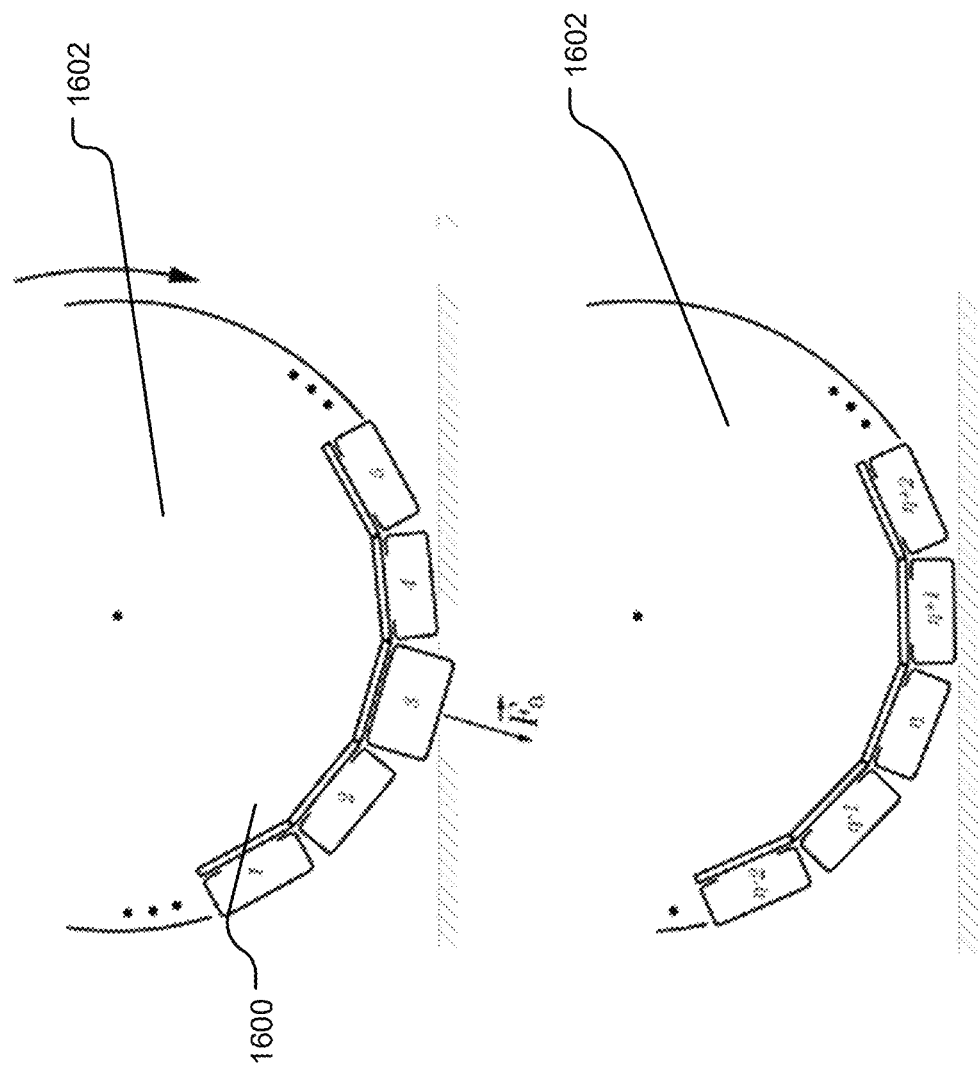
FIG. 16 illustrates an example of actuation of actuators of an electro-hydraulic rolling soft robot.

Since the choice of Ecoflex wrap 1502 and drain resistor 1504 may also influence the actuator maximum stroke and output force, the two parameters' effect on the wheel's ability to roll was evaluated. That is, the amount of force applied may be determined indirectly by the amount of angle traveled of the robot from a predetermined initial angular position. An experimental setup is provided as shown in FIG. 16, where in an initial state the actuator is fully activated under 8 kV, and the expanded actuator blocks the beam from a laser pointer. When the HV is switched off, the drain resistor discharges the actuator and the Ecoflex wrap pushes the actuator back to its contracted state. The microcontroller determines a fall time as the duration when the HV switches off to the instant the laser beam hits the photoresistor. While it is more accurate to measure the output force and stroke of the actuators directly, these performance metrics are challenging to quantify as the wheel rolls. Therefore, it may be more useful to analyze the influence of the wrap 1502 and the drain resistance 1504 on the wheel's change of angle due to the reaction force between the ground and the actuator as it expands.

As such, with reference to FIG. 16 an actuator 1600 was placed on the wheel pad and balance the wheel's weight such that its COM aligns with the center of geometry. The wheel is initially at a resting angle such that the actuator 1600 is placed 11.25° away from its upright position. The actuator 1600 is then activated for 3 s and the change in angle of the wheel 1602 between its initial angle and final angle is recorded by the absolute rotary encoder. The process is repeated 5 times for each combination of drain resistor 1504 and wrap 1502. FIG. 17 also shows the average change in angle of the wheel 1602 with respect to different drain resistors 1504 and wrap 1502 thickness. While the Ecoflex wrap 1502 thickness may affect the change in angle (hence how far the wheel rolls) the value of the drain resistor 1504 does not contribute to the actuator's 1500 performance. From the results in FIG. 17, it may therefore be optimal to select a resistance value of 200 MEG 1 for shortest fall time while not sacrificing good actuator's force and stroke. On the other hand, the Ecoflex wrap 1502 thickness of 400 μm may be selected for a reasonably fast fall time but with much better actuator's output force and stroke.

Figure 11:
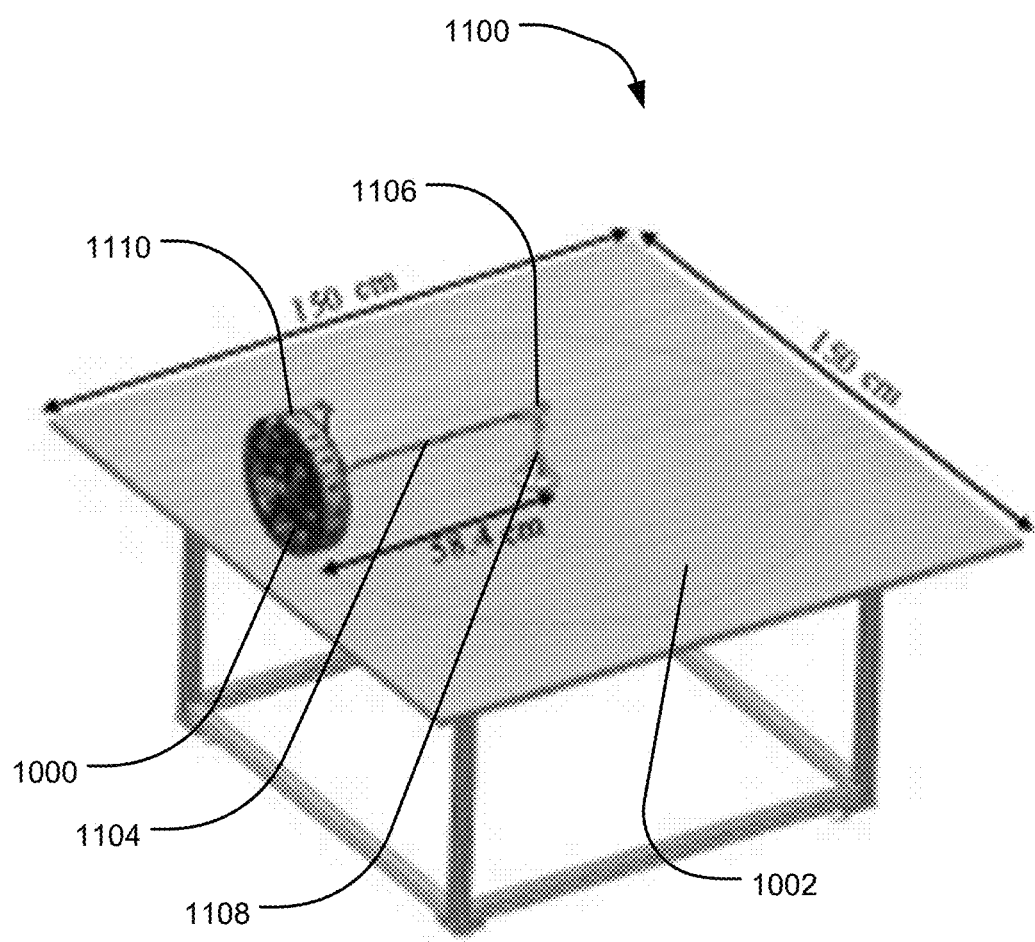
FIG. 11 illustrates an example robotic platform including an electro-hydraulic rolling soft robot mounted to a pivot arm with a U-mount.
Figure 18:
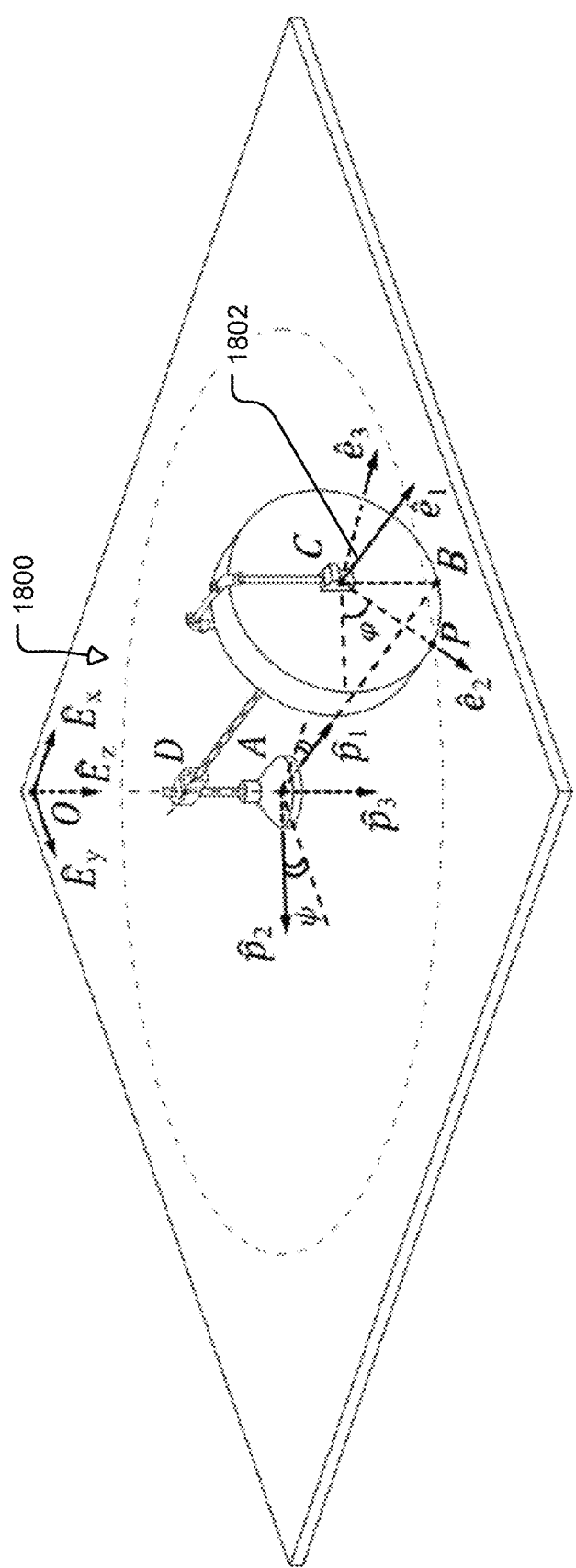
FIG. 18 illustrates example kinematics and dynamics presentations of an electro-hydraulic rolling soft robot.
Figure 19:
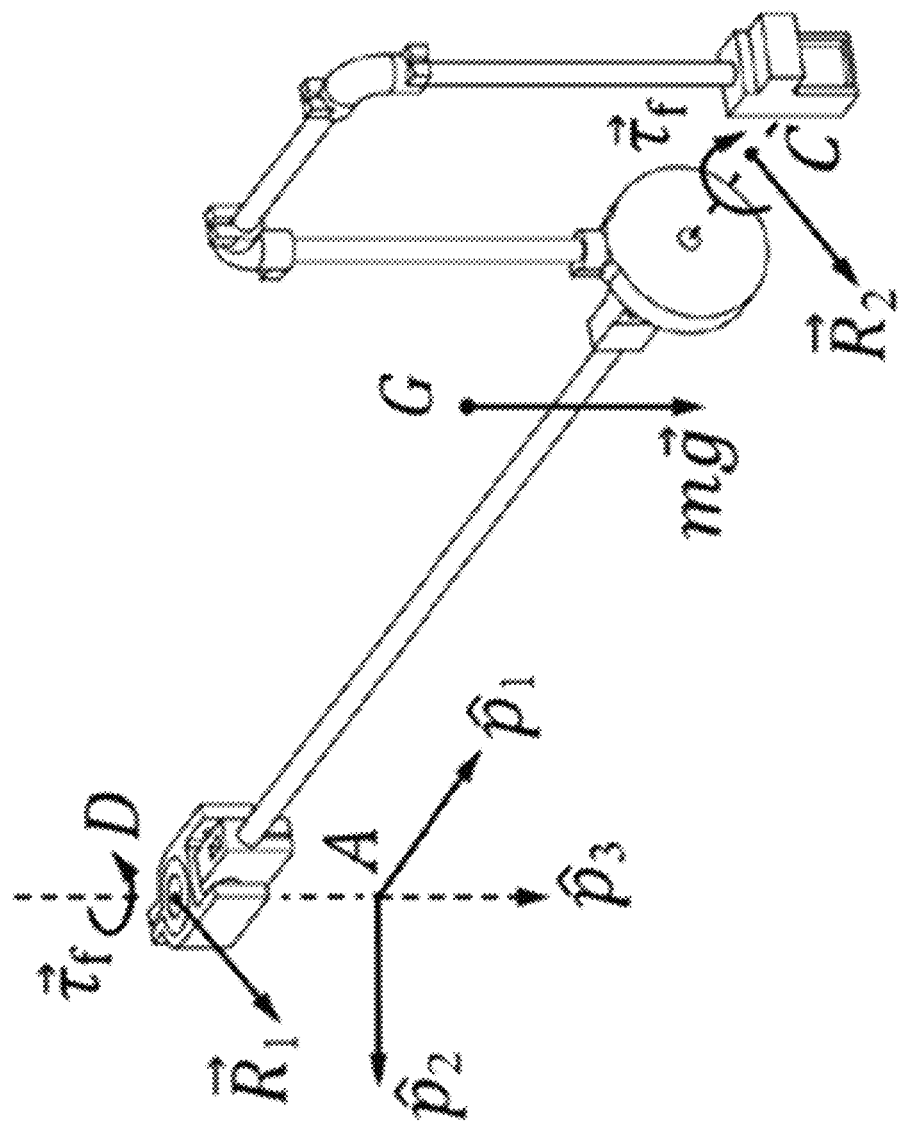
FIG. 19 illustrates an example free body diagram of a U-mount and pivot arm for an electro-hydraulic rolling soft robot.
Figure 20:
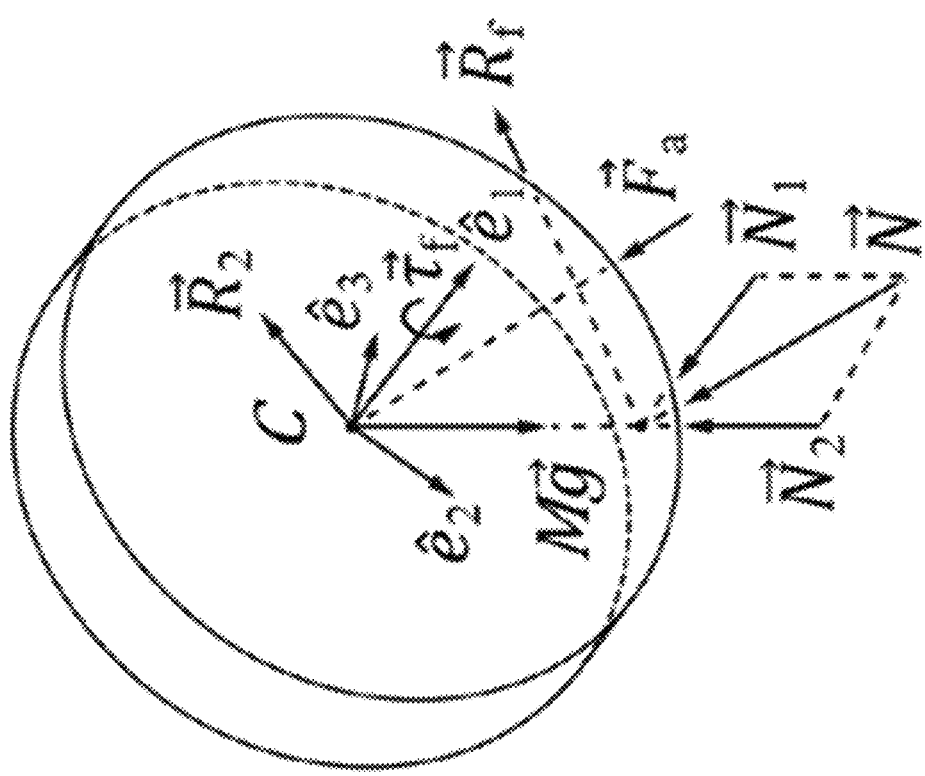
FIG. 20 illustrates an example free body diagram of an electro-hydraulic rolling soft robot.

As noted above, kinematics and dynamics of a robotic platform may be determined for a system as illustrated in FIG. 11. FIG. 18 illustrates a diagram 1800 regarding kinematics and dynamics of a robotic platform including variable nomenclature used below. FIGS. 19 and 20 illustrate platform and robot reference frames, respectfully. Specifically, FIG. 19 is a free body diagram of a U-mount and pivot arm, while FIG. 20 shows a free body diagram of the HASEL robot. In turn, the following discussion relates to a kinematics and dynamics model that may be applied for control of a robot as illustrated in FIG. 11.

The dynamic modeling of the wheel of radius r and pivot arm of length L may be provided. FIG. 18 shows three reference frames that may be used for the dynamic modeling of the rolling motion. The platform-fixed frame $\mathcal{F}$ has a coordinate system whose origin is O. Its orthogonal basis $\{\hat{E}_x, \hat{E}_y, \hat{E}_z\}$ is defined as follows: $\hat{E}_x$ points along the first edge of the platform, $\hat{E}_z$ points in the direction of gravity, and $\hat{E}_y = \hat{E}_z \times \hat{E}_x$. The reference frame $\mathcal{P}$ is fixed to the pivot has a coordinate system whose origin is A. B is denoted as the point on the wheel in contact with the platform. Its orthogonal basis $\{\hat{p}_1, \hat{p}_2, \hat{p}_3\}$ is defined as follow: $\hat{p}_1$ points along the direction of $\overrightarrow{AB}$, $\hat{p}_3$ points along the direction of $\hat{E}_z$, and $\hat{p}_2 = \hat{p}_3 \times \hat{p}_1$. The coordinate system fixed to reference frame $\mathcal{P}$ rotates an angle of with respect to the coordinate system fixed to reference frame $\mathcal{F}$, with $\psi$ is the angle between $\hat{p}_1$ and $\hat{E}_x$. The reference frame $\mathcal{R}$ is fixed to the HASEL rolling robot 1802 with a coordinate system whose origin C. P is denoted as an arbitrary point on the rim of the wheel. Its orthogonal basis $\{\hat{e}_1, \hat{e}_2, \hat{e}_3\}$ is defined as follow: $\hat{e}_1$ points along the direction of $\hat{p}_1$, $\hat{e}_2$ points along the direction of $\overrightarrow{CP}$, and $\hat{e}_3 := \hat{e}_1 \times \hat{e}_2$. The coordinate system fixed to reference frame $\mathcal{R}$ rotates an angle of $\varphi$ with respect to the coordinate system fixed to reference frame $\mathcal{P}$, with $\varphi$ is the angle between $\hat{e}_2$ and $\hat{p}_2$.

The angular velocity of frame $\mathcal{P}$ with respect to an observer in frame $\mathcal{F}$ is:

$$^{\mathcal{F}}\vec{\omega}^{\mathcal{P}} = \dot{\psi} \cdot \hat{p}_3 = \dot{\psi} \cdot \hat{E}_z \tag{1}$$

The angular velocity of frame $\mathcal{R}$ with respect to an observer in frame $\mathcal{P}$ is:

$$^{\mathcal{P}}\vec{\omega}^{\mathcal{R}} = \dot{\varphi}\cdot\hat{p}_1 = \dot{\varphi}\cdot\hat{p}_1 \tag{2}$$

From (1) and (2), the angular velocity of the wheel as viewed by an observer in frame $\mathcal{F}$ is:

$$^{\mathcal{F}}\vec{\omega}^{\mathcal{R}} = {^{\mathcal{F}}\vec{\omega}^{\mathcal{P}}} + {^{\mathcal{P}}\vec{\omega}^{\mathcal{R}}} \tag{3}$$

$$^{\mathcal{F}}\vec{\omega}^{\mathcal{R}} = \dot{\psi}\sin(\varphi)\cdot\hat{e}_2 + \dot{\psi}\cos(\varphi)\cdot\hat{e}_3 + \dot{\varphi}\cdot\hat{e}_1 \tag{4}$$

The position of point A relative to point O in frame $\mathcal{F}$ is $$\vec{r}_A = x_A\cdot\hat{E}_x + y_A\cdot\hat{E}_y \tag{5}$$

The position of point C (COM of the robot) relative to point B in $\mathcal{P}$ is:

$$\vec{r}_C - \vec{r}_B = -r\cdot\hat{p}_3 \tag{6}$$

Assuming the wheel rolls without slip, the velocity of contact point B of rigid body as observed in fixed frame $\mathcal{F}$ is provided as:

$$^{\mathcal{F}}\vec{v}_B^{\mathcal{R}} = \vec{0} \tag{7}$$

From (5), (6), and (7), the velocity of the wheel's COM (point C) as viewed from $\mathcal{F}$ is:

$$^{\mathcal{F}}\vec{v}_C = {^{\mathcal{F}}\vec{v}_B^{\mathcal{R}}} + {^{\mathcal{F}}\vec{\omega}^{\mathcal{R}}} \times (\vec{r}_C - \vec{r}_B) \tag{8}$$

$$^{\mathcal{F}}\vec{v}_C = r\dot{\varphi}\hat{p}_2 \tag{9}$$

Therefore, the acceleration of the wheel's COM as viewed from $\mathcal{F}$ is:

$$^{\mathcal{F}}\vec{a}_c = \frac{^{\mathcal{F}}d}{dt}(^{\mathcal{F}}\vec{v}_c) = \frac{^{\mathcal{P}}d}{dt}(^{\mathcal{F}}\vec{v}_c) + {^{\mathcal{F}}\vec{\omega}^{\mathcal{P}}} \times {^{\mathcal{F}}\vec{v}_c} \tag{10}$$

$$^{\mathcal{F}}\vec{a}_c = -r\dot{\psi}\dot{\varphi}\cdot\hat{p}_1 + r\ddot{\varphi}\cdot\hat{p}_2 \tag{11}$$

Point G may be denoted as the center of mass of the pivot arm. Due to its complex geometry, point G does not locate on the pivot arm itself as shown in FIG. 19. Given: $\vec{r}_{GA} = \vec{r}_G - \vec{r}_A = x_{GA}\cdot\hat{p}_1 + z_{GA}\cdot\hat{p}_3$, with $x_{GA} > 0$ and $z_{GA} < 0$, the position of point G as viewed from $\mathcal{F}$ is:

$$\vec{r}_G = \vec{r}_A + \vec{r}_{GA} = x_A\cdot\hat{E}_x + y_A\cdot\hat{E}_y + x_{GA}\cdot\hat{p}_1 + z_{GA}\cdot\hat{p}_3 \tag{12}$$

$$\vec{r}_G = \tag{13}$$
$$(x_A\cos\psi + y_A\sin\psi + x_{GA})\cdot\hat{p}_1 + (-x_A\sin\psi + y_A\cos\psi)\cdot\hat{p}_2 + z_{GA}\cdot\hat{p}_3$$

By taking derivatives on both sides of (13), the velocity of the pivot arm (with U-mount) as viewed from $\mathcal{F}$ is:

$$^{\mathcal{F}}\vec{v}_G = \dot{\psi}\cdot\hat{p}_3 \times (x_{GA}\cdot\hat{p}_1 + z_{GA}\cdot\hat{p}_3) = x_{GA}\dot{\psi}\cdot\hat{p}_2 \tag{14}$$

Therefore, the acceleration of the pivot arm with U-mount as viewed from $\mathcal{F}$ can be obtained using the rate of change transport theorem as follows:

$$^{\mathcal{F}}\vec{a}_G = \frac{^{\mathcal{F}}d}{dt}(^{\mathcal{F}}\vec{v}_G) = \frac{^{\mathcal{P}}d}{dt}(^{\mathcal{F}}\vec{v}_G) + {^{\mathcal{F}}\vec{\omega}^{\mathcal{P}}} \times {^{\mathcal{F}}\vec{v}_G} \tag{15}$$

$$^{\mathcal{F}}\vec{a}_G = x_{GA}\ddot{\psi}\cdot\hat{p}_2 - x_{GA}\dot{\psi}^2\cdot\hat{p}_1 \tag{16}$$

Since it may be assumed the robot rolls without slip, kinematic constraints may be established as follow:

$$\vec{r}_C = L\cdot\hat{p}_1 + z_{DA}\cdot\hat{p}_3 \tag{17}$$

$$\frac{^{\mathcal{F}}d}{dt}(\vec{r}_C) = \frac{^{\mathcal{P}}d}{dt}(\vec{r}_C) + {^{\mathcal{F}}\vec{\omega}^{\mathcal{P}}} \times \vec{r}_C \tag{18}$$

$$^{\mathcal{F}}\vec{v}_C = \dot{\psi}L\cdot\hat{p}_2 \tag{19}$$

where $z_{DA}$ is the distance between point D and A. But it may be known that $^{\mathcal{F}}\vec{v}_C = r\dot{\varphi}\cdot\hat{p}_2$, therefore $$\dot{\psi}L\cdot\hat{p}_2 = r\dot{\varphi}\cdot\hat{p}_2 \tag{20}$$

$$\dot{\psi} = \frac{r}{L}\dot{\varphi} \tag{21}$$

Turning to the kinetics of the pivot arm with U-mount, the forces and torques associated with the free body diagram (FBD) of the U-mount (shown in FIG. 19) are:

$\vec{R}_1$: Reaction force at the pivot elbow $$\vec{R}_1 = R_{11}\cdot\hat{p}_1 + R_{12}\cdot\hat{p}_2 \tag{22}$$

$m\vec{g}$: Weight of the pivot arm (with u-mount) along $\hat{p}_3$ $\vec{R}_2$: Resultant reaction force from the wheel on the arm $$\vec{R}_2 = R_{21}\cdot\hat{p}_1 + R_{22}\cdot\hat{p}_2 + R_{23}\cdot\hat{p}_3 \tag{23}$$

$\vec{\tau}_f$: Pure bearing friction torque opposite to $\hat{p}_3$.

$$\vec{\tau}_f = \tau_f\hat{p}_3 \tag{24}$$

Since there may be no translational motion for the pivot arm, Euler's $1^{st}$ law may be ignored. According to Euler $2^{nd}$ law:

$$\vec{M}_D = \frac{^{\mathcal{F}}d}{dt}(^{\mathcal{F}}\vec{H}_D) \tag{25}$$

$$\vec{M}_D = (\vec{r}_G - \vec{r}_D) \times mg\cdot\hat{p}_3 + (\vec{r}_C - \vec{r}_D) \times \vec{R}_2 - \tau_f\cdot\hat{p}_3 \tag{26}$$

Given that:

$$(\vec{r}_G - \vec{r}_D) = (\vec{r}_G - \vec{r}_A) - (\vec{r}_D - \vec{r}_A) \tag{27}$$

$$(\vec{r}_G - \vec{r}_D) = x_{GA}\cdot\hat{p}_1 + (z_{GA} - z_{GD})\cdot\hat{p}_3 \tag{28}$$

$$(\vec{r}_C - \vec{r}_D) = L\cdot\hat{p}_1 \tag{29}$$

where (26) can be simplified as:

$$\vec{M}_D = (-mgx_{GA} - LR_{2,3})\cdot\hat{p}_2 + (LR_{2,2} - \tau_F)\cdot\hat{p}_3 \tag{30}$$

Where $\vec{r}_G - \vec{r}_D$ is the position of point G relative to point D in $\mathcal{P}$, $\vec{r}_C - \vec{r}_D$ is the position of point C relative to point D in $\mathcal{P}$.

Considering the angular momentum of the pivot arm with U-mount:

$$^{\mathcal{F}}\vec{H}_D = {^{\mathcal{P}}I_D}\cdot{^{\mathcal{F}}\vec{\omega}^{\mathcal{P}}} \tag{31}$$

where $^{\mathcal{P}}I_D$ is the moment of inertia tensor of the pivot arm (with U-mount) relative to point D on the pivot arm. Expanding (31):

$$\mathcal{F}\vec{H}_D = \begin{bmatrix} I_{11} & I_{12} & I_{13} \\ I_{21} & I_{22} & I_{23} \\ I_{31} & I_{32} & I_{33} \end{bmatrix} \cdot \begin{bmatrix} 0\hat{p}_1 \\ 0\hat{p}_2 \\ \dot{\psi}\hat{p}_3 \end{bmatrix} \quad (32)$$

Applying rate of change transport theorem to (33):

$$\frac{{}^{\mathcal{F}}d}{dt}\left({}^{\mathcal{F}}\vec{H}_D\right) = \frac{{}^{\mathcal{P}}d}{dt}\left({}^{\mathcal{F}}\vec{H}_D\right) + {}^{\mathcal{F}}\vec{\omega}^{\mathcal{P}} \times {}^{\mathcal{F}}\vec{H}_D \quad (34)$$

$$\frac{{}^{\mathcal{F}}d}{dt}\left({}^{\mathcal{F}}\vec{H}_D\right) = \left(I_{13}\ddot{\psi} - I_{23}\dot{\psi}^2\right)\cdot\hat{p}_1 + \left(I_{23}\ddot{\psi} - I_{13}\dot{\psi}^2\right)\cdot\hat{p}_2 + I_{33}\ddot{\psi}\cdot\hat{p}_3 \quad (35)$$

Equating (30) and (35) and without the detailed derivation, obtains the following:

$$0 = I_{13}\ddot{\psi} - I_{23}\dot{\psi}^2 \quad (36)$$

$$-mgx_{GA} - LR_{23} = I_{23}\ddot{\psi} + I_{13}\dot{\psi}^2 \quad (37)$$

$$LR_{22} - \tau_f = I_{33}\ddot{\psi} \quad (38)$$

Expanding the kinetics of the HASEL soft robot, for simplicity, the wheel geometry may be treated as a cylinder. Based on the free body diagram illustrated in FIG. 20, the following forces and torques are involved:

$M\vec{g}$: Weight of the wheel along $\hat{p}_3$ $\vec{N}$: Reaction force of the ground on the wheel $$\vec{N} = N_1 \cdot \hat{p}_1 + N_3 \cdot \hat{p}_3 \quad (39)$$

$\vec{R}_2$: Resultant, simplified reaction force from the pivot arm on the wheel $$-\vec{R}_2 = R_{21} \cdot \hat{p}_1 - R_{22} \cdot \hat{p}_2 - R_{23} \cdot \hat{p}_3 \quad (40)$$

$\vec{\tau}_f$: Pure bearing friction torque opposite to $\hat{e}_1$ $\vec{R}_f$: Static friction force between the wheel and the ground opposite to direction $\hat{p}_2$ $\vec{F}_a$: Actuator force exerting on the robot $$\vec{F}_a = F_{a,2} \cdot \hat{p}_2 + F_{a,3} \cdot \hat{p}_3 \quad (41)$$

Since the soft robot may involve both translational and rotational motion, two Euler's laws may be required to describe its dynamics. Applying Euler 1$^{st}$ law:

$$\Sigma\vec{F} = M \cdot {}^{\mathcal{F}}\vec{a}_C \quad (42)$$

$$Mg \cdot \hat{p}_3 - R_{21} \cdot \hat{p}_1 - R_{22} \cdot \hat{p}_2 - R_{23} \cdot \hat{p}_3 - R_f \hat{p}_2 + N_3 \cdot \hat{p}_3 + N_1 \cdot \hat{p}_1 + F_{a,2} \cdot \hat{p}_2 + F_{a,3} \cdot \hat{p}_3 = M \cdot (r\ddot{\varphi} \cdot \hat{p}_2 - r\dot{\psi}\dot{\varphi} \cdot \hat{p}_1) \quad (43)$$

Equating the left and right sides of (43) with respect to the orthogonal basis vectors, the following is obtained:

$$-R_{21} + N_1 = Mr\dot{\psi}\dot{\varphi} \quad (44)$$

$$-R_f + F_{a,2} = Mr\ddot{\varphi} \quad (45)$$

$$Mg - R_{23} + N_3 + F_{a,3} = 0 \quad (46)$$

According to Euler 2$^{nd}$ law:

$$\vec{M}_C = \frac{{}^{\mathcal{F}}d}{dt}\left({}^{\mathcal{F}}\vec{H}_C\right) \quad (47)$$

First, consider the left side of (47):

$$\vec{M}_C = (\vec{r}_B - \vec{r}_C) \times (\vec{N} + \vec{R}_f) + \vec{\tau}_f \quad (48)$$

$$\vec{M}_C = (rR_f - \tau_f) \cdot \hat{e}_1 + rN_1(\cos(\varphi) \cdot \hat{e}_2 - \sin(\varphi) \cdot \hat{e}_3)$$

Then, consider the right side of (47):

$$\mathcal{F}\vec{H}_C = {}_{\mathcal{R}}I_C \cdot {}^{\mathcal{F}}\vec{\omega}^{\mathcal{R}} \quad (50)$$

Where ${}_{\mathcal{R}}I_C$ is the moment of inertia tensor of the pivot arm with U-mount relative to the COM (point C) of the robot. While 3D modeling of the HASEL soft robot shows that the product of inertias for ${}_{\mathcal{R}}I_C$ may be non-zero, these values may be negligible compared to the diagonal components. For this reason, it may be assumed that $\{\hat{e}_1, \hat{e}_2, \hat{e}_3\}$ are the principal axis basis vectors and COM is the reference point and the product of inertias are treated as zeros. Given:

$$\mathcal{F}\vec{\omega}^{\mathcal{R}} = \dot{\psi} \cdot \hat{p}_3 + \dot{\varphi} \cdot \hat{p}_1 \quad (51)$$

$$\mathcal{F}\vec{\omega}^{\mathcal{R}} = \dot{\varphi} \cdot \hat{e}_1 + \dot{\psi}\sin(\varphi) \cdot \hat{e}_2 + \dot{\psi}\cos(\varphi) \cdot \hat{e}_3 \quad (52)$$

it may be stated:

$$\mathcal{F}\vec{H}_C = \begin{bmatrix} I_1 & 0 & 0 \\ 0 & I_2 & 0 \\ 0 & 0 & I_3 \end{bmatrix} \cdot \begin{bmatrix} \dot{\varphi}\hat{e}_1 \\ \dot{\psi}\sin(\varphi)\hat{e}_2 \\ \dot{\psi}\cos(\varphi)\hat{e}_3 \end{bmatrix} \quad (53)$$

$$\mathcal{F}\vec{H}_C = I_1\dot{\varphi}\cdot\hat{e}_1 + I_2\dot{\psi}\sin(\varphi)\cdot\hat{e}_2 + I_3\dot{\psi}\cos(\varphi)\cdot\hat{e}_3 \quad (54)$$

Applying rate of change transport theorem:

$$\frac{{}^{\mathcal{F}}d}{dt}\left({}^{\mathcal{F}}\vec{H}_C\right) = \frac{{}^{\mathcal{P}}d}{dt}\left({}^{\mathcal{F}}\vec{H}_C\right) + {}^{\mathcal{F}}\vec{\omega}^{\mathcal{R}} \times {}^{\mathcal{F}}\vec{H}_C \quad (55)$$

Equation (55) may be simplified to:

$$\mathcal{F}\frac{d}{dt}\left({}^{\mathcal{F}}\vec{H}_C\right) = \left(I_1\ddot{\varphi} + (I_3 - I_2)\dot{\psi}^2\sin(\varphi)\cos(\varphi)\right)\cdot\hat{e}_1 + \quad (56)$$
$$\left(I_2(\ddot{\psi}\sin(\varphi) + \dot{\psi}\dot{\varphi}\cos(\varphi)) + (I_1 - I_3)\dot{\psi}\dot{\varphi}\cos(\varphi)\right)\cdot\hat{e}_2 +$$
$$\left(I_3(\ddot{\psi}\cos(\varphi) - \dot{\psi}\dot{\varphi}\sin(\varphi)) + (I_2 - 1)\dot{\psi}\dot{\varphi}\sin(\varphi)\right)\cdot\hat{e}_3$$

Equating (49) and (56) with respect to the orthogonal basis vectors:

$$rR_f - \tau_f = I_1\ddot{\varphi} + (I_3 - I_2)\dot{\psi}^2\sin(\varphi)\cos(\varphi) \quad (57)$$

$$rN_1\cos(\varphi) = I_2(\ddot{\psi}\sin(\varphi) + \dot{\psi}\dot{\varphi}\cos(\varphi)) + (I_1 - I_3)\dot{\psi}\dot{\varphi}\cos(\varphi) \quad (58)$$

$$-rN_1\sin(\varphi) = I_3(\ddot{\psi}\cos(\varphi) - \dot{\psi}\dot{\varphi}\sin(\varphi)) + (I_2 - I_1)\dot{\psi}\dot{\varphi}\sin(\varphi) \quad (59)$$

From equations (36), (38), (45), (57), and the kinematic constraint (21), the following differential equation may be obtained:

$$LrF_2 - r\tau_f - L\tau_f = \quad (60)$$
$$LI_1\ddot{\varphi} + r(I_3 - I_2)\frac{I_{13}}{I_{23}}\ddot{\varphi}\sin(\varphi)\cos(\varphi) + \left(LMr^2 + I_{33}\frac{r^2}{L}\right)\ddot{\varphi}$$

The equation contains only one variable $\varphi$ but is nonlinear due to the term $\ddot{\varphi}\sin(\varphi)\cos(\varphi)$. However, since $I_3 - I_2 \approx 0$, this term may be dropped. The friction torques of the bearing may be treated as constants and its direction depend on the direction of the wheel angular velocity. Therefore, (60) can be simplified as:

$$\left(Ll_1 + LMr^2 + I_{33}\frac{r^2}{L}\right)\ddot{\varphi} = LrF_{a,2} - (r\tau_f + L\tau_f)\text{sign}(\dot{\varphi}) \quad (61)$$

From (61), the continuous-time state-space model during activation periods can be written as follow:

$$\begin{bmatrix}\dot{\xi}_1 \\ \dot{\xi}_2\end{bmatrix} = \begin{bmatrix}\xi_2 \\ \dfrac{1}{Ll_1 + LMr^2 + I_{33}\dfrac{r^2}{L}}(LrF_{a,2} - (r\tau_f + L\tau_f)\text{sign}(\xi_2))\end{bmatrix} \quad (62)$$

where $\xi_1 := \varphi \in \mathbb{R}$ is the angular position of the HASEL wheel, and $\xi_2 := \dot{\varphi} \in \mathbb{R}$ is the angular velocity of the HASEL wheel.

The variable $\xi_1$ may represents the angular position of the rolling soft robot with respect to time and may also track the relative position of 16 actuators with respect to the ground. The actuator index $0^{th}$ to $15^{th}$ may be associated to 16 actuators. The angle $\xi_1$ of 0 to $\pi/8$ radian may correspond to the actuator $0^{th}$; the angle $\xi_1$ of $i\cdot\pi/8$ to $(i+1)\cdot\pi/8$ radian corresponds to the actuator $i^{th}$. Furthermore, the state space model may track the current actuator index, $\eta$, that is within 0 and $\pi/8$ angle from vertical plane. This plane may be defined by three points A, B and C as seen in FIG. 18. In other words, $\eta = i$ when the actuator $i^{th}$ is in contact with the ground. Based on this mapping, the actuator that is in contact with the ground may be determined by rounding down the result of the division between the wheel angle $\xi_1$ and $\pi/8$:

$$\eta = \lfloor \xi_1/(\pi/8) \rfloor \quad (63)$$

Figure 21:
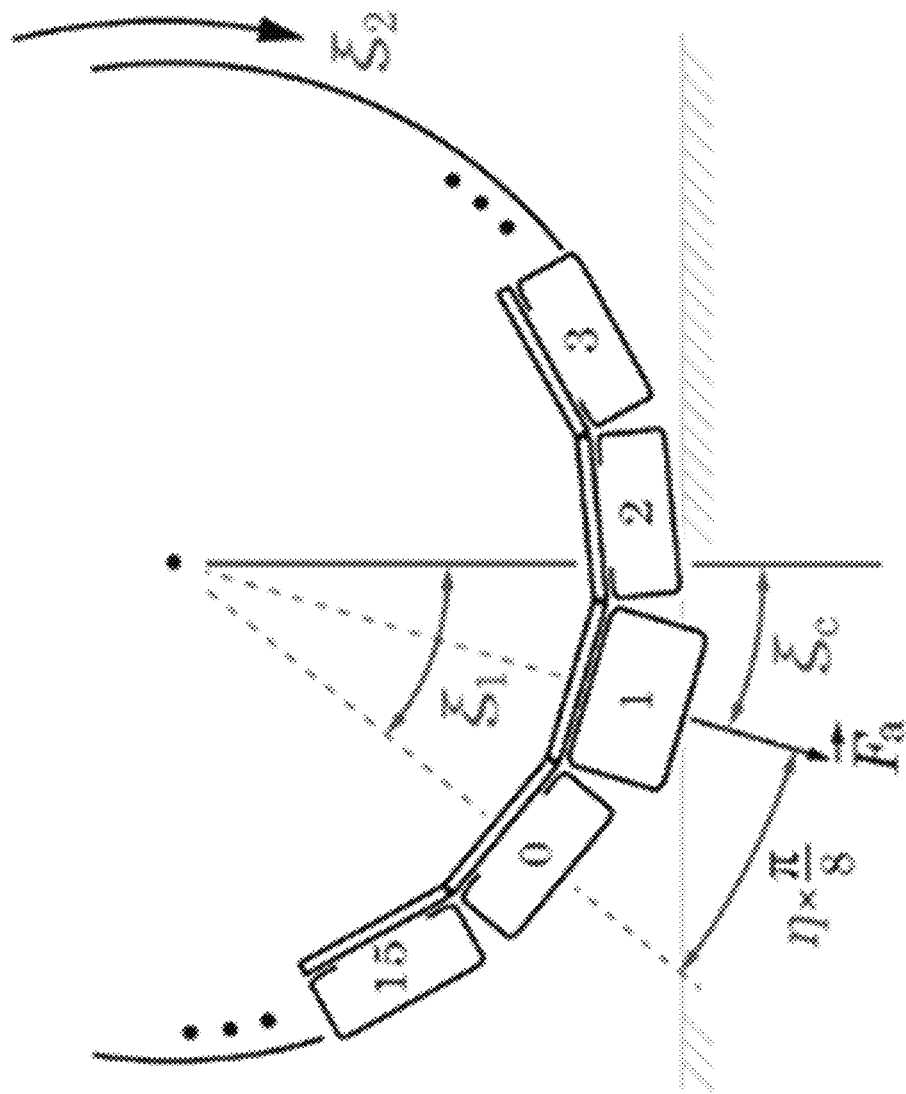
FIG. 21 illustrates an example contact angle $\xi_c$ of actuator of an electro-hydraulic rolling soft robot.

Based on the wheel angle $\xi_1$ and the contact actuator index $\eta$, the contact angle may be defined as the current angle of the actuator $\eta^{th}$ with respect to the vertical plane that is defined by three points A, B and C in FIG. 21. Therefore, $\xi_c$ ranges from 0 to $\pi/8$.

$$\xi_c = \xi_1 - \theta \cdot \pi/8 \quad (64)$$

When and for how long the actuation force is applied to the robot by each actuator may depend on three inputs. The activation angle, $\varphi_a$, is the contact angle $\xi_c$ of the actuator $\theta^{th}$ that the actuator $\eta^{th}$ activates. Based on this definition, $\varphi_a \in [0, \pi/8]$. The deactivation angle of actuator $\eta^{th}$, $\varphi_d$, is the contact angle $\xi_c$ of the actuator $\eta^{th}$ that the actuator $\eta^{th}$ deactivates. Therefore, $\varphi_d \in [0, \pi/8]$ and $\varphi_d > \varphi_a$. Finally, the target actuator, $n_a$, may be the next actuator to be activated. Therefore, the following input may be provided:

$$u = \begin{bmatrix} n_a \\ \varphi_a \\ \varphi_d \end{bmatrix} \quad (65)$$

To conveniently track the status of the actuator $\eta^{th}$, a state $q \in \{0,1\}$ may be introduced, with $q=0$ means the actuator $\eta^{th}$ is not activated, and $q=1$ means the actuator $\eta^{th}$ is activated. Since the robot's performance may depend on the contact angles at which the HV optocoupler is turned on and at which the HV optocoupler is turned off, two additional non-physical states may be introduced to track these angles:

activation-angle down counter, $\Delta$, and deactivation-angle down counter, $\delta$. The activation-angle down counter decrements from the last moment q switches from 1 to 0 to the next moment q switches from 0 to 1. In other words, this variable decreases its value, at which the HV optocoupler of the current actuator turns off, to zero. When zero is reached, the HV optocoupler of the next actuator, determined by input $n_a$, may be turned on. The deactivation-angle down counter may begin decreasing when the last time q switches from 1 to 0 to zero. The zero-valued deactivation-angle down counter signals the robot to switch q from 1 to 0 again, and the process repeats. These down counters may decrement at the same rate as the angular velocity as follow: $\dot{\Delta} = -(1-q)\,\xi_2$ and $\dot{\delta} = -\xi_2$.

The force applied between the robot and the ground may not be instantaneous or constant over its activation duration. The force with respect to the contact angle $\xi_c$ may be dependent on the actuation status, the activation angle $\varphi_a$, and the angular speed $\xi_2$. It may be assumed the actuation force function to have the following form.

$$F_a(\xi_c, \xi_2, q, \varphi_a) = \frac{1}{\xi_c^{\sigma_1}} \frac{1}{\sigma^2 \xi_2 + \sigma_3} e^{-\frac{(\ln(\xi_c) - \sigma_4)^2}{\sigma_5^2}} q\sigma_6(\xi_c - \varphi_a) \quad (66)$$

Figure 22:
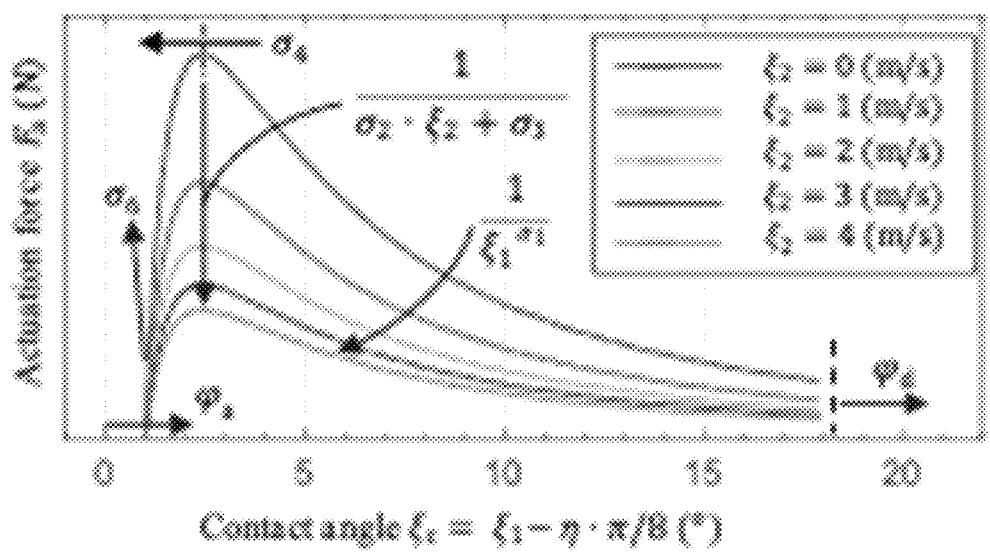
FIG. 22 illustrates example charted shapes for an actuation force $F_a$ with respect to a contact angle $\xi_c$ and angular speed of an actuator $\eta^{th}$.

The shape of the actuation force $F_a$ may depend on the six parameters $\sigma_1$, $\sigma_2$, $\sigma_3$, $\sigma_4$, $\sigma_5$, and $\sigma_6$, four states $\xi_1$, $\xi_2$, q, and $\eta$, and one input $\varphi_a$. It can be seen from FIGS. 23-26 that the shape of the actuator force can be adjusted by changing the values of the parameters and the states. The arrows indicate the modification of the shape of the force function due to the increases of the corresponding parameters, states, or inputs. Specifically, increasing $\varphi_a$ causes the actuator to activate a larger contact angle, increasing $\sigma_6$ increases the left-side slope of the force function, increasing $\sigma_1$ makes the right-side slope of the force function more curvy, increasing $\sigma_2$, $\xi_2$, or $\sigma_3$ reduces the peak force, and increasing the deactivation angle $\varphi_d$ increases the angle at which the generated force is cut off. The general equation of the force function may be deduced from the observation that the force must increase rapidly from 0 N at the activation angle, reach its peak, and diminish gradually as the robot's angle increases. Since the rate of the actuator's stroke may be finite, the peak force it generates should decrease as the robot's speed increases, hence the exponential function. While the activation angle $\varphi_a$ determines at which angle the actuator force to rise from 0 N, the deactivation angle $\varphi_d$ determines the angle at which the force output is cut off (FIG. 22). The input $\varphi_d$ is not explicitly shown in the force function $F_a(\xi_c, \xi_2, q, \varphi_a)$, yet it determines when q switches from 1 to 0, as it is used to update the deactivation-angle down counter shown in (73).

Since $F_{a,2}$ is the magnitude of $\hat{p}_2$ component of $\vec{F}_a$:

$$F_{a,2} = F_a \cdot \sin(\xi_c) \quad (67)$$

The state-space model may be continuous in the entire duration of activation or deactivation of an actuator. Therefore, during these periods, the actuation status, q, and the actuator of interest, $\eta$, may not change their states ($\dot{q}=0$, $\dot{\eta}=0$). The continuous state-space model (62) of the HASEL wheel may be rewritten as follows:

$$\begin{bmatrix} \dot{\xi}_1 \\ \dot{\xi}_2 \\ \dot{q} \\ \dot{\Delta} \\ \dot{\delta} \\ \dot{\eta} \end{bmatrix} = \begin{bmatrix} \xi_2 \\ \dfrac{1}{LI_1 + LMr^2 + I_{33}\dfrac{r^2}{L}}(Lr(F_a\sin(\xi_c)) - (r\tau_f + L\tau_f)\text{sign}(\xi_2)) \\ 0 \\ -(1-q)\xi_2 \\ -\xi_2 \\ 0 \end{bmatrix} \quad (68)$$

What happens at the moments q switches from 0 to 1 or q switches from 1 to 0 can be modeled using a hybrid dynamic framework. Given state $x \in \mathbb{R}^n$, input $u \in \mathbb{R}^m$, and output $y \in \mathbb{R}^p$, the framework may have the following form:

$$\mathcal{H} = (C, f, D, g) \quad (69)$$

$$\mathcal{H} = \begin{cases} \dot{x} = f(x, u) & (x, u) \in C \\ x^+ = g(x, u) & (x, u) \in D \\ y = h(x) \end{cases} \quad (70)$$

where f is flow map, C is flow set, g is jump map, and D is jump set. The flow component of the model, $\dot{x}=f(x, u)$, is introduced in (67). The jump component, $x^+=g(x, u)$, represents a discrete jump of the state x to $x^+$ based on the function g(x, u). The superscripts + indicates that the states x change instantaneously into $x^+$. The function g(x, u) serves two purposes: It is in which the inputs are implemented to update the states of the system and toggle the actuator status q. The following section explains what happen to all six states during jumps.

Firstly, the jump map may not discretely change the state of the wheel angular position and angular velocity; therefore $\xi_1$ and $\xi_2$ remain constant during jumps. Secondly, the status of the actuator of interest, q, may be binary from 0 to 1 or from 1 to 0. Therefore, $$q^+ = 1 - q \quad (71)$$

Thirdly, the updated activation-angle down counter may be calculated based on the sum of the activation angle of the next actuator and its actuator index multiplied by $\pi/8$ (the angle between every two adjacent actuators), minus the current angular position of the wheel as follow:

$$\Delta^+ = q\left(\varphi_a + n_a\left(\dfrac{\pi}{8}\right) - \xi_1\right) \quad (72)$$

Fourthly, the updated deactivation-angle down counter may be calculated based on the addition of the deactivation angle of the next actuator and its actuator index multiplied by $\pi/8$, minus the current angular position of the wheel as follow:

$$\delta^+ = \varphi_d + n_a\left(\dfrac{\pi}{8}\right) - \xi_1 \quad (73)$$

The main difference between the jump equations for the activation-angle down counter and the deactivation-angle down counter may be that the activation-angle down counter only decrements during the duration of q=0. As soon as it becomes zero, q=0 turns into $q^+=1-q=1$ and remains zero since $\dot{\Delta}=-(1-q)\cdot\xi_2$ (with q=1 after the jump), causing the PCB to switch on the corresponding optodiode, thus activating the actuator However, the deactivation-angle down counter may become zero at the moment $\xi_1=\varphi_d+n_a(\pi/8)$, causing q=1 to turn into $q^+=0$. The change of state q=1 to $q^+=0$ notifies the PCB to switch off the corresponding optodiode, thus deactivating the actuator η. Finally, the switching rule for the current actuator index η depends on the actuation status q right before the jump. In the first scenario where q=1 becomes $q^+=0$, the current actuator η has just deactivated, the jump rule determines that the next actuator index η equals the target actuator index $n_a$ obtained from the input u: $\eta^+=n_a$. In the second scenario where q=0 becomes $q^+=1$, the current actuator η starts to activate. Therefore, the jump rule determines that there should be no changes in the actuator index: $\eta^+=\eta$. Combining the two scenarios:

$$\eta^+ = qn_a + (1-q)\eta \quad (74)$$

From equations (71), (72), (73), and (74):

$$\begin{bmatrix} \xi_1^+ \\ \xi_2^+ \\ q^+ \\ \Delta^+ \\ \delta^+ \\ \eta^+ \end{bmatrix} = \begin{bmatrix} \xi_1 \\ \xi_2 \\ 1-q \\ q\left(n_a\left(\dfrac{\pi}{8}\right)+\varphi_a-\xi_1\right) \\ n_a\left(\dfrac{\pi}{8}\right)+\varphi_d-\xi_1 \\ qn_a+(1-q)\eta \end{bmatrix} \quad (75)$$

Finally, the flow and jump sets describe the jump and flow conditions. These conditions determine which mapping function (jump or flow) is applied to the dynamics. Since flow and jump may not happen simultaneously, these sets are exclusive from one another. Specifically, jump set is satisfied as soon as $(\Delta=0 \wedge \delta\neq 0 \wedge q=0) \vee (\Delta=0 \wedge \delta=0 \wedge q=1)$. Flow set is satisfied whenever jump set is not satisfied. When the jump set is satisfied, the model follows the jump map $x^+=g(x, u)$. When flow set is satisfied, the hybrid dynamic model follows the flow map $\dot{x}=f(x, u)$. These sets also describe the feasible values of states x during flow and jump, respectively. Therefore:

$$D := \{x \in \mathbb{R}^2 \times \{0, 1\} \times \mathbb{R}^2 \times N_{\geq 0} | (\Delta = \quad (76)$$

$$0 \wedge \delta \neq 0 \wedge q = 0) \vee (\Delta = 0 \wedge \delta = 0 \wedge q = 1)\}$$

$$C := \{x \in \mathbb{R}^2 \times \{0, 1\} \times \mathbb{R}^2 \times N_{\geq 0} | \sim (\Delta = \quad (77)$$

$$0 \wedge \delta \neq 0 \wedge q = 0) \wedge \sim(\Delta = 0 \wedge \delta = 0 \wedge q = 1)\}$$

Figure 23:
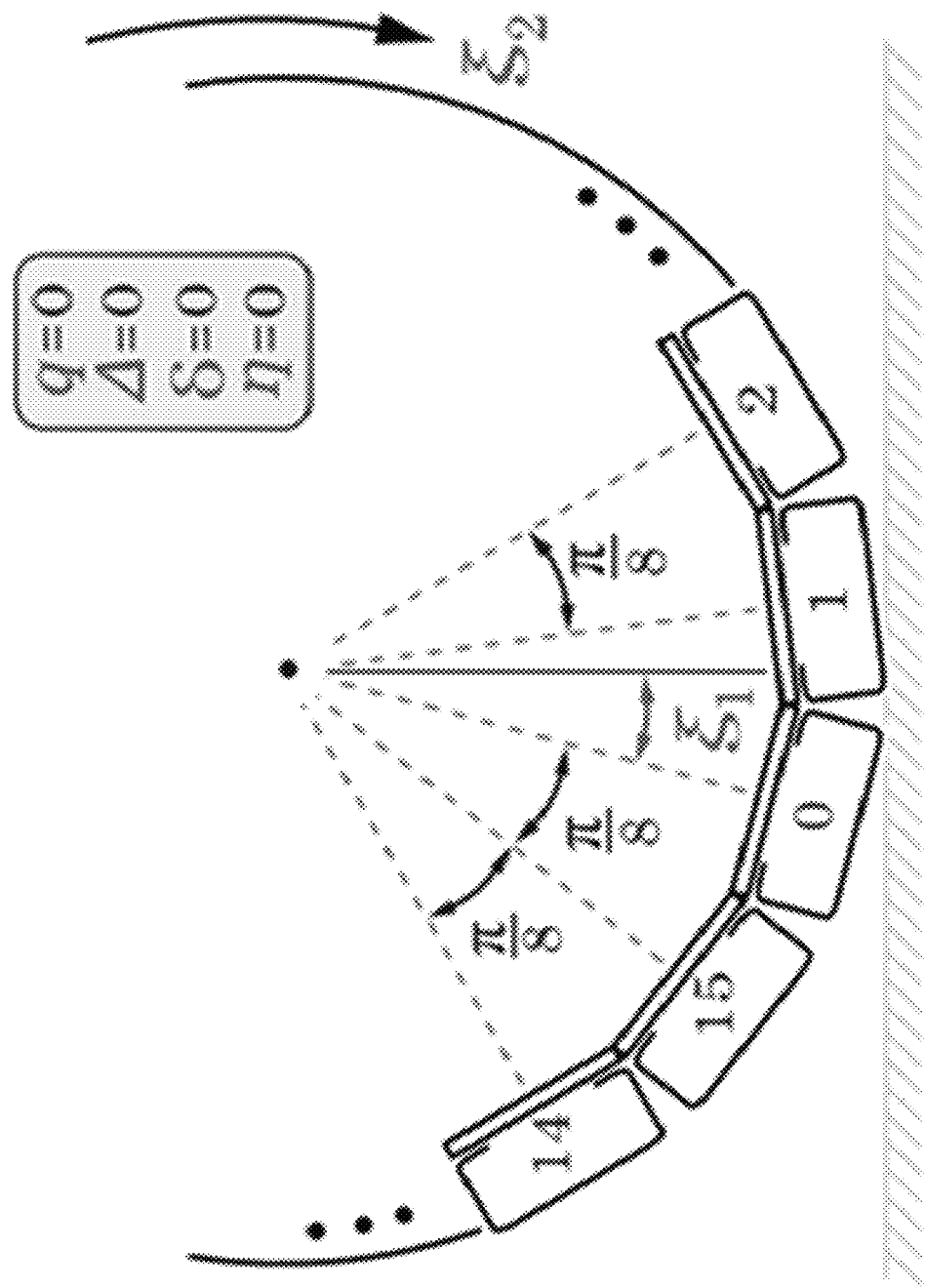
FIG. 23 illustrates an example of a first time of operation of an electro-hydraulic rolling soft robot where the robot has initial angular position and angular speed.
Figure 24:
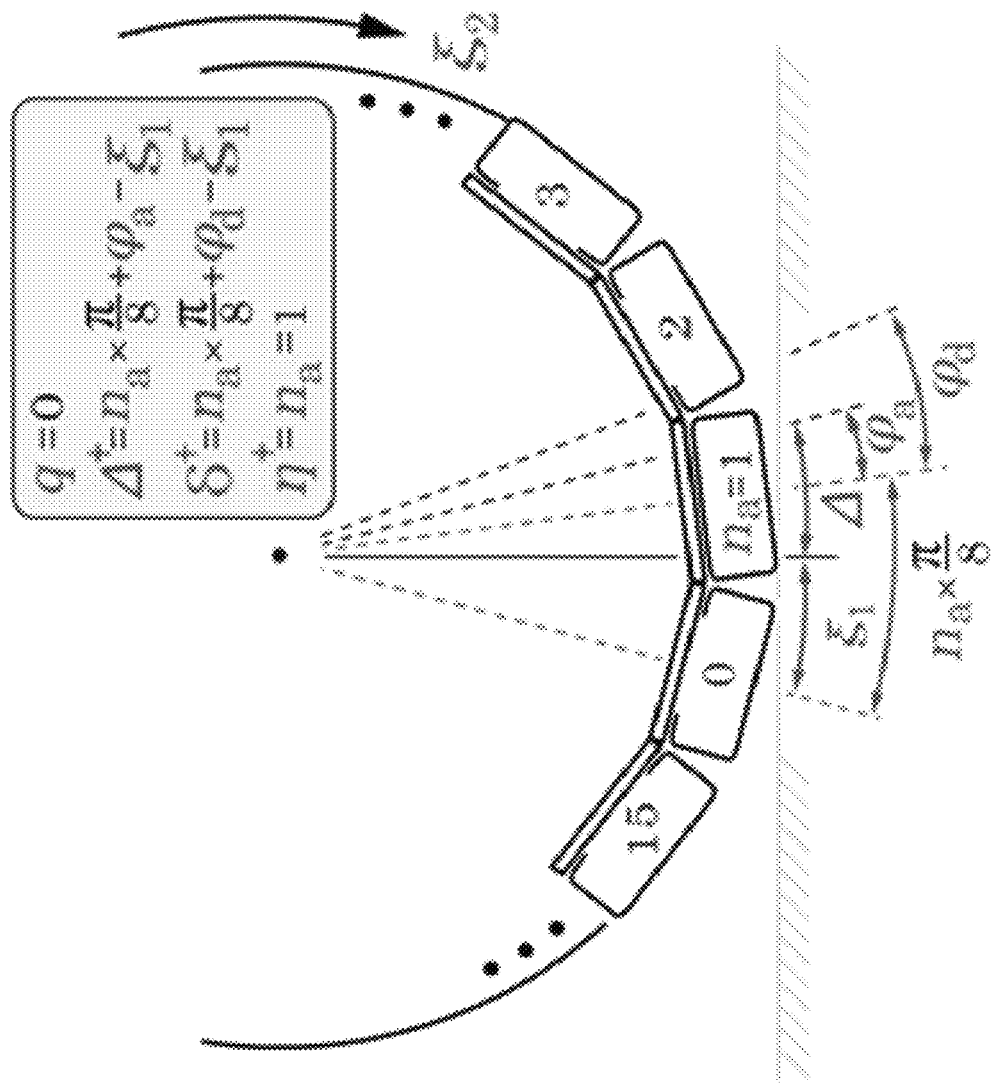
FIG. 24 illustrates an example of a second time of operation of an electro-hydraulic rolling soft robot in which a target actuator, an activation-angle down counter, and a deactivation-angle down counter are updated.
Figure 25:
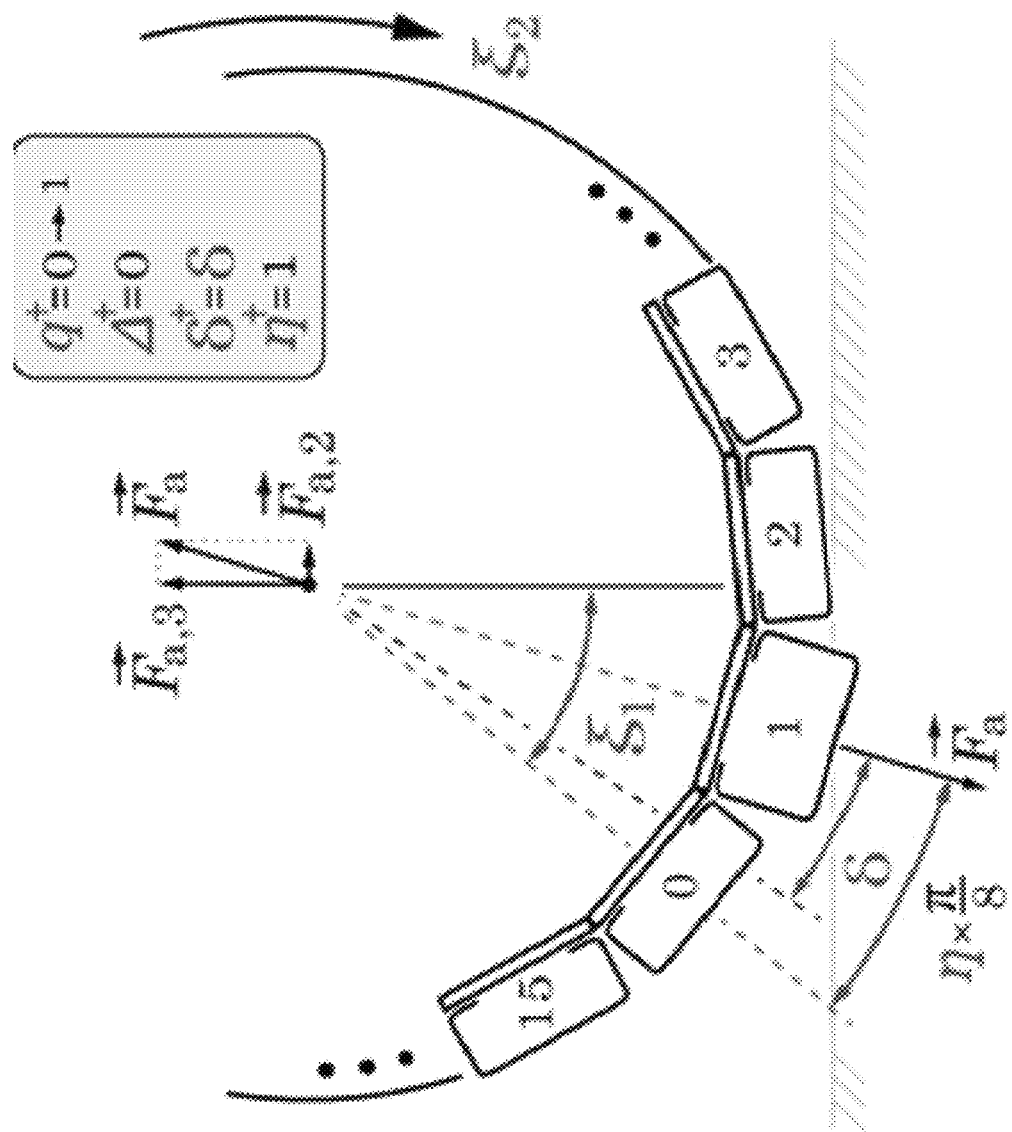
FIG. 25 illustrates an example of a third time of operation of an electro-hydraulic rolling soft robot in which an actuator activates.
Figure 26:
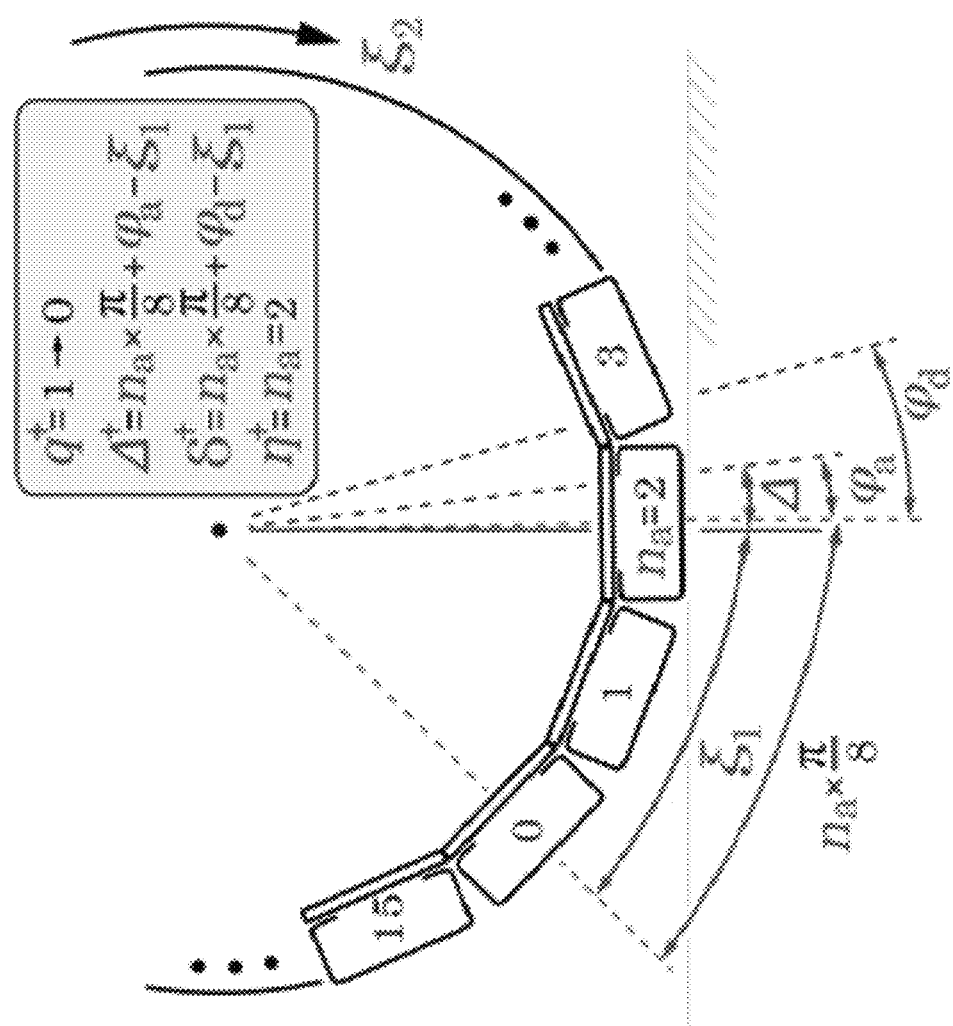
FIG. 26 illustrates an example of a fourth time of operation of an electro-hydraulic rolling soft robot in which an actuator deactivates.

FIGS. 23-26 collectively show an example operation of a HASEL rolling robot. In FIG. 23, the robot has initial angular position and angular speed. In FIG. 24, the target actuator, an activation-angle down counter, and a deactivation-angle down counter may be updated. FIG. 25 shows the moment at which the actuator $1^{th}$ activates, and FIG. 26 shows the moment at which the actuator $1^{th}$ deactivates.

Initially, the HASEL rolling robot may have activation status q=0, activation-angle down counter $\Delta=0$, deactivation-angle down counter $\delta=0$, and current actuator index η=0 (FIG. 23). Given the measurement of angular position $\xi_1$, the robot can determine the value of current actuator index using (63). The robot enters the jump map and update the values of q, $\Delta$, $\delta$, and η according to the input u (FIG. 24). With an initial angular speed $\xi_2$, the robot rolls, increments $\xi_1$, and decrements both $\Delta$ and $\delta$. As the activation-angle down counter reaches zero, the jump condition $\Delta=0 \wedge \delta\neq 0 \wedge q=0$ is satisfied, which triggers the hybrid dynamic model to enter the jump map. The jump map determines that the activation status switches from 0 to 1, signaling the optocoupler $1^{st}$ to close and activate the actuator $1^{st}$, as shown in FIG. 25. The deactivation-angle down counter remains the same after the jump and continue to decrease in the flow ($\delta^+=\delta$), and the current actuator index $\eta$ remains 1. The generated force component $F_{a,2}$ causes the robot to accelerate and increase the angular speed $\xi_2$, which further decreases $\delta$. As the deactivation-angle down counter reaches zero, the jump condition $\Delta=0 \wedge \delta=0 \wedge q=1$ is satisfied, which triggers the hybrid dynamics to enter the jump map again. This time, the jump map determines that the activation status switches from 1 to 0, signaling the optocoupler $1^{st}$ to open and deactivate the actuator $1^{st}$, as shown in FIG. 26. The jump map also updates the new values of q, $\Delta$, $\delta$, and $\eta$ according to the new input u, which determines the next target actuator ($2^{nd}$ in this example) to activate.

The cycles of activation-deactivation repeats as long as $\Delta$ and $\delta$ alternatively decrement to zero. For a relatively slow angular speed and certain target actuator $n_a$, it is possible that the robot reaches a complete stop ($\xi_2=0$) before $\Delta=0$ or $\delta=0$ and before the target actuator $n_a$ is in contact with the ground. If the problem causes the robot to reach a complete stop, it can simply restart by using (63) to determines its current actuator index $\eta$ and contact angle $\xi_c$, turn on the HV to the current actuator, and begin rolling again. However, there are certain angular positions $\xi_1$ for a resting robot that the actuator corresponding to the actuator index $\eta$ cannot produce sufficient a horizontal force component to move the robot.

Turning to braking rules for the robot, unlike traditional axle-based and torque-based wheels, the rolling soft robot may achieve braking by activating the actuator in the direction that its force component $F_{a,2}$ opposes the rolling direction. In the control problem of speed regulation, the robot can lower its speed by passively decelerate thanks to the system's frictions; however, active decelerations via braking allows the robot to react more quickly to the environment and reaches target angular speed more effectively. For this reason, incorporating braking in the control of the wheel may be desired.

When the robot is in motion, the current actuator $i^{th}$ in contact with the ground is described in the hybrid dynamic model as $\eta=i$. The braking behavior is achieved by selecting the next actuator to be activated as $n_a=i+2$ instead of i+1, which results in a negative contact angle since $\xi_c=\xi_1-(i+2)\pi/8<0$. As the wheel continues to roll, $\xi_1$ increases, causing the contact angle to increase from a negative value to zero. The activation and deactivation angles corresponding to the actuator $(i+2)^{th}$ are therefore negative. Specifically, the activation angle and the deactivation angles are between −22.5° and 0° with the activation angle is closer to −22.5° and the deactivation angle is closer to 0°. The negative activation-angle down counter $\Delta$ and deactivation-angle down counter $\delta$, when multiplied with $-\xi_2$, as seen in (72) and (73), become up counters from negative values to zero. With this setup, the jump map, flow map, jump set, and flow set for active deceleration are identical to those for acceleration. The braking behavior is therefore achieved by simply selecting the appropriate inputs $n_a$, $\varphi_a$, and $\varphi_d$. The force function generated by braking motion might resemble that by acceleration motion.

To quantify the location and orientation of the electrohydraulic rolling soft robot on the platform, a motion capture system (e.g., OptiTrack, NaturalPoint Inc.) may be used that consists of 8 infrared cameras (e.g., Prime$^x$ 22, NatruralPoint Inc.) with a 3D accuracy of +/−0.15 mm and a sampling rate of 360 Hz. The data is collected to CSV format and then post-processed using MATLAB (e.g., MATLAB R2020a, MathWorks).

Furthermore, the continuous dynamic equation $\dot{x}=f(x, u)$ is discretized using Runge-Kutta $4^{th}$ order method with a step size h=0.00333 (s) in both the parameter estimation section and the real-time control section.

Due to the wheel's large inertias, contact frictions, and the bearings' frictions, at certain initial contact angles for an arbitrary actuator that is in contact with the ground, the HASEL soft robot that is initially at rest may be unable to exert sufficient horizontal force component to push itself forward. These contact angles may be referred to as the dead angles. To address the limitation, the wheel may rock slightly backward by activating the adjacent actuators so that the wheel can move out of the dead angles.

Specifically, for an actuator $i^{th}$ in contact with the ground, the following initial contact angles that make the robot impossible to roll forward are: 0 degrees to 2 degrees and 17 degrees to 22.5 degrees. From 0 degrees to 2 degrees, the activated actuator $i^{th}$ applies an almost-vertical force which may have insufficient horizontal force component for the wheel to roll forward. From 17 degrees to 22.5 degrees, the activated actuator is in contact with the ground near its maximum stroke, resulting in minimal output force. This problem arises due to the actuator's force exponentially diminishes with an increasing stroke. Since our folded-HASEL actuator may have a maximum stroke of 12 mm, the closer the actuator reaches the stroke of 12 mm, the weaker the output force becomes, resulting diminishing horizontal force component.

At the dead angles for a particular actuator $i^{th}$, the robot activates the actuator $(i+1)^{th}$ to rock the wheel backward and out of the dead-angle regions. For example, FIGS. 29a and 29b show the actuator $3^{rd}$ as the actuator is in contact with the ground with initial contact angles of 0.5 degrees and 1.5 degrees, respectively. In these scenarios, the actuator $4^{th}$ may be activated to rock the robot backward and out of the 0 degree to 2 degree zone of the actuator 3rd. The actuator $3^{rd}$ activates after the actuator $4^{th}$ deactivates to move the robot to the 2degree-to-17degree region of the actuator $2^{nd}$. From here, the actuator $2^{nd}$ successfully moves the robot forward. FIGS. 29c and 29d show a normal robot starting sequence as the initial contact angle ($14^{th}$ and $3^{rd}$, respectively) is within 2 degree-to-17 degree. FIGS. 29e and 29f show the rocking sequence of the robot with the initial contact angles of 17.5 degrees and 18.0 degrees of the actuator 5th. In this scenario, the actuator $6^{th}$ rocks the wheel backward and out of the dead angles, after which the actuator $5^{th}$ moves the robot forward. Finally, FIGS. 29g and 29h show the rocking sequence of the robot with the initial contact angles of 21 degrees and 22 degrees of the actuator $3^{rd}$. Similar to the scenarios in FIGS. 21 and 22 the robot rolls backward by activating the actuator $4^{th}$ and $3^{rd}$, then roll forward thanks to the actuator $2^{nd}$.

Based on all scenarios, FIG. 29 demonstrates that the rolling robot can successfully roll forward starting at any initial contact angles. From the design standpoint, the problem of dead angles can be mitigated by increasing number of actuators on the frame with each actuator's footprint being smaller than the one used in this work. Increasing the number of smaller actuators also ensure smoother dynamics and allow for more accurate and precise control of the rolling speed. While the bearings are necessary components for the robot to roll continuously on the platform, the added bearing friction torques affect the wheel's ability to start and its maximal steady-state angular speed. A different experimental setup that does not require the robot's circular rolling motion is a simple solution to reduce the frictions on the wheel.

The HASEL rolling robot may be powered by an external power supply with a constant voltage of 8 V. The robot's power consumption may be measured during the idle state and rolling state using an analog current sensor (e.g., ACS723, Sparkfun) and multiply the measured current with 8 V to get the respective power values. FIGS. 27 and 28 show the power consumption of the rolling robot. In an example, a robot may roll from rest for 60 seconds (the amount of time needed for the robot to reach stead-state linear speed) with the same deactivation angle $\varphi_d=22°$ and five different activation angles $\varphi_a$ (1°, 3°, 5°, 7, and 9°). FIG. 27 shows the power consumption of the robot with the activation angle $\varphi_a=1°$. At idle, the robot draws a constant power of 1.22 W, due to the idle power consumption of the high voltage DC-DC converter. As the robot rolls, the current to the robot spikes and dips when q state switches between 0 and 1, resulting instantaneous power swings between 10 W and 20 W. As seen in FIG. 28, five-second-window moving-average power consumptions for five activation angles may be obtained. While the instantaneous power consumption remains the same in all cases, larger activation durations (calculated by subtracting the activation angle from the deactivation angle) mean longer periods of optocouplers being on, causing the robot to draw more current. It is therefore expected that the robot requires the most power (approximately 14 W at steady-state) with activation angle of $\varphi_a=1°$ and the least power (approximately 8 W at steady-state) with activation angle of $\varphi_a=9°$. Furthermore, unlike traditional torque-based cars whose power consumption can be optimal at a given speed, the average power consumption versus rolling speed of the HASEL robot monotonically increases as the speed increases.

While most parameters for an accurate hybrid dynamic model of the wheel's motion are presented in TABLE 2, the friction torque's of the two set of bearings on the pivot and the wheel are unavailable from the supplier. For simplicity, the friction torques are treated as constants. Their values can be estimated by performing an optimization procedure.

TABLE 2

Mechanical characteristics of the rolling soft robot

| Parameters | Values | Units |
| --- | --- | --- |
| Weight of wheel M | 0.979 | kg |
| Distance of wheel COM to pivot center L | 0.642 | m |
| Radius of wheel r | 0.157 | m |
| POI of pivot arm $I_{13}$ | −0.00176 | kg · m² |
| POI of pivot arm $I_{23}$ | −4.97 × 10⁻⁶ | kg · m² |
| POI of pivot arm $I_{33}$ | 0.0759 | kg · m² |
| MOI of the wheel $I_1$ | 0.00717 | kg · m² |
| MOI of the wheel $I_2$ | 0.00402 | kg · m² |
| MOI of the wheel $I_3$ | 0.00391 | kg · m² |

Firstly, thirty set of angular position and angular velocity of the wheel, with arbitrary initial angular velocity and angular position, are captured using the motion capture system. The first twenty training data set may be used to estimate the friction torque by minimizing the sum of squared of the error between the estimated states and the measured states (angular positions and velocities). The result is $\tau_f=0.0104$ (kg m²s⁻²). The wheel's dynamics may be simulated using this $\tau_f$ value and compare the R-squared results with the remaining ten test sets. The goodness of fit values for the angular position of the wheel range between 0.962 and 0.999 with an average of 0.987. The goodness of fit values for the angular velocity of the wheel range between 0.793 and 0.9890 with an average of 0.938.

The fluctuation in goodness of fits value for the angular velocity may be explained by the design of the bearings and the rolling soft robot. At very low velocity (less than 0.3 rad/s), the friction torques become nonlinear and affect the dynamics of the wheel. Besides, some actuators slightly protrude from the edge of the rim due to the hysteretic stretches of the Ecoflex wrap due to the repeated activation-deactivation cycles. These two effects result in some variation in the observed wheel's velocities. However, the value $\tau_f=0.0104$ (kg m²s⁻²) is sufficiently good for the subsequent experiments.

The effect of the forces generated by the actuators may be observed indirectly based on whether the robot accelerates or decelerates. As previously mentioned, the actuator force may depend on the robot's dynamic states, including the contact angle $\xi_c$, the current angular speed $\xi_2$ and the actuator's status q, and the control input u, which includes the activation angle $\varphi_a$, and the deactivation angle $\varphi_d$. Since it may be assumed that all actuators are identical, the actuation force should not depend on which actuator ($n_a$) being activated.

To estimate the actuation force function, the first six actuators may activate at the activation angle $\varphi_a=3°$ to ensure the robot has sufficient momentum for continuous rolling. In the subsequent activations, the wheel's angular speed may be determined with respect to a combination of activation angle $\varphi_a$ ranging from 1° to 11°, and the deactivation angle $\varphi_d$ ranging from 12° to 22°. Specifically, all actuators past the initial six actuators may be activated sequentially, thus removing the influence of input $n_a$ from the experiment, and all actuators have the same predetermined activation and deactivation angles throughout the 60-second-long trials. The activation and deactivation angles are the same for all actuators in a trial and are only varied across different trials. The influences of the activation angles and deactivation angles on the wheel speed rise-time $t_r$ (s) and steady-state value $\xi_{2,ss}$ (m/s) are documented in Table 3. Any combination of activation angle and deactivation angles shown in the gray region of Table 3 result in the robot's discrete rolling behavior.

Based on this table, for the same activation angle, varying the deactivation angle has little influences on the wheel's steady state linear speed, as seen by the unclear patterns of the steady state linear speed with respect to increasing the deactivation angle. This behavior agrees with the general form of the force function as the force diminishes rapidly as the distance between the actuator and ground increases (due to increasing in activation angle).

TABLE 3

Influences of the activation angle and deactivation angle on the rise time and stead state angular speed

| | | $\delta_a$ (°) | | | | |
| --- | --- | --- | --- | --- | --- | --- |
| $\delta_d$ (°) | | 1 | 3 | 5 | 7 | 9 | 11 |
| 22 | $t_r$ (s) | 29.17 | 26.23 | 27.04 | 23.83 | 12.57 | |
| | $\xi_{2,ss}$ (m/s) | 0.57 | 0.43 | 0.39 | 0.32 | 0.21 | |
| 20 | $t_r$ (s) | 31.86 | 25.20 | 31.37 | 16.63 | 19.45 | |
| | $\xi_{2,ss}$ (m/s) | 0.48 | 0.44 | 0.5 | 0.31 | 0.24 | |

TABLE 3-continued

Influences of the activation angle and deactivation angle on the rise time and stead state angular speed

| | | $\delta_a$ (°) | | | | | |
|---|---|---|---|---|---|---|---|
| $\delta_d$ (°) | | 1 | 3 | 5 | 7 | 9 | 11 |
| 18 | $t_r$ (s) | 32.76 | 25.98 | 27.17 | 18.30 | | |
| | $\xi_{2,ss}$ (m/s) | 0.63 | 0.45 | 0.38 | 0.36 | | |
| 16 | $t_r$ (s) | 36.22 | 30.96 | 34.34 | | | |
| | $\xi_{2,ss}$ (m/s) | 0.47 | 0.38 | 0.31 | | | |
| 14 | $t_r$ (s) | 38.37 | 37.34 | | | | |
| | $\xi_{2,ss}$ (m/s) | 0.42 | 0.42 | | | | |
| 12 | $t_r$ (s) | 32.19 | | | | | |
| | $\xi_{2,ss}$ (m/s) | 0.53 | | | | | |
| 11 | | | | | | | |

For the same activation angle, varying deactivation angles does not significantly influence the steady state speed of the robot. The fluctuation of the linear speed for the same activation can be explained by the actuator's charge retention, which occurs after applying high electric fields for a period of time and causes the actuator's performance to worsen over time. This may be related to space charge creation in the thin-film dielectrics, caused by ionization of low-molecular-weight impurities under application of high electric fields. Since the order of experiences for the Table 3 is randomized, the experiments that are conducted earlier result in greater steady-state linear speed.

For the same deactivation angle, increasing the activation angle results in smaller actuation force, which in turn results in smaller steady-state linear speed. This is consistent with the shape of the force function. However, there are no clear trends for the rise time of the angular speed of the wheel with respect to either the activation angle or the de-activation angle. The process of estimating the force function's parameters may be simplified by fixing the deactivation angle to its maximum value of 22° and only varying the activation angles. With the input $n_a$ simply incrementing based on $n_a=16 \mod (\eta+1)$ and the input $\varphi_d=22°$, the 3-input-6-state hybrid dynamics model becomes 1-input-6-state model. Due to the nonlinear problem of the force function's parameter estimation that contains containing both continuous and discrete components, particle swarm optimization (PSO) algorithm thanks to both of its simplicity and independence of optimization problem's nonlinearity. The algorithm solves an optimization problem by having a population of candidate solutions, dubbed particles, and moving these particles around in the search-space according to simple mathematical formula over the particle's position and velocity. Since PSO is a metaheuristic as it makes few or no assumptions about the problem being optimized and can search very large spaces of candidate solutions, and PSO does not use the gradient of the problem being optimized, the algorithm is ideal for the estimation of actuation force's parameters.

The candidate solutions are the set of force function's parameters $\{\sigma_1, \sigma_2, \sigma_3, \sigma_4, \sigma_5, \sigma_6\}$, as shown in (66). The force function is generated based on these parameters and applied to the hybrid dynamics model to simulate the robot's angular position and angular speed. The objective function is to minimize the sum of squared errors between the simulated linear speed and the measured linear speed for all trials with different activation angles from 1° to 9° with an increment of 2° and same deactivation angle of 22°. Specifically, $x_i^k=\{\sigma_1, \sigma_2, \sigma_3, \sigma_4, \sigma_5, \sigma_6\}_i^k$ is called as a set of parameters in the search space $\mathbb{R}^6$. $i=1, \ldots, N$ with N is the total number of candidate solutions, or particles, in the search space. $k=1, \ldots, M$ represents the increment of time step with M is the final time at which either an optimal solution is reached (its corresponding sum of squared errors is lower than a predetermined threshold) or the number of search iterations of the PSO algorithm is reached.

The new position and velocity of each particle after each search iteration are updated by the following rules:

$$x_i^{k+1}=x_i^k+v_i^{k+1} \tag{78}$$

$$v_i^{k+1}=wv_i^k+c_1r_1(p_i^k-x_i^k)+c_2r_2(p_g^k-x_i^k) \tag{79}$$

where w is the inertia term, $r_1$ and $r_2$ are random values between 0 and 1, and $c_1$ and $c_2$ represent the cognitive and social scaling parameters. Here, w is selected to be 0.5, $c_1$ and $c_2$ to be 1 and 2 respectively. Due to the computation intensity of the algorithm, the sub-solution may be selected after 10 search iterations.

| $\varphi_a$ | RMSE(mm) | R-squared | $e_{ss}$ (m/s) |
|---|---|---|---|
| 1° | 0.17 | 0.97 | 0.12 |
| 3° | 0.32 | 0.82 | 0.18 |
| 5° | 0.16 | 0.93 | 0.09 |
| 7° | 0.24 | 0.73 | 0.27 |
| 9° | 0.13 | 0.72 | 0.10 |

TABLE 4 illustrates fitting performance between the simulated linear speed using the hybrid dynamic model with the estimated force function and the measured linear speed of the robot using motion capture system.

The result of the PSO algorithm described in the previous section is as follow: $\{\sigma_1, \sigma_2, \sigma_3, \sigma_4, \sigma_5, \sigma_6\}=\{1.214, 1.997, 3.836, -1.004, -0.1009, 22.357\}$, for 5 trials (shown in FIG. 27), each with approximately 20000 data points sampled at 360 Hz. FIGS. 23-26 show how well the linear angular speed generated by the hybrid dynamic model with the chosen force parameters fit with the linear angular speed obtained from the measured data in 5 experiments with activation angles $\varphi_a$ ranging from 1° to 9° and constant deactivation angle $\varphi_d=22°$. Table 4 shows the fitting results based on three metrics: root-mean-square errors (mm), goodness of fit (R-squared), and steady-state errors (m/s) between the simulated and experimental linear speed.

From FIGS. 27 and 28 and Table 4, the simulated data matches well with the measured data for experiments with activation angles $\varphi_a=1°$, $\varphi_a=5°$ (R-squared values of 0.97 and 0.93, respectively). For the experiments with activation angles $\varphi_a=3°$ and $\varphi_a=7°$, there are deviations in both transient and steady-state velocities, resulting in poor R-squared values (0.82 and 0.73, respectively). The steady-state errors of 0.18 (m/s) and 0.27 (m/s) also reflect the poor fit in these two experiments. Based on FIGS. 23-26, the fitting result in the experiment with activation angle $\varphi_a=9°$ is more acceptable than what R-squared values of 0.72 and steady-state error of 0.10 (m/s) indicate.

There are several reasons for the imperfect R-squared values and steady-state errors in some experiments. Firstly, as the wheel rolls more slowly due to larger activation angles, the robot's linear speed becomes more discrete, resulting more fluctuation in the speed profile. Furthermore, at lower speed, platform vibrations and contact surface irregularities result in more pronounced jitters in the speed profile, making the measured data noisier. Secondly, the order of trials is random: the trial with activation angle $\varphi_a=7°$ is conducted before the trials with activation angles $\varphi_a=1°$, $\varphi_a=5°$, and $\varphi_a=9°$, which are conducted before the trial with activation angle $\varphi_a=3°$. The later experiments result in more noticeable charge retention on the actuators that cause the actuation forces to be weaker than that of the same experiment but if conducted earlier. Finally, the optimization solution is suboptimal, and the form of the force function may be more complex, especially in the sophisticated hybrid dynamic interaction between the actuators and the ground while the robot continuously changes its position and speed.

From this experiment, it may be observed that the maximum and minimum controllable range of linear speed may be 0.2 to 0.7 m/s. While it is possible for the wheel to roll at slower speed than 0.2 m/s, the wheel's motion becomes fully discrete, and the speed has a saw-tooth profile (not shown). On the other hand, achieving a linear speed above 0.7 m/s may be possible (e.g., for a lighter robot, or with redesigned folded-HASEL actuators).

The actuation force model may be improved by one of the two following methods. Firstly, the experimental value of the actuator force can be measured directly using a force sensor placed between the actuator and the actuator pad for each actuator. While this method is reliable to acquire the force information, it may significantly increase the weight of the robot. Secondly, the actuation force depends on several factors, including the HV switching circuit, the viscosity of the dielectric fluid, the dimension and shape of each actuator's pouch, the friction between the dielectric fluid and the inner surface of the plastic pouch, to name a few. An accurate mathematical model of the actuator's force can be developed to better capture the wheel's dynamics and improve the controller's performance.

Despite the mentioned limitations, as the main goal of the force estimation is for the control of the robot's stead-state linear speed, the changes in the dynamics and unmodeled disturbances may be compensated for in real-time using a disturbance estimator that is explained below.

FIG. 29 illustrates an example of a model predictive controller (MPC) for an electro-hydraulic rolling soft robot such as those described above. FIG. 30 shows a snapshot of a typical MPC iteration for acceleration with respect to times t, jump steps j, and the robot's speed (m/s). FIG. 31 shows a real-time, multi-threaded implementation of the MPC controller for the speed regulation of the electro-hydraulic rolling soft robot. The arrows indicate the direction of data transmission.

Unlike traditional continuous dynamic system, the HASEL powered rolling soft robot has state jumps that are state dependent and discrete input u that remains constant for the entire duration of activation-deactivation of a target actuator. The problem of both state-dependent state jumps and discrete inputs in the dynamics make it challenging to use conventional controller approaches. The model predictive controller and the particle swarm optimization algorithm are used to implement the optimal input to regulate the robot's angular speed.

The controlled system (FIG. 29) begins with a reference angular velocity that is fed into the controller. The controller, based on the hybrid dynamic model of the plant, generates an input u to the hardware of the robot to determine an appropriate next actuator to be activated and its associated activation and deactivation angles. The robot then changes its angular position and speed due to the force generated by the said actuator. Both the motion capture system and the absolute rotary encoder capture the instantaneous angular position of the robot. Based on the updated angular position of the robot, the state observer outputs the full states that can be used for the next MPC computation.

The robot's state observer simply receives the updated angular position of the robot, computes its derivative to obtain the angular speed, and maintain or update the remaining four non-physical states based on the jump map, flow map, jump set, and flow set. The outputs of the state observers consist of full states that are used for the next MPC iteration and the estimated angular speed that is used for the disturbance estimator.

The disturbance estimator, or error accumulator, is implemented to account for the real-time error in the dynamic modeling, unmodeled external disturbances, and fabrication and computation errors that result in deviations in the measured angular speed and the simulated angular speed using the hybrid dynamic equations. Since a focus on steady-state control of the angular speed may be desired, the disturbance estimator is not used during the transient period of robot's angular speed. When the predicted angular speed of the robot is within 0.1 m/s of the referenced angular speed, the estimator is turned on, allowing for the controller to gradually correct for the constant angular speed offset. The disturbance estimator has the follow discrete form:

$$\hat{d}(k+1) = \hat{d}(k) + Ke_{ss}(k) \quad (80)$$

$$e_{ss}(k) = \xi_{2,m}(k) - \xi_{2,p}(k) \quad (81)$$

where:
$\hat{d}(k+1)$: the updated estimated disturbance term
$\hat{d}(k)$: the current estimated disturbance term
$\xi_{2,m}(k)$: the measured angular speed
$\xi_{2,p}(k)$: the current predicted speed based on the MPC algorithm
K: the positive valued tunning constant A larger K results in faster build-up in error and more responsive correction for the control offset. However, too large K also amplifies noises in the measured speed and cause the controller to generate an oscillatory speed around the referenced speed.

The controller has two operating modes: acceleration and active deceleration. In the acceleration mode, the controller uses MPC algorithm with PSO algorithm to determine the optimal input to activate the next actuator such that the predicted speed $\xi_{2,p}(k)$ is closest to the referenced speed $\xi_{2,r}(k)$. If $\xi_{2,p}(k) < \xi_{2,r}(k) + 0.3$, the controller will maintain the acceleration mode. If $\xi_{2,p}(k) \geq \xi_{2,r}(k) + 0.3$, the controller will switch to the active deceleration mode. In this mode, the controller applies the braking input with a target actuator $n_a = 16 \mod (i+2)$ and predetermined activation angle of $-22°$ and deactivation angle of $-6°$.

The model predictive controller involves a cost function J, defined as:

$$J(x, u) := \frac{1}{2} \sum_{j}^{j+2} \left( \frac{1}{n} \sum_{k}^{k+n} (\xi_{2,m}(k) - \xi_{2,r}(k))^2 \right)$$

Since the reference speed in the future may not be known, it may be assumed that it is a constant throughout each MPC iteration: $\xi_{2,r}(k) = \xi_{2,r}(k+1) = \ldots = \xi_{2,r}(k+n)$. The cost function $J(x, u)$ is the mean squared error between the predicted speed and the referenced speed during the entire activation-deactivation cycle (duration of q=0 and q=1) which corresponds to the jump step incrementing thrice from right after j to right after j+3 (FIG. 15b). n is the total number of time steps between jumps. The controller goal is: Given $x_0 \in \mathbb{R}^n$, Minimize $\mathcal{J}(x, u)$
Subject to: $(x, u) \in \hat{S}_H(x_0)$
$x(T,J) \in X$ $(T, J) \in \mathcal{T}$
$u \in U$ where $\hat{S}_H(x_0)$ is the set of solution pairs (x, u) of $\mathcal{H}$ satisfying $x(0,0)=x_0$, and (T, J) denotes the terminal time of (x, u).

The terminal times of the feasible solution pairs belong to a set $\mathcal{T} \subset \mathbb{R}_{\geq 0} \times \mathbb{N}_{\geq 0}$, called the prediction horizon.

$$\mathcal{T} = \left\{ (t, j) \in \mathbb{R}_{\geq 0} \times N_{\geq 0} : \max\left\{\frac{T}{f_s}, j\right\} = \tau \right\}$$

for some $\tau \in \{1, 2, \ldots\}$ and $\delta > 0$, where $f_s$ is the sampling rate of the controller. The prediction horizon for a given control input may be the entire duration of activation-deactivation cycle that is previously mentioned.

The optimal input u may be computed at the beginning of every period q=0 for the target actuator $n_a$ which is always the adjacent actuator of the current actuator $\eta$ ($n_a$=16 mode($\eta$+1)). Each input u is fixed for the entire activation-deactivation cycle of the target actuator. Since the input is fully discrete and remain constant for the entire activation-deactivation cycle, the concept of control horizon does not apply.

FIG. 30 shows a snapshot of a typical MPC iteration for acceleration with respect to times t, jump steps j, and the robot's velocity. From the figure, the current actuator is IT The red line on the velocity plot represents the robot's status q=1, whereas the black line represents the robot's status q=0. The vertical strips represent time steps t. Whenever there is switch of status q, the jump step j increments. The MPC is set to trigger when q=0 switches to $q^+$=1. MPC then computes an optimal control input $u^+$ for the target actuator $n_a$=16 mod($\eta$+1) which is used by the embedded microcontroller to update the next control command. The MPC's prediction horizon takes three jump steps from j to j+3, which corresponds to the instant the target actuator $n_a$ starts to deactivate. Because the jump steps change based on the robot's activation and deactivation angle down counters, which in turn decrement at the same rate as the robot's speed $\xi_{2,m}$, the number of time steps required for j to change to j+3 decreases as the robot's speed increases. Therefore, the prediction horizon is adaptive, causing the MPC computation time to be also adaptive. However, the instant (t+Δt, j) at which the MPC completes its computation must happen before j turns into j+1, since the actuator $n_a$ requires the updated activation angle down counter to begin decrementing at j+1 and reach zero at j+2. The double arrows shown above the prediction horizon region (gray rectangle) and the MPC computation time (orange rectangle) represent the adaptive nature of the controller (FIG. 29).

To solve for the optimal input for the minimized cost function in real-time, the PSO algorithm may be used. Optimization-based controller designs not only have difficulties with nonlinear, nonconvex, and discrete cost functions but also their real-time computation capability. The next section describes how the controller is implemented in real-time.

The controller's varying computation time may utilize multi-threaded implementation to isolate the MPC thread from the periodic S data collector thread, whose sampling rate may beat 600 Hz, that collects the motion capture and embedded microcontroller data in real-time (FIG. 31). Besides, since each MPC iteration that involves intensive real-time computation may finish before j increments to j+1 (mentioned in the previous section), computation hardware may be sufficiently powerful to ensure this real-time demand.

A personal computer with a powerful processor (e.g., Ryzen 5 5600X, Advanced Micro Devices) is used for the C++ multi-threaded implementation. The program is centered around a shared data map that all threads can have access to. This data map contains the latest update of the motion capture data and embedded microcontroller (e.g., Teensy 3.6, PJRC) data. The first thread, the data collector, continuously samples the motion capture and microcontroller data and write them to the shared data map at 600 Hz. The data logger thread obtains a copy of the shared data map and write it to a text file at the rate of 300 Hz for post processing and plotting. The MPC thread keeps polling the content of the shared data map; as soon as the robot is activated ($q^+$=1), MPC computes an optimal control command input and send it to the embedded microcontroller via the data collector thread. The embedded microcontroller continues to send angular position from the rotary encoder, the actuation status q, and the current actuator index $\eta$ over serial and check for new control command input at 300 Hz. If there are updated input, the controller waits until the current actuator $\eta$ finishes activating then applies the command to the target actuator accordingly.

A typical step tracking performance of the closed-loop system may include a reference linear speed has three steps from 0.3 m/s to 0.6 m/s then 0.9 m/s, a step down to 0.4 m/s then a step up to 0.8 m/s, with 15 seconds between step changes.

While there is an embedded hardware to drive each of the 16 actuators, the robot may be fully untethered and intelligent by integrating both the computational hardware that is sufficiently fast (either an FPGA or ASIC processor) and including an on-board battery. The feedback sensors such as the rotary encoder and the motion capture hardware can be also replaced by an onboard inertial measurement unit.

The robot's steering and lateral stability concerns may be addressed by converting the wheel-shaped robot into a spherical robot or including an additional wheel-shaped robot such that two wheels are connected by an axle.

FIG. 33 illustrates an example schematic of a computing device 3300 suitable for implementing aspects of the disclosed technology including any of the controller or microcontrollers as described above. The computing device 3300 includes one or more processor unit(s) 3302, memory 3304, a display 3306, and other interfaces 3308 (e.g., buttons). The memory 3304 generally includes both volatile memory (e.g., RAM) and non-volatile memory (e.g., flash memory). An operating system 3310, such as the Microsoft Windows® operating system, the Apple macOS operating system, or the Linux operating system, resides in the memory 3304 and is executed by the processor unit(s) 3302, although it should be understood that other operating systems may be employed.

One or more applications 3312 are loaded in the memory 3304 and executed on the operating system 3310 by the processor unit(s) 3302. Applications 3312 may receive input from various input local devices such as a microphone 3334, input accessory 3335 (e.g., keypad, mouse, stylus, touchpad, joystick, instrument mounted input, or the like). Additionally, the applications 3312 may receive input from one or more remote devices such as remotely-located smart devices by communicating with such devices over a wired or wireless network using more communication transceivers 3330 and an antenna 3338 to provide network connectivity (e.g., a mobile phone network, Wi-Fi®, Bluetooth®). The computing device 3300 may also include various other components, such as a positioning system (e.g., a global positioning satellite transceiver), one or more accelerometers, one or more cameras, an audio interface (e.g., the microphone 3334, an audio amplifier and speaker and/or audio jack), and storage devices 3328. Other configurations may also be employed.

The computing device 3300 further includes a power supply 3316, which is powered by one or more batteries or other power sources, and which provides power to other components of the computing device 3300. The power supply 3316 may also be connected to an external power source (not shown) that overrides or recharges the built-in batteries or other power sources.

In an example implementation, the computing device 3300 comprises hardware and/or software embodied by instructions stored in the memory 3304 and/or the storage devices 3328 and processed by the processor unit(s) 3302. The memory 3304 may be the memory of a host device or of an accessory that couples to the host. Additionally or alternatively, the computing device 3300 may comprise one or more field programmable gate arrays (FGPAs), application specific integrated circuits (ASIC), or other hardware/software/firmware capable of providing the functionality described herein.

The computing device 3300 may include a variety of tangible processor-readable storage media and intangible processor-readable communication signals. Tangible processor-readable storage can be embodied by any available media that can be accessed by the computing device 3300 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 3300. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A system for sensing actuation of a soft robotic actuator, comprising:
an electrostatic soft actuator comprising a flexible actuator body that is actuatable upon application of a drive voltage to the electrostatic soft actuator;
a magnetometer disposed relative to the electrostatic soft actuator for measurement of a magnetic field within a task space of the electrostatic soft actuator;
a magnetic member disposed relative to the electrostatic soft actuator to undergo a displacement within the task space upon displacement of the electrostatic soft actuator within the task space to affect the magnetic field, wherein the magnetometer is disposed on a first side of the electrostatic soft actuator and the magnetic member is disposed at a second side of the electrostatic soft actuator opposite the first side, wherein the magnetic member comprises at least at least a portion of a flexible portion of the electrostatic soft actuator; and a control module in operative communication with the magnetometer, wherein the control module is operative to generate a position characterization of the electrostatic soft actuator in response to the measurement of the magnetic field upon the displacement of the magnetic member within the task space.

2. The system of claim 1, wherein the electrostatic soft actuator comprises a dielectric elastomer actuator (DEA) comprising an electrode pair separated by an elastomer dielectric.

3. The system of claim 1, wherein the electrostatic soft actuator comprises a hydraulically amplified self-healing electrostatic (HASEL) actuator.

4. The system of claim 1, wherein the electrostatic soft actuator comprises a folded HASEL actuator that is actuatable linearly.

5. The system of claim 1, wherein the magnetic member comprises an elastomeric magnetic material.

6. The system of claim 5, wherein the elastomeric magnetic material comprises a base elastomer in which magnetic particles are disposed that are polarized to produce a magnetic field emanating from the elastomeric magnetic material.

7. The system of claim 1, wherein the position characterization comprises at least one of a magnitude of linear displacement, a direction of linear displacement, an angle measure, a proximity indication, or an amount of curvature.

8. The system of claim 1, wherein the control module comprises a mapping that correlates the measurement of the magnetic field to the position characterization.

9. The system of claim 1, wherein the displacement of the electrostatic soft actuator within the task space is in response to actuation of the electrostatic soft actuator.

10. The system of claim 1, wherein the displacement of the electrostatic soft actuator within the task space is in response to an external force acting on the electrostatic soft actuator.

11. A method for sensing actuation of a soft robotic actuator, comprising:
measuring a magnetic field within a task space of an electrostatic soft actuator using a magnetometer, wherein a magnetic member disposed relative to the electrostatic soft actuator undergoes a displacement within the task space to affect the magnetic field within the task space, wherein the magnetometer is disposed on a first side of the electrostatic soft actuator and the magnetic member is disposed at a second side of the electrostatic soft actuator opposite the first side, wherein the magnetic member comprises at least a portion of a flexible portion of the electrostatic soft actuator; and
generating a position characterization of the electrostatic soft actuator in response to the measuring of the magnetic field upon the displacement of the magnetic member within the task space.

12. The method of claim 11, wherein the electrostatic soft actuator comprises a hydraulically amplified self-healing electrostatic (HASEL) actuator.

13. The method of claim 12, wherein the electrostatic soft actuator comprise a folded HASEL actuator that is actuatable linearly.

14. The method of claim 11, wherein the electrostatic soft actuator includes an elastomeric magnetic material, the elastomeric magnetic material comprising a base elastomer in which magnetic particles are disposed that are polarized to produce a magnetic field emanating from the elastomeric magnetic material.

15. The method of claim 11, wherein the position characterization comprises at least one of a magnitude of linear displacement, a direction of linear displacement, an angle measure, a proximity indication, or an amount of curvature.

16. The method of claim 11, further comprising:
mapping the measurement of the magnetic field to the position characterization.

17. The method of claim 11, further comprising:
applying a drive voltage to the electrostatic soft actuator comprising a flexible actuator body to actuate the electrostatic soft actuator; and
wherein the displacement of the electrostatic soft actuator within the task space is in response to the actuation of the electrostatic soft actuator.

18. The method of claim 11, further comprising:
receiving an external force acting on the electrostatic soft actuator; and
wherein the displacement of the electrostatic soft actuator within the task space is in response to the external force acting on the electrostatic soft actuator.

* * * * *